US012494584B2

(12) United States Patent
Zhou et al.

(10) Patent No.: US 12,494,584 B2
(45) Date of Patent: Dec. 9, 2025

(54) TERMINAL MONOPOLE ANTENNA

(71) Applicant: Honor Device Co., Ltd., Shenzhen (CN)

(72) Inventors: Dawei Zhou, Shenzhen (CN); Yuanpeng Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/279,525

(22) PCT Filed: Aug. 17, 2022

(86) PCT No.: PCT/CN2022/113116
§ 371 (c)(1),
(2) Date: Aug. 30, 2023

(87) PCT Pub. No.: WO2023/030015
PCT Pub. Date: Mar. 9, 2023

(65) Prior Publication Data

US 2024/0313410 A1 Sep. 19, 2024

(30) Foreign Application Priority Data

Sep. 3, 2021 (CN) ......................... 202111034604.4

(51) Int. Cl.
*H01Q 9/42* (2006.01)
*H01Q 1/24* (2006.01)

(52) U.S. Cl.
CPC ................. *H01Q 9/42* (2013.01); *H01Q 1/24* (2013.01)

(58) Field of Classification Search
CPC ............ H01Q 9/42; H01Q 1/24; H01Q 5/335; H01Q 7/00; H01Q 1/243; H01Q 5/20;
(Continued)

(56) References Cited

U.S. PATENT DOCUMENTS 5,521,607 A * 5/1996 Deasy .................... H01Q 9/145 343/750
6,873,291 B2 3/2005 Aoyama et al.
(Continued)

FOREIGN PATENT DOCUMENTS

CN 1407832 A 4/2003
CN 104471789 A 3/2015
(Continued)

OTHER PUBLICATIONS

Liu Yiming, et al: "An Inductor—Loaded Broadband Electrical Small Planar Monopole for Mobile Terminal Applications", Electronic Information Warfare Technology, 2014 , 29(4), Jul. 15, 2014, total 5 pages.

*Primary Examiner* — Hai V Tran
(74) *Attorney, Agent, or Firm* — Slater Matsil, LLP

(57) ABSTRACT

Embodiments of this application disclose a terminal monopole antenna, relating to the technical field of antennas. The antenna includes a radiation branch, the radiation branch includes at least one radiator, and a first end of the radiator is electrically connected to a reference ground through a first inductor. When the terminal monopole antenna is directly fed by a feeding point, a second end of the radiator is electrically connected to the feeding point. When the terminal monopole antenna is coupled and fed, the second end is electrically connected to the reference ground through a second inductor. The terminal monopole antenna further includes a feeding branch, the feeding branch is configured to perform coupled feeding to the radiation branch. A length of the radiation branch is less than a quarter of an operating wavelength of the terminal monopole antenna.

20 Claims, 64 Drawing Sheets

Setting illustration of a magnetic current loop monopole antenna in an electronic device

(58) Field of Classification Search
CPC ...... H01Q 1/002; H01Q 1/2266; H01Q 1/273; H01Q 1/36; H01Q 1/48; H01Q 1/50
See application file for complete search history.

(56) References Cited

U.S. PATENT DOCUMENTS

| | | | | |
|---|---|---|---|---|
| 10,033,113 | B2 | 7/2018 | Yosui | |
| 11,949,172 | B2 * | 4/2024 | Zhang | H01Q 5/328 |
| 2006/0055619 | A1 * | 3/2006 | Sarabandi | H01Q 5/357 343/866 |
| 2007/0146221 | A1 | 6/2007 | Oshiyama et al. | |
| 2008/0174503 | A1 * | 7/2008 | Kim | H01Q 9/16 343/793 |
| 2010/0279734 | A1 | 11/2010 | Karkinen et al. | |
| 2013/0063312 | A1 * | 3/2013 | Chou | H01Q 5/364 343/700 MS |
| 2014/0292602 | A1 | 10/2014 | Suzuki et al. | |
| 2014/0333496 | A1 * | 11/2014 | Hu | H01Q 1/243 343/745 |
| 2018/0034153 | A1 | 2/2018 | Kaneko et al. | |
| 2020/0227829 | A1 | 7/2020 | Jouanlanne | |

FOREIGN PATENT DOCUMENTS

| | | | |
|---|---|---|---|
| CN | 105375113 | A | 3/2016 |
| CN | 105514612 | A | 4/2016 |
| CN | 105514624 | A | 4/2016 |
| CN | 107181045 | A | 9/2017 |
| CN | 108767499 | A | 11/2018 |
| CN | 110416712 | A | 11/2019 |
| CN | 110994190 | A | 4/2020 |
| CN | 112803158 | A | 5/2021 |
| JP | 2000269724 | A | 9/2000 |
| JP | 2003069331 | A | 3/2003 |
| JP | 2008028734 | A | 2/2008 |
| TW | 201234709 | A | 8/2012 |

* cited by examiner (a)

(b)

(a)

(b)

Magnetic current loop monopole antenna
(current simulation)

(a)

(b)

Setting illustration of a magnetic current loop dipole antenna in an electronic device (a)

(b)

(a)

(b)

Magnetic current loop left-hand antenna (electric field simulation)

(a)

(b)

(a)

(b)

Setting illustration of a magnetic current loop slot antenna in an electronic device (a)

(b)

(a)

(b)

(a)

(b)

Magnetic current loop monopole antenna that is coupled and fed (electric field simulation)

(a)

(b)

(a)

(b)

Magnetic current loop monopole antenna that is coupled and fed (current simulation)

(a)

(b)

Magnetic current loop monopole antenna that is coupled and fed (Smith chart)

Magnetic current loop monopole antenna that is coupled and fed (S parameter)

(a)

(b)

Magnetic current loop dipole antenna that is coupled and fed (electric field simulation)

(a)

(b)

(a)

(b)

Magnetic current loop left-hand antenna that is coupled and fed (electric field simulation)

(a)

(b)

(a)

(b)

Magnetic current loop slot antenna that is coupled and fed (electric field simulation)

(a)

(b)

Magnetic current loop slot antenna that is coupled and fed

TERMINAL MONOPOLE ANTENNA

CROSS-REFERENCE TO RELATED APPLICATIONS

This application is a national stage of International Application No. PCT/CN2022/113116, filed on Aug. 17, 2022, which claims priority to Chinese Patent Application No. 202111034604.4, filed on Sep. 3, 2021. The disclosures of both of the aforementioned applications are hereby incorporated by reference in their entireties.

TECHNICAL FIELD

This application relates to the field of antenna technologies, and in particular, to a terminal monopole antenna, such as a magnetic current loop monopole antenna.

BACKGROUND

With the development of electronic devices, an environment in which an antenna may be arranged in the electronic device is getting increasingly worse. Therefore, an existing antenna form has gradually been unable to meet a requirement of the electronic device for quality of wireless communication.

To better meet the requirement of the current electronic device for wireless communication, an antenna form based on a new operating mechanism different from the existing antenna is required.

SUMMARY

A terminal monopole antenna provided in embodiments of this application provides a new operating mechanism of the antenna, to enable the antenna to provide better radiation performance under a same environmental condition. For example, a better bandwidth, radiation efficiency, system efficiency, lower SAR, and a better pattern. The antenna may be excited through directly feeding or coupled feeding.

To achieve the foregoing objective, the following technical solutions are used in embodiments of this application:

According to a first aspect, a terminal monopole antenna is provided. The antenna includes a radiation branch, the radiation branch includes at least one radiator, a first end of the radiator is electrically connected to a reference ground through a first inductor, and the first end is one of ends on two sides of the radiator. When the terminal monopole antenna is directly fed by a feeding point, a second end of the radiator is electrically connected to the feeding point, and the second end is an end different from the first end among the ends on the two sides of the radiator. When the terminal monopole antenna is coupled and fed, the second end is electrically connected to the reference ground through a second inductor. The terminal monopole antenna further includes a feeding branch, the feeding branch is not connected to the radiation branch, the feeding branch is arranged between the radiation branch and the reference ground, a feeding point is arranged on the feeding branch, and the feeding branch is configured to perform coupled feeding to the radiation branch. A length of the radiation branch is less than a quarter of an operating wavelength of the terminal monopole antenna.

Based on the solution, an antenna with a new operating mechanism is provided. For example, because the antenna may form a closed magnetic current loop during operation, the antenna may be referred to as a magnetic current loop antenna. In this example, the magnetic current loop antenna may be obtained after improvement based on an existing monopole antenna. In some embodiments, the magnetic current loop monopole antenna may be fed in the form of directly feeding. In some other embodiments, the magnetic current loop monopole antenna may also be fed in the form of coupled feeding. Compared with other existing antennas in the same environment, such as a monopole antenna, the magnetic current loop monopole antenna provided in embodiments of this application may provide better radiation performance. If the radiation efficiency is higher, the system efficiency is correspondingly higher. A bandwidth and a pattern are significantly improved. In addition, there is also a lower SAR value.

In a possible design, when the terminal monopole antenna is directly fed by the feeding point, a distance between the first inductor and the feeding point is greater than or equal to ⅛ of the operating wavelength of the terminal monopole antenna. Based on the solution, a limitation of a distance between a ground inductor and the feeding point is provided in a direct feed scenario. In the limited range, the antenna may generate a more even electric field during operation, thereby improving radiation performance.

In a possible design, when an operating frequency band of the antenna ranges from 450 MHz to 1 GHz, an inductance value of the first inductor and an inductance value of the second inductor are set within [5 nH, 47 nH]. When the operating frequency band of the antenna ranges from 1 GHz to 3 GHz, the inductance value of the first inductor and the inductance value of the second inductor are set within [1 nH, 33 nH]. When the operating frequency band of the antenna ranges from 3 GHz to 10 GHz, the inductance value of the first inductor and the inductance value of the second inductor are set within [0.5 nH, 10 nH]. Based on the solution, a limitation for a range of the ground inductor is provided. In the limited range, the antenna may generate a more even electric field during operation, thereby improving radiation performance.

In a possible design, the feeding branch includes a first feeding part, the feeding point is connected to a center of the first feeding part, and ends on two sides of the first feeding part are suspended. Based on the solution, a possible implementation of the feeding branch in a coupled feeding scenario is provided. A feeding branch having the structure may effectively excite the radiation branch in the foregoing example to perform radiation having radiation characteristics of a current loop antenna.

In a possible design, the feeding branch includes a second feeding part, two sides of the second feeding part are respectively grounded through an inductor, and the feeding point is connected in series on the second feeding part. Based on the solution, a possible implementation of the feeding branch in a coupled feeding scenario is provided. A feeding branch having the structure may effectively excite the radiation branch in the foregoing example to perform radiation having radiation characteristics of a current loop antenna.

In a possible design, the feeding branch includes a third feeding part, and the feeding point is connected to an end on one side of the third feeding part. Based on the solution, a possible implementation of the feeding branch in a coupled feeding scenario is provided. A feeding branch having the structure may effectively excite the radiation branch in the foregoing example to perform radiation having radiation characteristics of a current loop antenna.

In a possible design, an end on the other side of the third feeding part is suspended. Based on the solution, a possible implementation of the feeding branch in a coupled feeding scenario is provided. A feeding branch having the structure may effectively excite the radiation branch in the foregoing example to perform radiation having radiation characteristics of a current loop antenna.

In a possible design, an end on the other side of the third feeding part is grounded through a third inductor. Based on the solution, a possible implementation of the feeding branch in a coupled feeding scenario is provided. A feeding branch having the structure may effectively excite the radiation branch in the foregoing example to perform radiation having radiation characteristics of a current loop antenna.

In a possible design, an end of the third feeding part that is away from the feeding point is grounded. A through slot is provided on the third feeding part, and the slot divides the third feeding part into two parts that are not connected to each other. Based on the solution, a possible implementation of the feeding branch in a coupled feeding scenario is provided. A feeding branch having the structure may effectively excite the radiation branch in the foregoing example to perform radiation having radiation characteristics of a current loop antenna.

In a possible design, an end of the third feeding part that is away from the feeding point is grounded. A fourth inductor connected in series is arranged on the third feeding part. Based on the solution, a possible implementation of the feeding branch in a coupled feeding scenario is provided. A feeding branch having the structure may effectively excite the radiation branch in the foregoing example to perform radiation having radiation characteristics of a current loop antenna.

In a possible design, feeding branches of different sizes correspond to different port impedances of the terminal monopole antenna. Based on the solution, a solution example for adjusting port impedance of the magnetic current loop antenna is provided. For example, adjustment of the port impedance of the terminal monopole antenna may be implemented by adjusting a size of the feeding branch.

In a possible design, when the terminal monopole antenna is operating, an even electric field is distributed between the radiation branch and the reference ground. Based on the solution, an example of electric field distribution characteristics of the magnetic current loop antenna is provided. It may be understood that all antennas having the electric field distribution characteristics should be included in a scope of the magnetic current loop antenna provided in embodiments of this application.

In a possible design, when the terminal monopole antenna is operating, a reverse current is distributed on the radiator. Based on the solution, an example of current distribution characteristics of the magnetic current loop antenna is provided. It may be understood that when the existing monopole antenna operates in a ¼ wavelength mode, a reverse current is not generated on the radiator of the existing monopole antenna. In this example, because at least one ground inductor is arranged on the magnetic current loop monopole antenna, the reverse current is distributed on the radiator even if the magnetic current loop monopole antenna operates in the ¼ wavelength mode.

In a possible design, one or more inductors are connected in series on the radiator. When a plurality of inductors are connected in series on the radiator, the plurality of inductors include at least two inductors spaced apart from the radiator. Based on the solution, an enhanced design solution of the magnetic current loop monopole antenna is provided. For example, one or more inductors may be connected in series on the radiator, so that distribution of the electric field between the radiator and the reference ground is more even, thereby achieving an effect of improving the radiation performance of the antenna.

According to a second aspect, an electronic device is provided. The electronic device includes at least one processor, a radio frequency module, and the terminal monopole antenna according to the first aspect and any possible design of the first aspect, such as a magnetic current loop monopole antenna. When transmitting or receiving a signal, the electronic device transmits or receives the signal through the radio frequency module and the terminal monopole antenna.

It may be understood that the technical features of the technical solution provided in the second aspect above can all correspond to the terminal monopole antenna provided in the first aspect and any possible design of the first aspect, so the similar beneficial effects can be achieved. Details are not repeated herein.

DETAILED DESCRIPTION OF ILLUSTRATIVE EMBODIMENTS

An electronic device may implement a wireless communication function of the electronic device by setting one or more antennas.

Generally, antenna forms in the electronic device may be diverse. For example, the antenna forms in the electronic device may include a monopole (monopole), a dipole (dipole), and the like.

Different forms of antennas have different radiation characteristics. For example, based on division of the radiation characteristics, the antenna may include an electric field antenna and a magnetic field antenna. When setting the antennas with different radiation characteristics, the antennas need to match distribution of a floor eigenmode, to obtain better radiation performance.

Figure 1:
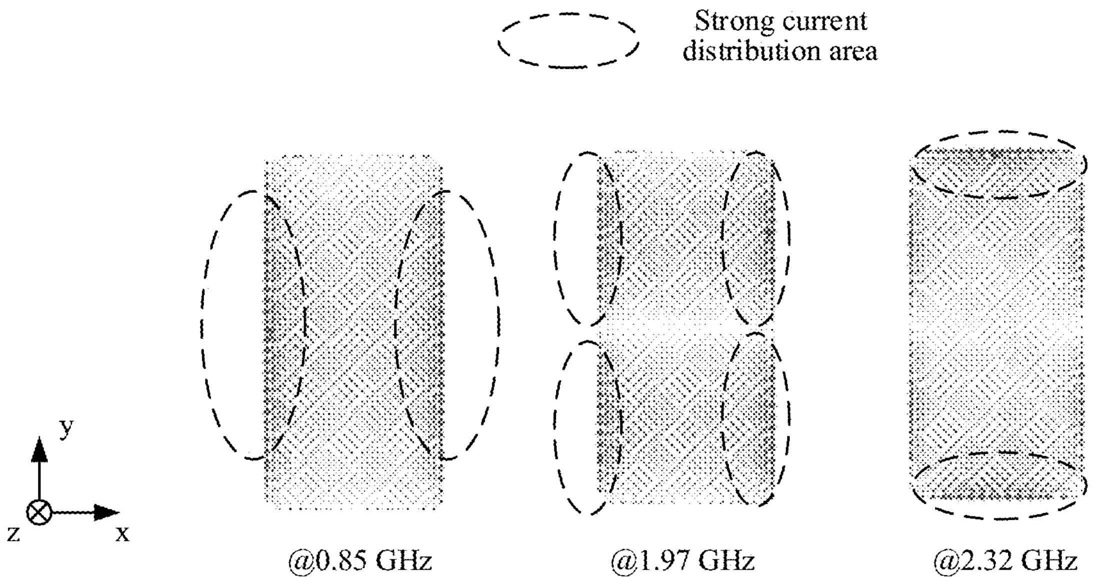
FIG. 1 is a schematic diagram of floor current distribution.

For example, FIG. 1 shows a current distribution condition of the floor eigenmode at a low frequency (such as 0.85 GHZ), a medium frequency (such as 1.97 GHz), and a high frequency (such as 2.32 GHz). It may be learnt that current distribution corresponding to the floor eigenmode is different at different frequencies. For example, the stronger current at 0.85 GHz is distributed at two ends in an x direction of a floor. The strong current at 1.97 GHz is distributed toward a positive direction of a y axis and converges toward a negative direction of the y axis, forming four strong current distribution areas as shown in FIG. 1. The stronger current at 2.32 GHz is further distributed toward the positive direction of the y axis and converges toward the negative direction of the y axis, forming two strong current areas at a top part and a bottom part of the floor as shown in FIG. 1. It may be understood that a current corresponds to a magnetic field. In other words, the magnetic field antenna may be arranged in an area in which a floor current is strong at a corresponding frequency, so that the antenna may better excite the floor during operation, to obtain better radiation performance.

Figure 2:
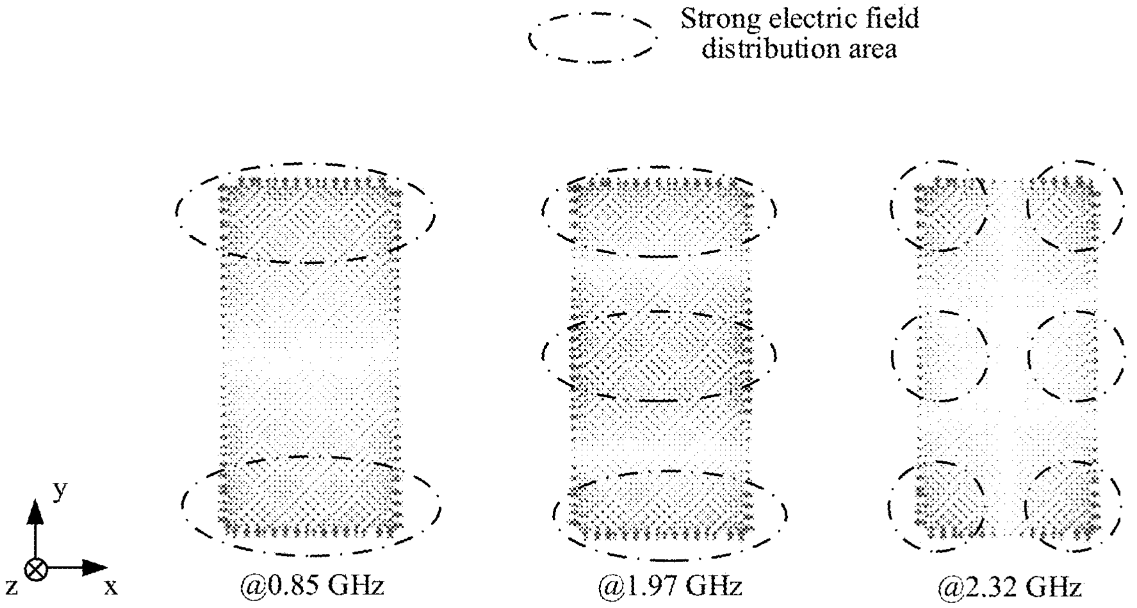
FIG. 2 is a schematic diagram of floor electric field distribution.

FIG. 2 shows an electric field distribution condition of a floor eigenmode at a low frequency (such as 0.85 GHZ), a medium frequency (such as 1.97 GHz), and a high frequency (such as 2.32 GHz). It may be learnt that electric field distribution corresponding to the floor eigenmode is different at different frequencies. For example, the stronger electric field at 0.85 GHz is distributed at two ends of a y direction of a floor. The stronger electric field at 1.97 GHz is distributed at two ends in the y direction of the floor and in a middle area in the y direction of the floor. The stronger electric field at 2.32 GHz is distributed toward an edge, and is distributed in four edge areas as shown in FIG. 2. It may be understood that the electric field antenna may be arranged in an area in which a floor electric field is strong at a corresponding frequency, so that the antenna may better excite the floor during operation, to obtain better radiation performance.

Figure 3:
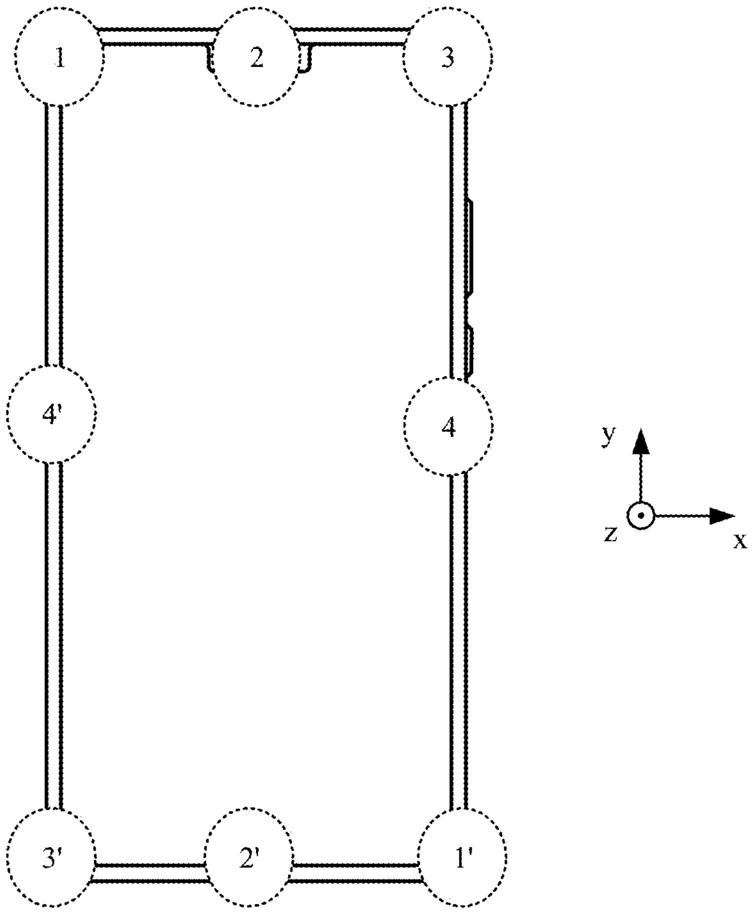
FIG. 3 is a schematic diagram of distribution of antennas on a floor.

For example, an example in which an operating frequency is used as a high frequency is used. The electric field antenna may be arranged at a position 1-4 and a position 1'-4' as shown in FIG. 3. Therefore, the floor electric field may be better excited to radiate in an operating process of the antenna, thereby obtaining better radiation performance.

It may be understood that for the electric field antenna, in addition to an arrangement position of the electric field antenna on the floor, a radiation characteristic of the antenna is also very important to the finally obtainable radiation performance.

It has been proved by experiments that an electric field antenna capable of forming an even electric field may obtain better radiation performance under the condition of limited space and other conditions being the same. However, currently, most electric field antennas do not have the radiation characteristic.

For example, an inverted-L Antenna (The Inverted-L Antenna, ILA) is used as an example. The ILA antenna may be one implementation of a monopole antenna. When the ILA antenna is operating, based on a size of a radiator of the ILA antenna, the ILA antenna may be excited to obtain at least one resonance in a corresponding operating frequency band. A length of the radiator of the ILA antenna may correspond to ¼ of a corresponding wavelength of the operating frequency band. In other words, the ILA antenna may implement coverage of the operating frequency band by operating at the ¼ wavelength.

Figure 4:
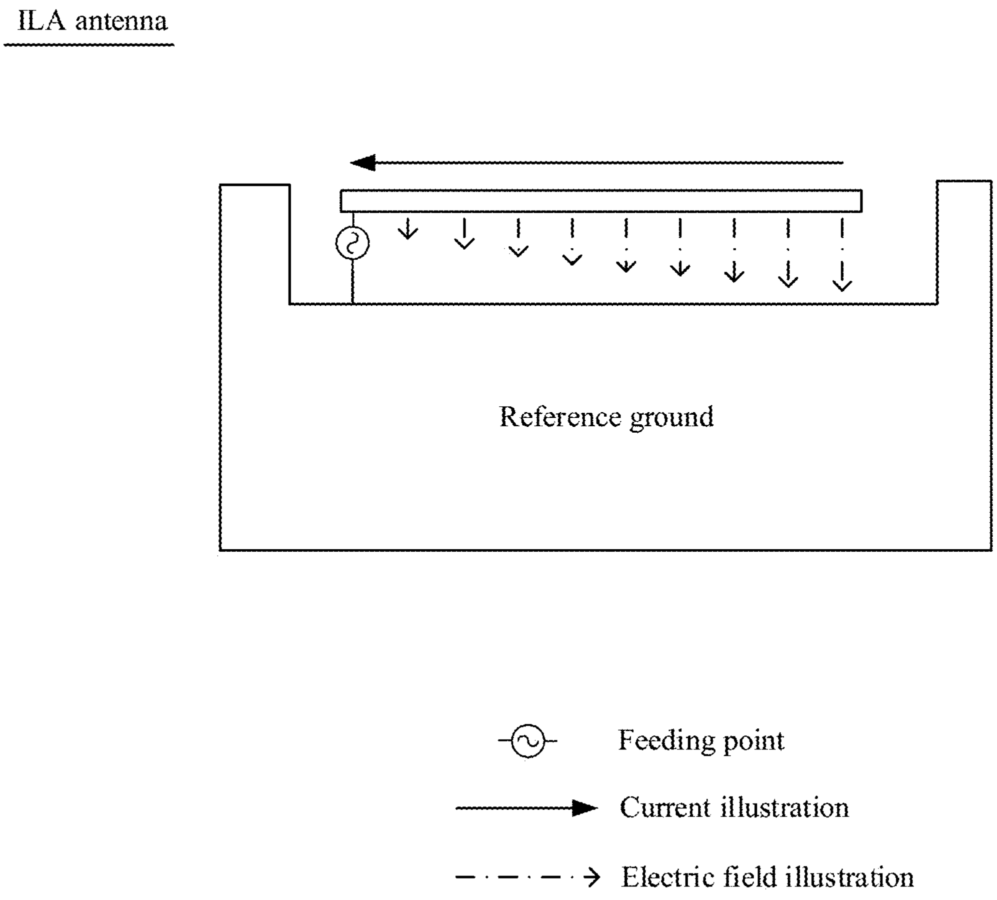
FIG. 4 is a schematic diagram of operation of an ILA antenna.

FIG. 4 is a schematic diagram of an ILA antenna. It may be learnt that when the ILA antenna operates in a ¼ wavelength mode, a non-reverse current may be generated on a radiator. For example, the current may flow from an end of the ILA antenna to a feeding point. It may be understood that flow of the current on the radiator may be caused by potential differences at different positions on the radiator. For example, when a potential at the end of the radiator is high and a potential close to the feeding point is low, the current as shown in FIG. 4 is formed.

The reference ground is used as a zero-potential reference. Due to distribution of different potentials on the radiator, there is also an uneven electric field between the radiator of the ILA antenna and the reference ground. For example, in the scenario shown in FIG. 4, the electric field close to the end of the ILA antenna is strong, and the closer to the feeding point, the weaker the electric field.

Similarly, other electric field antennas also generate uneven electric fields due to uneven potential distribution on the radiator. As a result, radiation performance of the antenna is limited.

To resolve the foregoing problem, a magnetic current loop antenna provided in embodiments of this application may enable the antenna to generate an even electric field during operation, thereby obtaining better radiation performance.

It should be noted that the magnetic current loop antenna solution provided in embodiments of this application may be widely applied in different antenna forms. For example, a magnetic current loop monopole antenna (such as a magnetic current loop ILA antenna) based on a monopole antenna, a magnetic current loop dipole antenna based on a dipole antenna, a magnetic current loop left-hand antenna based on a left-hand antenna, and a magnetic current loop slot antenna based on a slot (slot) antenna. For a structure of the left-hand antenna, refer to CN201380008276.8 and CN201410109571.9, which will not be repeated herein.

The magnetic current loop antenna solution provided in embodiments of this application and specific use of the magnetic current loop antenna solution in different magnetic current loop antennas will be described in detail below with reference to examples and accompanying drawings.

First, a setting environment of the magnetic current loop antenna applied to the magnetic current loop antenna solution provided in embodiments of this application will be described.

The magnetic current loop antenna involved in embodiments of this application may be applied in an electronic device of a user, to support a wireless communication function of the electronic device. For example, the electronic device may be a portable mobile device such as a mobile phone, a tablet computer, a personal digital assistant (personal digital assistant, PDA), an augmented reality (augmented reality, AR)/virtual reality (virtual reality, VR) device, a media player, or the like. The electronic device may also be a wearable electronic device such as a smart watch. A specific form of the device is not specially limited in embodiments of this application.

Figure 5:
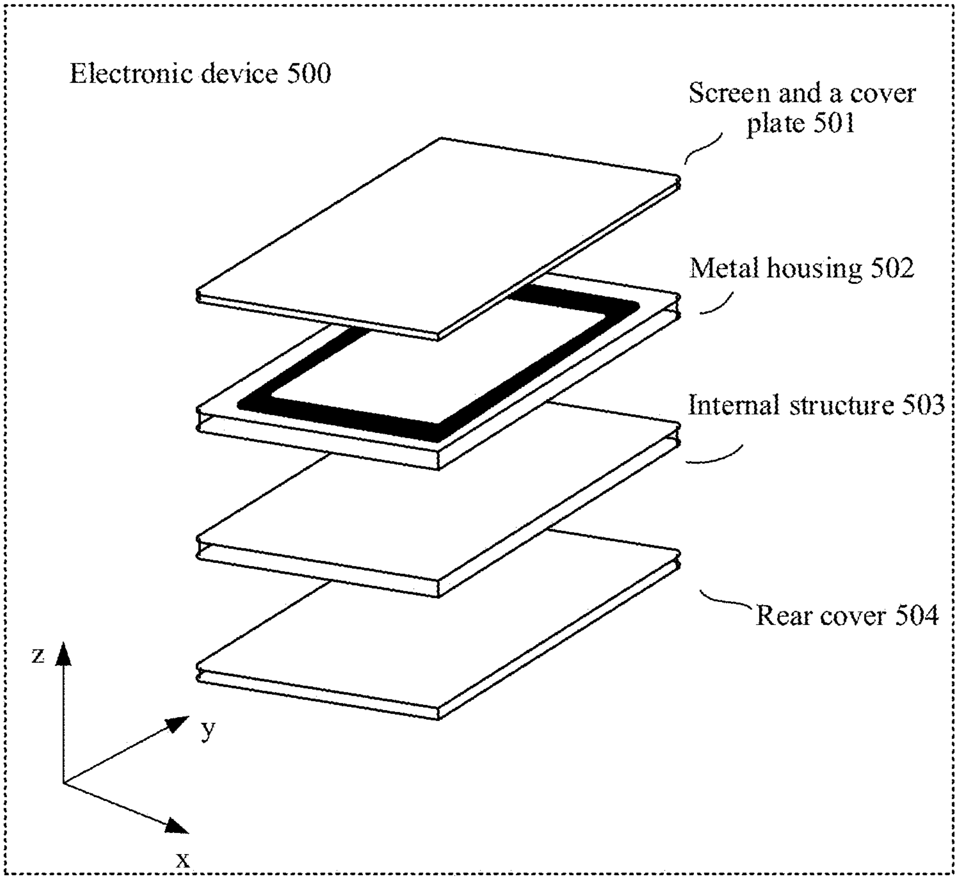
FIG. 5 is a schematic diagram of composition of an electronic device according to an embodiment of this application.

FIG. 5 is a schematic diagram of a structure of an electronic device 500 according to an embodiment of this application. As shown in FIG. 5, a screen and a cover plate 501, a metal housing 502, an internal structure 503, and a rear cover 504 may be sequentially arranged on the electronic device 500 provided in embodiments of this application along a z axis from top to bottom.

The screen and the cover plate 501 may be used to implement a display function of the electronic device. The metal housing 502 may be used as a main frame of the electronic device 500, to provide rigid support for the electronic device 500. The internal structure 503 may include a collection of electronic components and mechanical components that implement various functions of the electronic device 500. For example, the internal structure 503 may include a shield, a screw, a reinforcing rib, or the like. The rear cover 504 may be an exterior surface of the back of the electronic device 500, and the rear cover 504 may use a glass material, a ceramic material, or a plastic material in different implementations.

The magnetic current loop antenna solution provided in embodiments of this application may be applied in the electronic device 500 shown in FIG. 5, to support a wireless communication function of the electronic device 500. For example, the magnetic current loop antenna may be arranged on a metal housing 502 of the electronic device 500. For another example, the magnetic current loop antenna may be arranged on a rear cover 504 of the electronic device 500. An example in which the magnetic current loop antenna is arranged on the metal housing 502 is used below.

Figure 6:
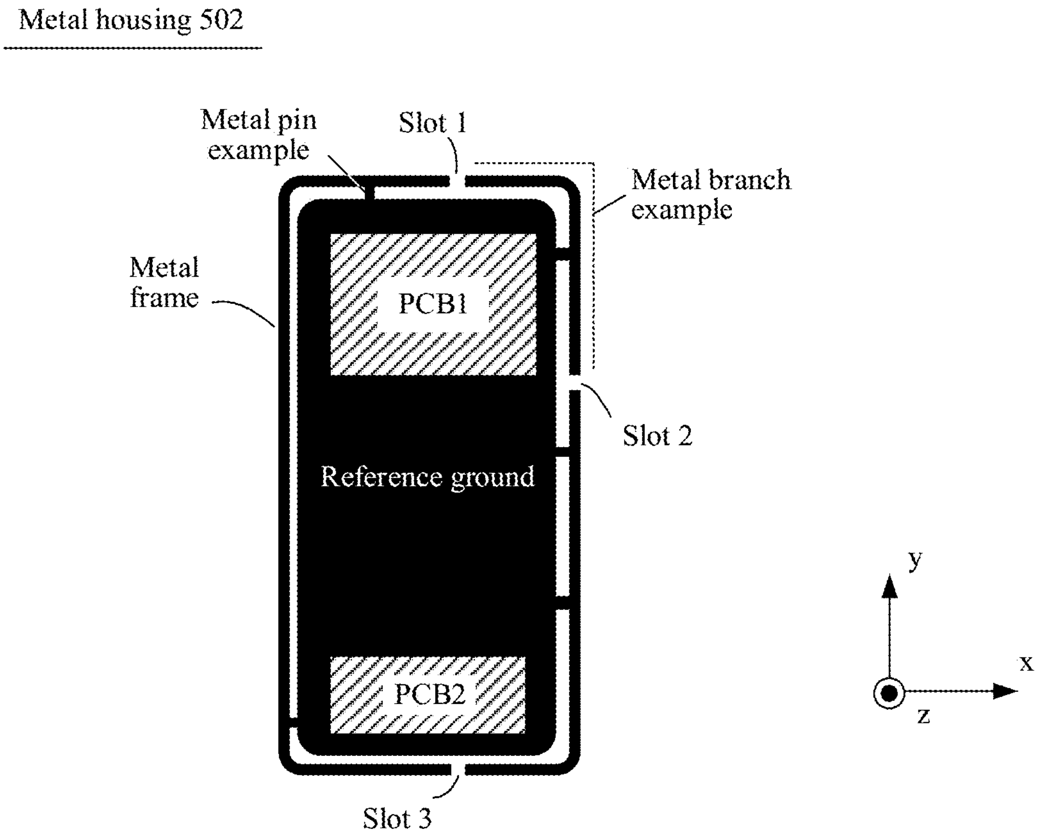
FIG. 6 is a schematic diagram of composition of a metal housing according to an embodiment of this application.

As an example, using the metal housing 502 with a metal frame as an example, FIG. 6 shows a schematic diagram of composition of a metal housing 502. In this example, the metal housing 502 may be made of a metal material, such as aluminum alloy, or the like. As shown in FIG. 6, a reference ground may be arranged on the metal housing 502. The reference ground may be a metal material with a large area, which is used to provide most of the rigid support, and simultaneously provide a zero-potential reference for each electronic component. In the example shown in FIG. 6, a metal frame may further be arranged on a periphery of the reference ground. The metal frame may be a complete closed metal frame, and may also be a metal frame interrupted by one or more slots as shown in FIG. 6. For example, in the example shown in FIG. 6, a slot 1, a slot 2, and a slot 3 may be provided at different positions on the metal frame. These slots may interrupt the metal frame, to obtain independent metal branches. In some embodiments, part or all of these metal branches may be used as radiation branches of the antenna, thereby implementing structural multiplexing in a process of arranging the antenna and reducing difficulty of arranging the antenna. When the metal branch is used as the radiation branch of the antenna, positions of the slots arranged corresponding to one or two ends of the metal branch may be flexibly selected based on arrangement of the antenna.

In the example shown in FIG. 6, one or more metal pins may further be arranged on the metal frame. In some examples, screw holes may be provided on the metal pin, to fix other structural components by screws. In some other examples, the metal pin may be coupled to a feeding point, so that when a metal branch connected to the metal pin is used as a radiation branch of the antenna, the metal pin feeds power to the antenna. In some other examples, the metal pin may further be coupled to another electronic component, to implement a corresponding electrical connection function.

In this example, the example simultaneously shows a schematic diagram of arrangement of a printed circuit board (printed circuit board, PCB) on the metal housing. A sub board design of a main board (main board) and a sub board (sub board) is used as an example. In some other examples, the main board may further be connected to the sub board, such as an L-shaped PCB design. In some embodiments of this application, the main board (such as PCB 1) may be used to carry electronic components that implement various functions of the electronic device 500. Such as a processor, a memory, a radio frequency module, or the like. The sub board (such as PCB 2) may also be used to carry the electronic components. Such as a universal serial bus (Universal Serial Bus, USB) interface and related circuits, a speak box (speak box), or the like. For another example, the sub board may further be used to carry a radio frequency circuit corresponding to an antenna arranged at a bottom part (namely, a part in a negative direction of a y axis of the electronic device).

The magnetic current loop antennas provided in embodiments of this application may all be applied to an electronic device having the composition as shown in FIG. 5 or FIG. 6.

Figure 7:
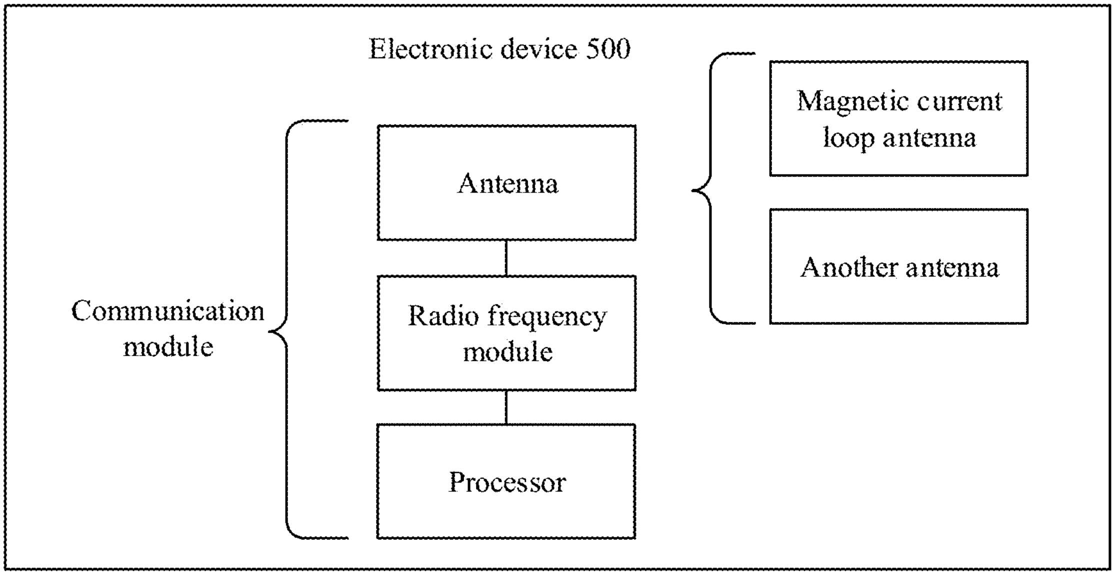
FIG. 7 is a schematic diagram of composition of an electronic device according to an embodiment of this application.

The electronic device 500 in the foregoing example is only one possible composition. In some other embodiments of this application, the electronic device 500 may further have other components. For example, to implement a wireless communication function of the electronic device 500, a communication module as shown in FIG. 7 may be arranged in the electronic device. The communication module may include an antenna, a radio frequency module that performs signal interaction with the antenna, and a processor that performs signal interaction with the radio frequency module. For example, signal interaction between the radio frequency module and the antenna may be interaction between analog signals. Signal interaction between the radio frequency module and the processor may be an analog signal or a digital signal. In some implementations, the processor may be a baseband processor.

As shown in FIG. 7, in this example, the antenna may include different forms. For example, the antenna may include a magnetic current loop antenna.

For ease of description, coordinate setting in the following example is first described. For example, coordinate setting in the following descriptions uses setting of a structure corresponding to a back view of the electronic device as an example. For example, in the back view of the electronic device, a rear camera module may be located at an upper left corner of the electronic device. Using the rear camera module as a reference, a horizontal direction away from the rear camera module may be a positive direction of an x axis, corresponding to a rightward direction. Correspondingly, a horizontal direction close to the rear camera module may be a negative direction of the x axis, corresponding to a leftward direction. The camera module may be arranged on a part of a positive direction of a y axis in a vertical direction on the electronic device, corresponding to an upward direction. Correspondingly, a direction opposite to the positive direction of the y axis is a negative direction of the y axis, corresponding to a downward direction. Based on setting of the x axis and the y axis, a positive direction of a z axis is a direction along the back of the electronic device toward the front of the electronic device (namely, a display screen), corresponding to an inward direction. Correspondingly, a negative direction of the z axis is a direction along the front of the electronic device toward the back of the electronic device, corresponding to an outward direction. In the following descriptions, setting of a coordinate system in the foregoing examples is used for description. It is to be noted that the setting of the coordinate system is for ease of description only, and does not constitute any limitation to the solution provided in embodiments of this application.

The magnetic current loop antenna provided in embodiments of this application will be described in detail below.

The magnetic current loop antenna provided in embodiments of this application, due to setting of an inductor, based on energy storage characteristics of the inductor for magnetic energy, causes a closed magnetic current to be generated close to the antenna, may generate a closed magnetic current loop in space close to the antenna during operation, and simultaneously generates an even electric field in an area close to a radiator (such as a radiation branch) of the antenna. In embodiments of this application, the even electric field may mean that in a specific space area, directions of the distributed electric field are the same, and the electric field has even intensity distribution.

Figure 8A:
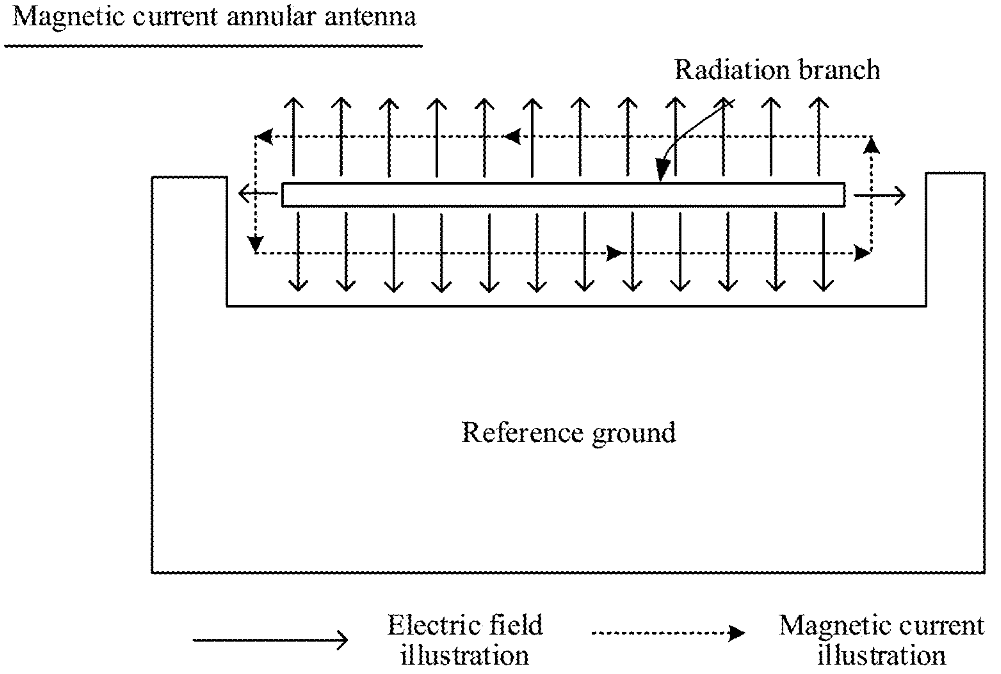
FIG. 8A is a schematic diagram of a magnetic current loop antenna according to an embodiment of this application.

For example, FIG. 8A is a schematic diagram of distribution of an electric field and a magnetic current that are close to a magnetic current loop antenna during operation according to an embodiment of this application. It is to be noted that the example in FIG. 8A is only to describe the distribution of the electric field and the magnetic current, and does not constitute any limitation on a structure and a relative position of the antenna.

As shown in FIG. 8A, the magnetic current loop antenna may include at least one radiation branch. The radiation branch may be used for radiation having radiation characteristics of the magnetic current loop antenna. The radiation characteristics of the magnetic current loop antenna described in embodiments of this application may include: generating even electric field distribution between the radiation branch and a reference ground. For example, as shown in FIG. 8A, an even downward electric field may be distributed between the radiation branch of the antenna and the reference ground. Certainly, in some other scenarios, the electric field may also be evenly distributed upward due to constant changes of a feeding signal.

As a possible implementation, the magnetic current loop antenna provided in embodiments of this application may be based on an existing electric field antenna, and the inductor is connected in series and/or in parallel on the radiation branch, and the even electric field distribution between the radiation branch and the reference ground is obtained through energy storage characteristic of the inductor for magnetic energy.

It may be understood that in a case of evenly distributed electric field characteristics, a magnetic current loop with closed characteristics may be formed in space close to the radiation branch. In other words, radiation characteristics of the magnetic current loop antenna involved in embodiments of this application may also include: generating closed magnetic current loop distribution close to the radiation branch. For example, as shown in FIG. 8A, a closed magnetic current loop along a counterclockwise direction may be formed close to the radiation branch of the antenna. Similar to the description of the electric field distribution, in some other scenarios, because the feeding signal is constantly changing, the magnetic current loop may also be closed and distributed clockwise.

Figure 8B:
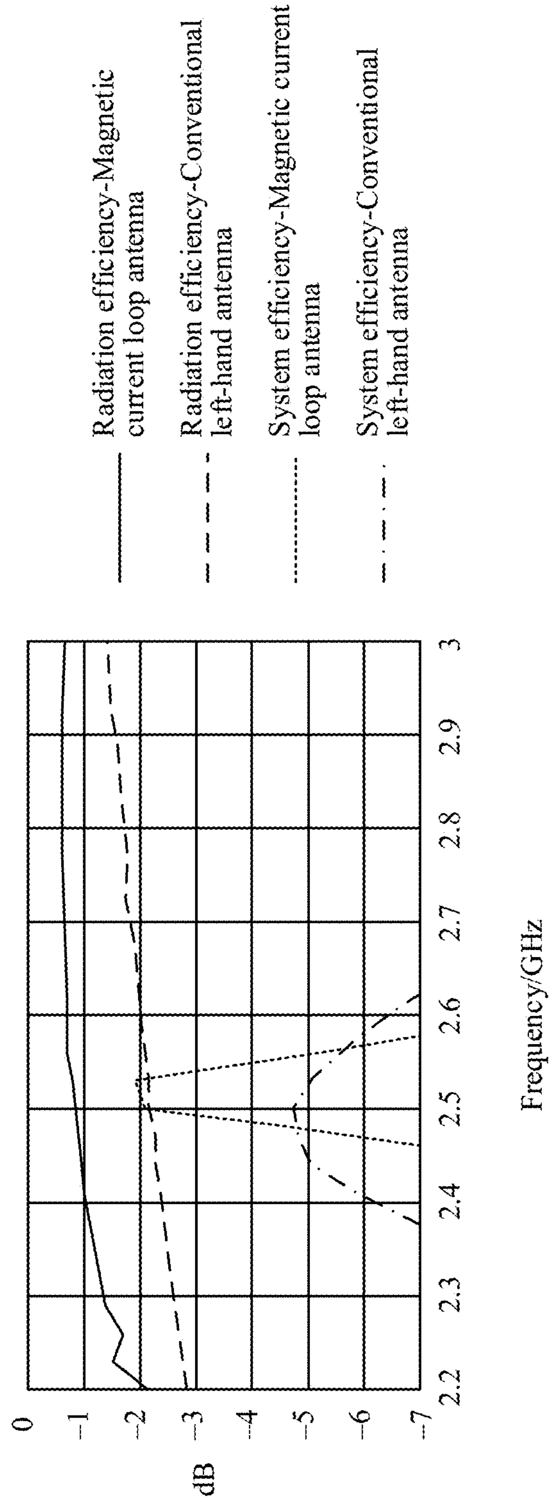
FIG. 8B is a schematic simulation diagram of efficiency of a magnetic current loop antenna according to an embodiment of this application.

Based on the foregoing description of characteristics (such as the radiation characteristics of the magnetic current loop antenna) of the magnetic current loop antenna in an operating process provided in embodiments of this application, because the magnetic current loop antenna provided in embodiments of this application may generate an even electric field (or a closed magnetic current loop) for radiation during operation, with reference to the foregoing description, the magnetic current loop antenna may provide better radiation performance than that of a general electric field antenna having a non-even electric field. For example, FIG. 8B is a schematic simulation diagram of radiation efficiency and system efficiency of a magnetic current loop antenna according to an embodiment of this application. For ease of description, efficiency illustration of an existing antenna solution (such as a left-hand antenna) under a same environment is simultaneously provided as a comparison. As shown in FIG. 8B, the radiation efficiency of the magnetic current loop antenna provided in embodiments of this application is about 1 dB higher than the radiation efficiency of the left-hand antenna in a frequency range of 2.2 GHz to 3 GHZ. Therefore, a better radiation basis may be provided. Under an antenna design corresponding to FIG. 8B, the system efficiency of the magnetic current loop antenna is also significantly improved compared with the system efficiency of the left-hand antenna. For example, from the perspective of peak value efficiency, the magnetic current loop antenna exceeds −2 dB, while peak value efficiency of the left-hand antenna is close to −5 dB.

It is to be noted that the magnetic current loop antenna provided in embodiments of this application may be directly fed (referred to as directly feeding) through a feeding component, or may be coupled and fed by arranging a feeding branch with specific characteristics. In some embodiments, using excitation of the magnetic current loop antenna by coupled feeding as an example, the feeding branch may be arranged in the even electric field area to implement the excitation of the magnetic current loop antenna. Because an electric field in an area in which the feeding branch is located is evenly distributed, the antenna is not sensitive to a position of the feeding branch, thereby significantly improving flexibility of arranging the feeding branch.

Figure 9:
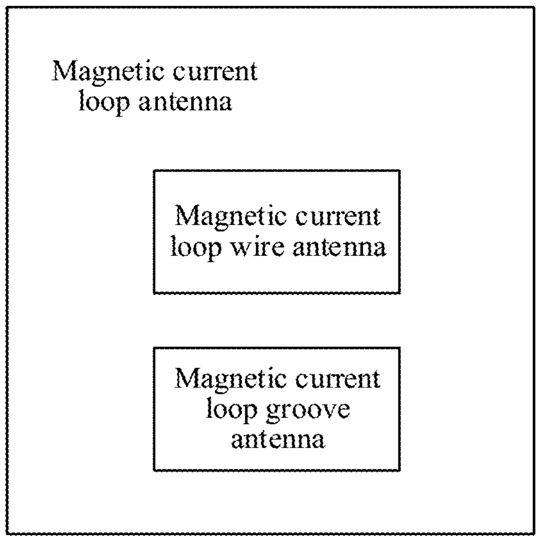
FIG. 9 is a schematic diagram of composition of a magnetic current loop antenna according to an embodiment of this application.

In different implementations, the magnetic current loop antennas provided in embodiments of this application may be divided into different types based on different morphological features. For example, as shown in FIG. 9, based on whether there is a groove or a slot in the antenna, the magnetic current loop antenna is divided into a magnetic current loop wire antenna and a magnetic current loop groove antenna. As an example, the magnetic current loop wire antenna may include a magnetic current loop monopole antenna based on a monopole antenna, a magnetic current loop dipole antenna based on a dipole, and the like. The magnetic current loop groove antenna may include a magnetic current loop slot antenna based on a slot antenna, a magnetic current loop left-hand antenna based on a left-hand antenna, and the like.

Based on distribution in the foregoing examples, structural characteristics of different types of magnetic current loop antennas are exemplarily described below with reference to FIG. 10 and FIG. 11.

Figure 10:
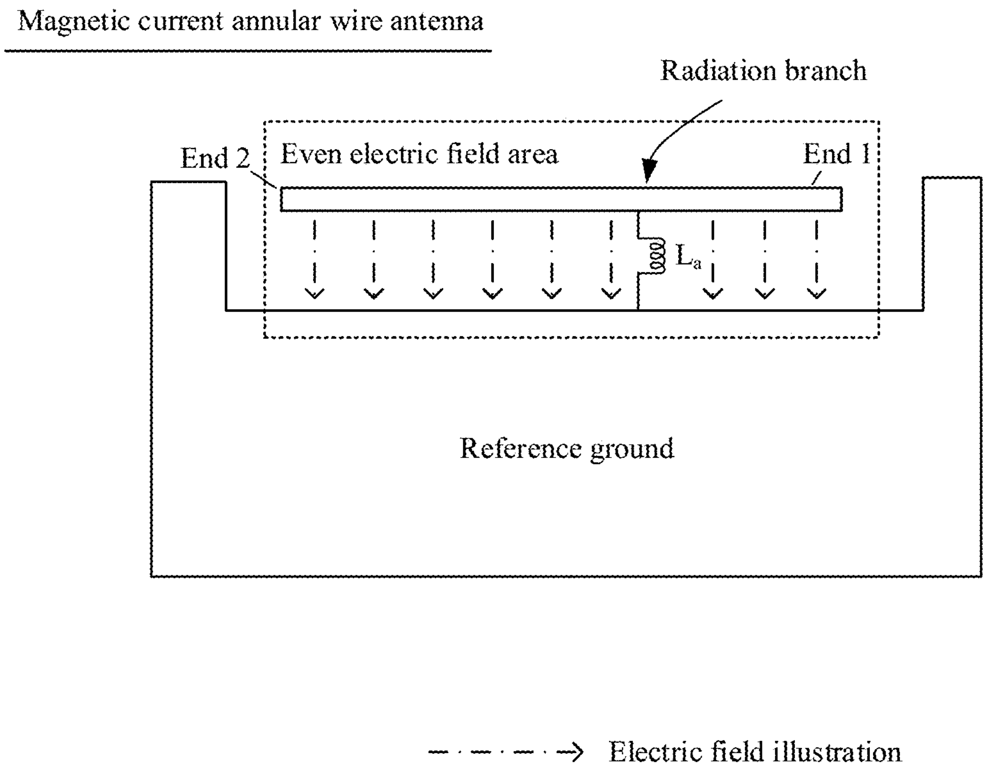
FIG. 10 is a schematic diagram of a magnetic current loop wire antenna according to an embodiment of this application.

For example, FIG. 10 is a schematic diagram of composition of a magnetic current loop wire antenna according to an embodiment of this application. To implement radiation characteristics of a magnetic current loop antenna, an inductor $L_a$ connected in parallel to the ground may be added on a radiation branch of the magnetic current loop wire antenna.

It may be understood that for a general wire antenna, electric field distribution between a radiation branch and a reference ground is not even during operation of the wire antenna (as shown in the example in FIG. 4). In embodiments of this application, by adding the inductor $L_a$ connected in parallel to ground on the radiation branch, an evenly distributed electric field may be generated during operation of the antenna. For example, for an end (such as an end 1) with a high potential on the radiation branch, through setting of the $L_a$, charge corresponding to the high potential may be introduced into the reference ground nearby, thereby effectively reducing an amount of charge on the end 1, and reducing the potential of the end 1. In addition, for an end (for example, referred to as an end 2) with a low potential on the radiation branch, through setting of the $L_a$, due to energy storage characteristics of the inductor for magnetic energy, when a current on the radiation branch is reversed due to a change of a feeding signal, a change of the current on the radiation branch is delayed compared with a change of a voltage, and then strong electric field distribution is obtained in an area (namely, an area close to the end 2) in which the electric field distribution is low. For example, while the electric field close to the end 2 becomes stronger, the electric field close to an area of the inductor $L_a$ has not weakened significantly. Therefore, an evenly distributed electric field is obtained between the end 2 and the inductor $L_a$. In this way, by setting the $L_a$, an effect of weakening the electric field close to the end 1 and strengthening the electric field close to the end 2 may be achieved. In this way, an evenly distributed electric field may be obtained between the radiation branch and the reference ground. In other words, the radiation characteristics of the magnetic current loop antenna are obtained.

It is to be noted that the example shown in FIG. 10 is only to describe structural features (such as setting the $L_a$) set for implementing the radiation characteristics of the magnetic current loop antenna in the magnetic current loop wire antenna. The structure does not constitute a structural limitation on the magnetic current loop antenna. For example, in some embodiments, a feeding point may be arranged at one end of the magnetic current loop wire antenna to form directly feeding. For example, arrangement of the feeding point is implemented by arranging a feeding component. In the following description of embodiments of this application, that arrangement of the feeding component helps implement the arrangement of the feeding point may be simply referred to as coupling to the feeding point. In some other embodiments, a feeding branch may be arranged between the radiation branch of the magnetic current loop antenna and the reference ground to form coupled feeding. In some other embodiments, a magnetic mirror boundary (Perfect Magnetic Conductor, PMC) is set on an antenna boundary (such as a magnetic boundary), and a radiator of the radiation branch of the magnetic current loop antenna is arranged on the other mirror side corresponding to the PMC, to obtain a magnetic current loop antenna in the form of a magnetic current loop dipole antenna, or the like.

The magnetic current loop wire antenna provided in this example may cover at least one operating frequency band during operation. For example, the operating frequency band may include a low band (Low band, LB), a middle band (middle band, MB), and/or a high band (high band, HB). In some embodiments, the low band may include a frequency band range of 450 M to 1 GHz. The middle band may include a frequency band range of 1 G to 3 GHZ. The high band may include a frequency band range of 3 GHz to 10 GHz. It may be understood that in different embodiments, the low band, the middle band, and the high band may include but not limited to an operating frequency band required by a Bluetooth (Bluetooth, BT) communication technology, a global positioning system (global positioning system, GPS) communication technology, a wireless fidelity (wireless fidelity, Wi-Fi) communication technology, a global system for mobile communication (global system for mobile communication, GSM) communication technology, a wideband code division multiple access (wideband code division multiple access, WCDMA) communication technology, a long term evolution (long term evolution, LTE) communication technology, a 5G communication technology, a SUB-6G communication technology, or another future communication technology. As an example, an LB frequency band may cover 450 MHz to 1 GHZ, an MB frequency band may cover 1 GHz to 3 GHz, and an HB frequency band may cover 3 GHz to 10 GHz. In some implementations, the LB, the MB, and the HB may include common frequency bands such as 5G NR, WiFi 6E, and UWB.

In a specific implementation process, the operating frequency band of the magnetic current loop wire antenna may be adjusted by adjusting an inductance value of the magnetic current loop wire antenna coupled to the ground, and/or a length of the radiator of the magnetic current loop wire antenna.

For example, when the magnetic current loop wire antenna operates at the LB, an inductance value of the $L_a$ coupled to the ground may be in a range of 5 nH to 47 nH. When the magnetic current loop wire antenna operates at the MB, an inductance value of the $L_a$ coupled to the ground may be in a range of 1 nH to 33 nH. When the magnetic current loop wire antenna operates at the HB, an inductance value of the $L_a$ coupled to the ground may be in a range of 0.5 nH to 10 nH.

In some embodiments of this application, one or more inductors may be further connected in series on the radiator of the magnetic current loop wire antenna, to cause the electric field to be more even in an operating process of the antenna, thereby improving radiation efficiency of the antenna.

For example, when the magnetic current loop wire antenna operates at the LB, an inductance value of an inductor connected in series on the radiator may be in a range of 5 nH to 47 nH. When the magnetic current loop wire antenna operates at the MB, an inductance value of an inductor connected in series on the radiator may be in a range of 1 nH to 33 nH. When the magnetic current loop wire antenna operates at the HB, an inductance value of an inductor connected in series on the radiator may be in a range of 0.5 nH to 10 nH.

It may be learnt that in the example provided in embodiments of this application, a value range of the inductor connected in series on the radiator and the inductor connected in parallel on the radiator may be similar. It is to be noted that in different implementations, if a plurality of inductors are connected in series/parallel on the antenna, an inductance value of each inductor may be in a corresponding range, and inductance values of different inductors may be the same or different.

The magnetic current loop antenna provided in embodiments of this application may further include a magnetic current loop groove antenna. FIG. 11 is a schematic diagram of composition of a magnetic current loop groove antenna according to an embodiment of this application. To implement radiation characteristics of a magnetic current loop antenna, one end (or two ends) of a radiation branch of the magnetic current loop groove antenna that is originally and directly coupled to a reference ground may be coupled to the ground through one or more newly added inductors $L_b$. FIG. 11 uses an example in which one end of a radiator of an antenna needs to be grounded (such as a left-hand antenna) for description.

It may be understood that for a general groove antenna, at least one end of a radiator of the groove antenna needs to be grounded. For example, one end of a radiator of the left-hand antenna that is away from a feeding point needs to be grounded, and for another example, two ends of a radiator of a slot antenna need to be grounded. As a result, in an area nearby in which the radiator is grounded, due to a drop in a potential on the radiator, an electric field whose intensity is significantly lower than intensity in an electric field close to an area of the feeding point appears. In other words, the electric field distribution between the radiator and the reference ground is not even.

In this example, an inductor may be connected in series on the radiator of the groove antenna. The inductor may divide the radiator of the groove antenna into two parts. Two ends of each of some radiators may be respectively coupled to the inductor and the feeding point (in a direct feed solution). One end of each of the other radiators may be coupled to the inductor, and the other end of each of the other radiators may be grounded.

Through setting of an inductor (such as $L_b$), and through energy storage characteristics of the inductor for magnetic energy, when a current on the radiation branch is reversed due to a change of a feeding signal, a change of the current is delayed compared with a change of a voltage, which makes the change of the current on the radiator between the inductor and the feeding point more sluggish than the change of the current on the general groove antenna. As a result, an even electric field is obtained around the radiator between the inductor and the feeding point. The radiation characteristics of the magnetic current loop antenna are also obtained.

Figure 11:
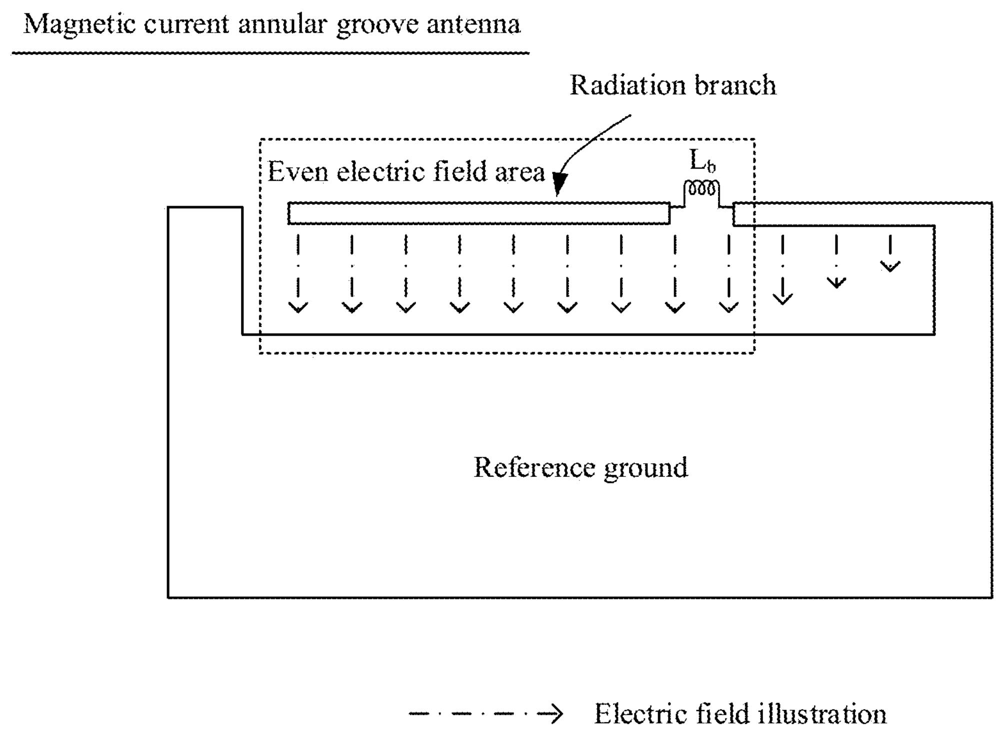
FIG. 11 is a schematic diagram of a magnetic current loop groove antenna according to an embodiment of this application.

It is to be noted that similar to the description of the magnetic current loop wire antenna in FIG. 10, in the description shown in FIG. 11 of this example, only structural characteristics (such as setting the $L_b$) are set for implementing the radiation characteristics of the magnetic current loop antenna. The structure does not constitute a structural limitation on the magnetic current loop antenna. For example, in some embodiments, one end of the magnetic current loop groove antenna that is away from a ground end may further be coupled to a feeding point to form directly feeding. In some other embodiments, a feeding branch may be arranged between the radiation branch of the magnetic current loop groove antenna and the reference ground to form coupled feeding. In some other embodiments, a PMC is set on an antenna boundary (such as a magnetic boundary), and a radiator of a radiation branch of the magnetic current loop antenna is arranged on the other mirror side corresponding to the PMC, to obtain a magnetic current loop groove antenna in the form of a magnetic current loop slot antenna, or the like.

The magnetic current loop groove antenna provided in this example may also cover at least one operating frequency band among the LB, the MB, and/or the HB.

In a specific implementation process, adjustment of the operating frequency band of the magnetic current loop groove antenna may be implemented by adjusting the inductor $L_b$ connected in series on the radiator of the magnetic current loop groove antenna.

For example, when the magnetic current loop groove antenna operates at the low band (LB), an inductance value of the inductor $L_b$ may be in a range of 5 nH to 47 nH. When the magnetic current loop groove antenna operates at the MB, an inductance value of the inductor $L_b$ may be in a range of 1 nH to 33 nH. When the magnetic current loop groove antenna operates at the HB, an inductance value of the inductor $L_b$ may be in a range of 0.5 nH to 10 nH.

It may be learnt that with reference to the foregoing description of the magnetic current loop wire antenna, in this example, a value range of the inductor $L_b$ arranged on the magnetic current loop groove antenna may be close to a value range of the inductor $L_a$.

In some embodiments of this application, one or more inductors may be further connected in series on the radiator of the magnetic current loop groove antenna, to cause the electric field to be more even in an operating process of the antenna, thereby improving radiation efficiency of the antenna.

For example, when the magnetic current loop groove antenna operates at the low band, an inductance value of an inductor connected in series on the radiator may be in a range of 5 nH to 47 nH. When the magnetic current loop groove antenna operates at the MB, an inductance value of an inductor connected in series on the radiator may be in a range of 1 nH to 33 nH. When the magnetic current loop groove antenna operates at the HB, an inductance value of an inductor connected in series on the radiator may be in a range of 0.5 nH to 10 nH.

The magnetic current loop antenna (such as the magnetic current loop wire antenna, or the magnetic current loop groove antenna) provided in embodiments of this application may be excited through directly feeding or coupled feeding.

As an example, directly feeding may be implemented by directly arranging the feeding point on the radiation branch. The feeding point may be one end of a feeding module, and the other end of the feeding module may be coupled to a radio frequency microstrip line. When performing signal feeding, a radio frequency module may transmit a radio frequency signal to the feeding module through the radio frequency microstrip line. The feeding module may transmit the radio frequency signal to a radiator of an antenna (such as the radiation branch of the magnetic current loop antenna), so that the radio frequency signal may be converted into an electromagnetic wave by the radiator of the antenna for transmission. The feeding module may be implemented in the form of a metal thimble, a metal shrapnel, or the like. A specific implementation of the feeding module is not limited in embodiments of this application. A feeding implementation in this example may be applied to any magnetic current loop antenna that is directly fed in the following examples.

It is to be noted that to obtain an operating effect of the even electric field, in some embodiments of this application, using the magnetic current loop antenna that is directly fed as an example, a position of the inductor arranged on the radiator of the antenna may be further limited.

For example, for the magnetic current loop wire antenna that is directly fed, a distance between the inductor $L_a$ arranged on the radiator of the antenna and the feeding point may be between a ⅛ wavelength and a 1-fold wavelength of an operating wavelength. Correspondingly, for the magnetic current loop groove antenna that is directly fed, a distance between the inductor L; arranged on the radiator of the antenna and the feeding point may also be between the ⅛ wavelength and the 1-fold wavelength of the operating wavelength.

In addition, in some other embodiments, for the magnetic current loop antenna in a coupled feeding scenario, arrangement of the inductor also conforms to a limitation of the foregoing distance range, and the part of description is described in detail with reference to a specific structure in subsequent examples.

Through the foregoing examples shown in FIG. 10 and FIG. 11, a person skilled in the art should be able to have a comprehensive understanding of composition characteristics of the magnetic current loop antenna provided in embodiments of this application. The magnetic current loop antenna provided in embodiments of this application has different response characteristics for a dielectric loss and a magnetic medium loss of implementation materials used for the magnetic current loop antenna. Based on the different response characteristics, the magnetic current loop antenna may be adjusted. For example, radiation efficiency of the magnetic current loop antenna is optimized.

Figure 12:
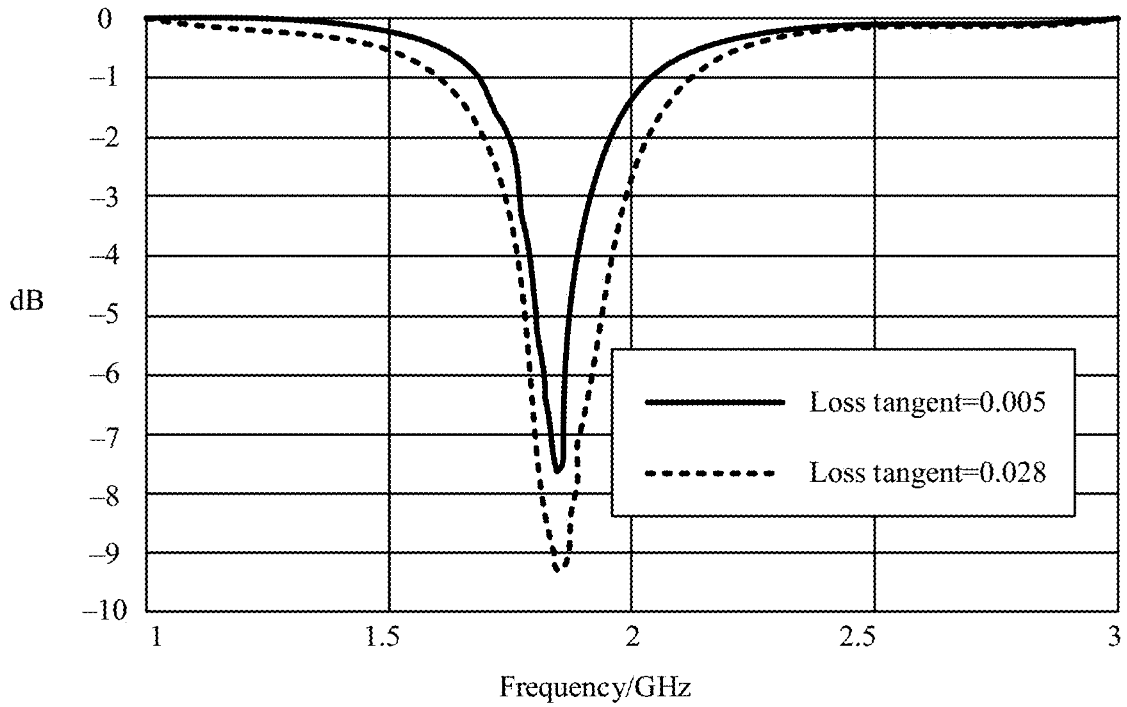
FIG. 12 is a schematic S11 simulation diagram under different dielectric losses according to an embodiment of this application.
Figure 13:
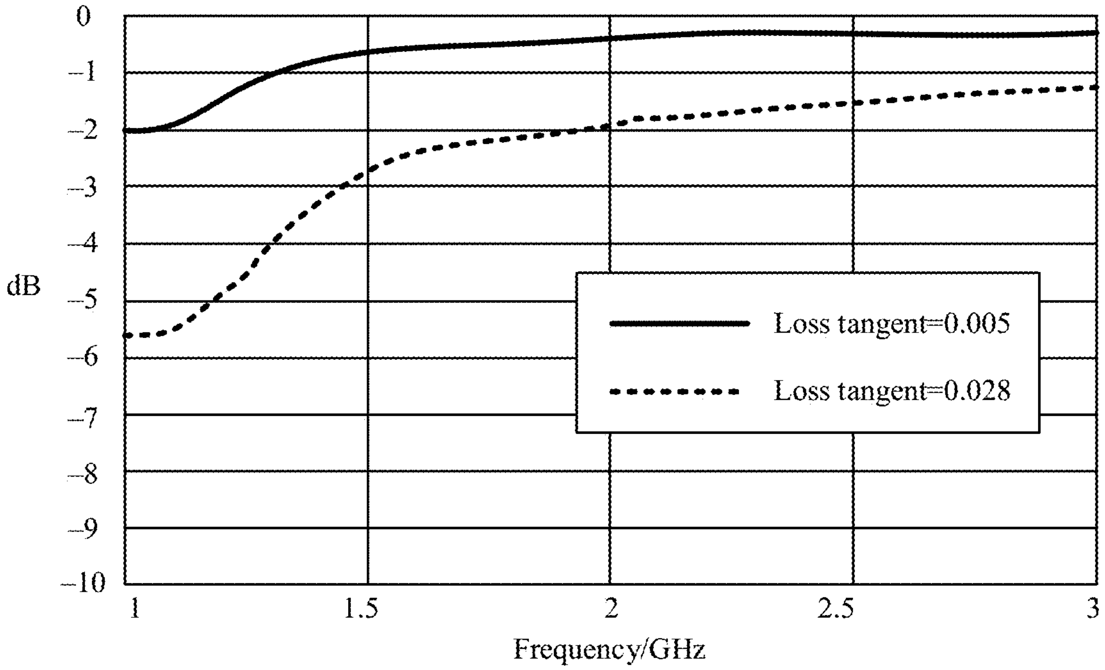
FIG. 13 is a schematic simulation diagram of efficiency under different dielectric losses according to an embodiment of this application.
Figure 13:
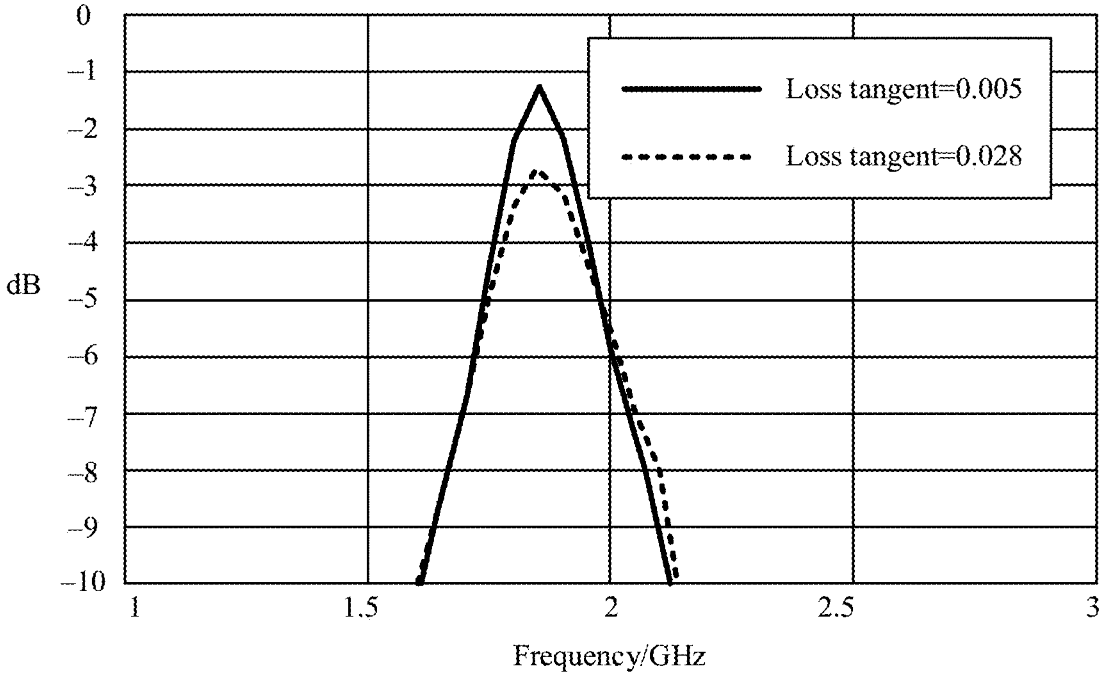

For example, influence of the dielectric loss on the magnetic current loop antenna is described with reference to FIG. 12 and FIG. 13. FIG. 12 is a schematic diagram of comparison of a return loss (S11) with different dielectric losses, and FIG. 13 is a schematic diagram of comparison of radiation efficiency and system efficiency with different dielectric losses. Different dielectric losses may be identified by different dielectric loss tangents. In this example, radiation differences of the antenna are compared when the other conditions are the same, and an antenna material uses a dielectric loss tangent of 0.005 and a loss tangent of 0.028. As shown in FIG. 12, the smaller the dielectric loss tangent, the lower a bandwidth and a depth of S11 to a certain extent. As shown in (a) in FIG. 13, the smaller the dielectric loss tangent, the higher the radiation efficiency. Similarly, as shown in (a) in FIG. 13, the smaller the dielectric loss tangent, the higher the system efficiency. It indicates that as the dielectric loss increases, more energy will be lost. On S11, resonance becomes wider and deeper, and corresponding efficiency decreases. Therefore, for the magnetic current loop antenna, using a material with a small dielectric loss may effectively reduce the loss and improve the radiation performance of the antenna.

Figure 14:
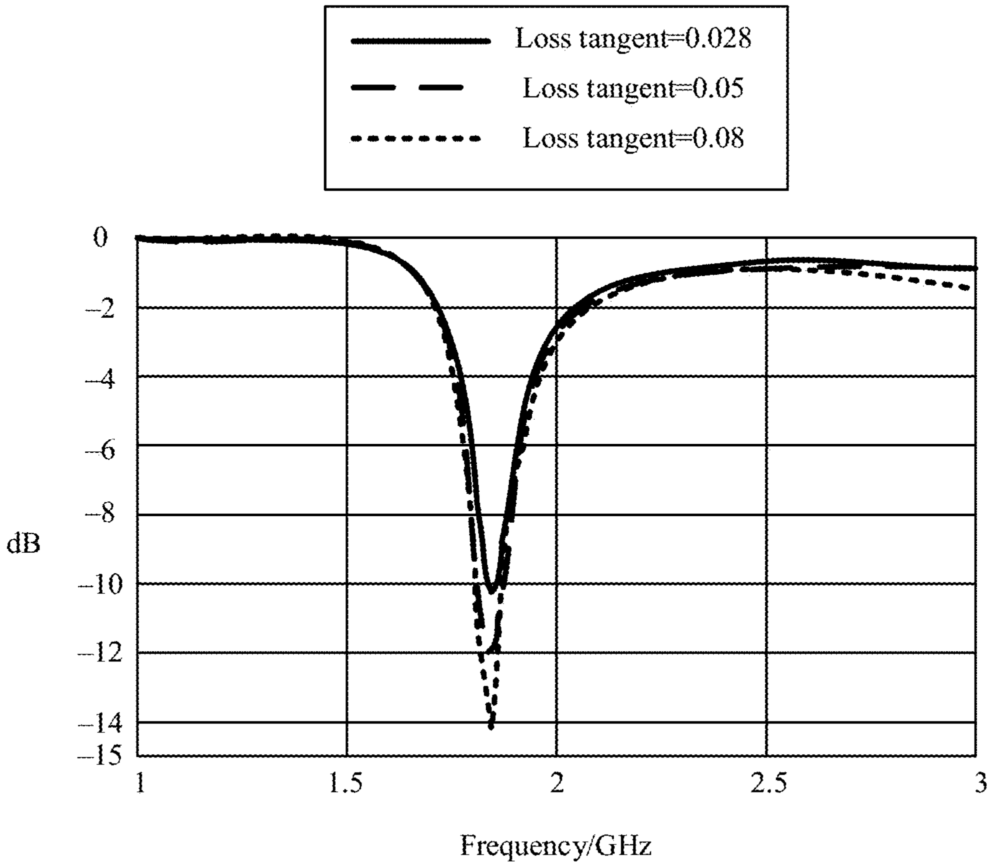
FIG. 14 is a schematic S11 simulation diagram under different magnetic medium losses according to an embodiment of this application.
Figure 15:
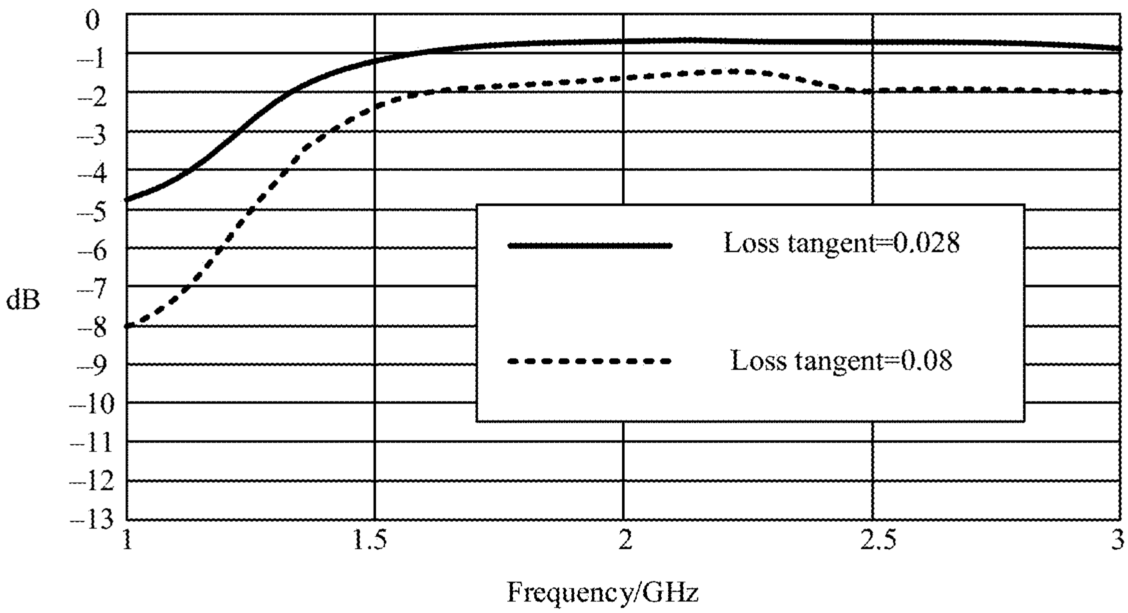
FIG. 15 is a schematic simulation diagram of efficiency under different magnetic medium losses according to an embodiment of this application.
Figure 15:
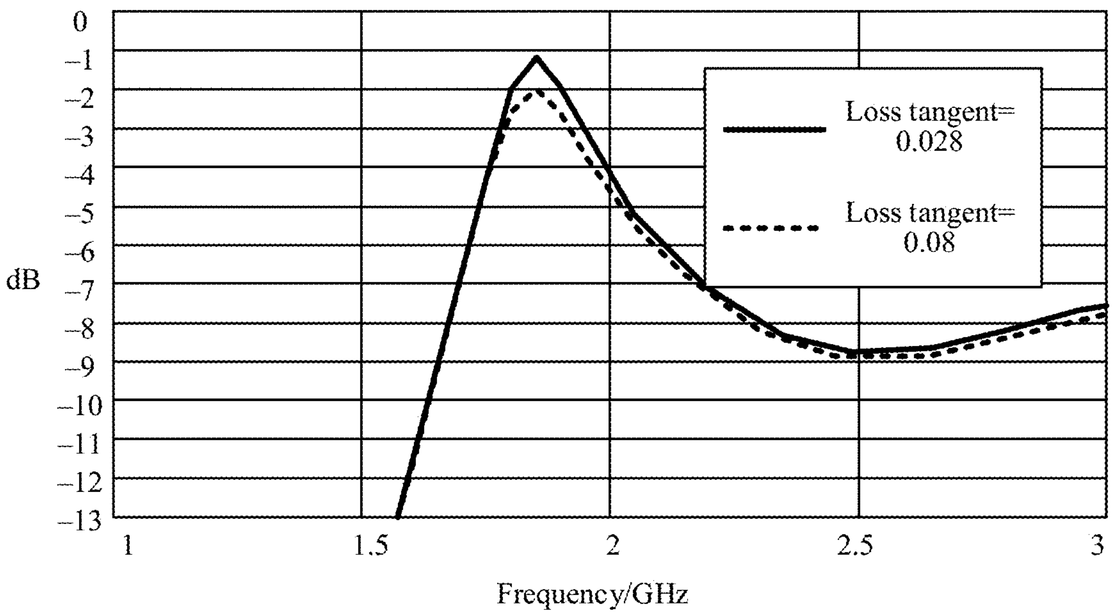

Influence of the magnetic medium loss on the magnetic current loop antenna is described with reference to FIG. 14 and FIG. 15. FIG. 14 is a schematic diagram of comparison of a return loss (S11) with different magnetic medium losses, and FIG. 15 is a schematic diagram of comparison of radiation efficiency and system efficiency with different magnetic medium losses. Different magnetic medium losses may be identified by different magnetic medium loss tangents. In this example, radiation differences of the antenna are compared when the other conditions are the same, and an antenna material uses a magnetic medium loss tangent of 0.028, 0.05, and 0.08. As shown in FIG. 14, the smaller the magnetic medium loss tangent, the lower a bandwidth and a depth of S11 to a certain extent. As shown in (a) in FIG. 15, the smaller the magnetic medium loss tangent, the higher the radiation efficiency. Similarly, as shown in (a) in FIG. 15, the smaller the magnetic medium loss tangent, the higher the system efficiency. It indicates that as the magnetic medium loss increases, more energy will be lost. On S11, resonance becomes wider and deeper, and corresponding efficiency decreases.

With reference to the influence of the dielectric loss on the magnetic current loop antenna shown in FIG. 12 (FIG. 13), and the influence of the magnetic medium loss on the magnetic current loop antenna shown in FIG. 14 (FIG. 15). It may be learnt that although the increase of the magnetic medium loss also affects radiation of the magnetic current loop antenna, the increase of the dielectric loss has a more obvious impact on the radiation of the magnetic current loop antenna. In other words, for the magnetic current loop antenna used as an electric field antenna, when selecting a material, a material with a small dielectric loss may be preferentially selected to implement an antenna structure.

Figure 16:
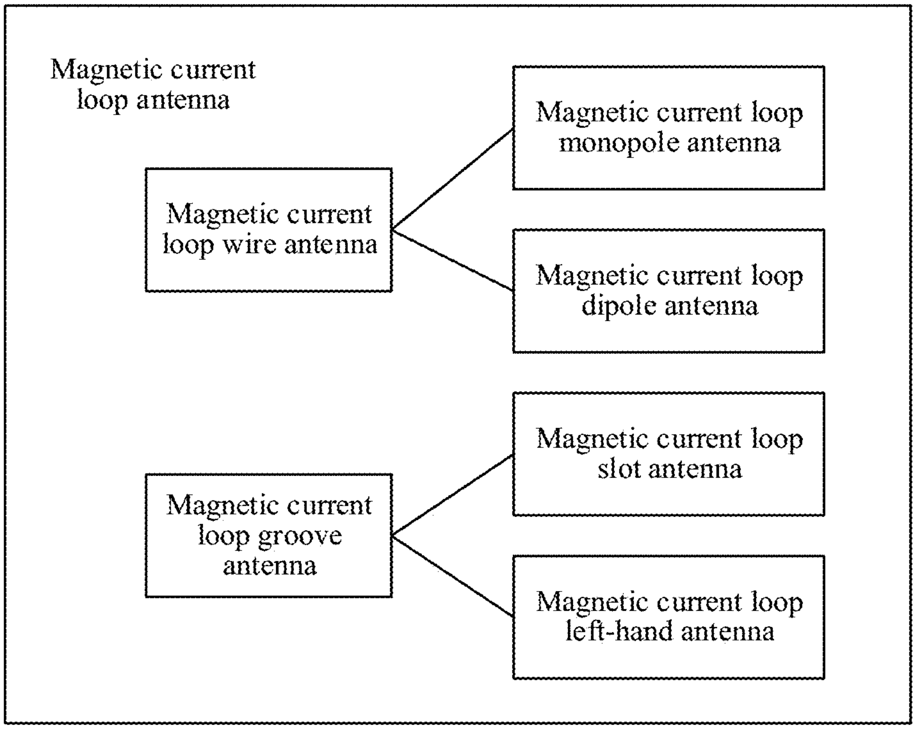
FIG. 16 is a schematic diagram of classification of a magnetic current loop antenna according to an embodiment of this application.

With reference to the foregoing description, FIG. 16 shows a logical division of a magnetic current loop antenna provided in embodiments of this application. For example, a magnetic current loop wire antenna included in the magnetic current loop antenna may include a magnetic current loop monopole antenna and a magnetic current loop dipole antenna. A magnetic current loop groove antenna included in the magnetic current loop antenna may include a magnetic current loop slot antenna and a magnetic current loop left-hand antenna.

Composition features and radiation conditions of the foregoing four existing magnetic current loop antennas will be described below with reference to the accompanying drawings. It is to be noted that the four existing magnetic current loop antennas are only four specific implementations of the magnetic current loop antenna provided in embodiments of this application. In other embodiments, composition forms of the antenna with other compositions conforming to radiation characteristics of the magnetic current loop antenna shown in FIG. 8A should also fall within the protection scope of embodiments of this application.

In the following descriptions, a case in which the magnetic current loop antenna operates in a fundamental mode is used as an example for description. It may be understood that a case in which the magnetic current loop antenna operates at a fold frequency (namely, a high-order mode) corresponding to the fundamental mode may be simply deduced from a size limit corresponding to the fundamental mode and inductor arrangement. Therefore, a magnetic current loop antenna corresponding to the high-order mode should also fall within the scope of protection of the solution provided in embodiments of this application.

First, using a feeding manner of directly feeding as an example, composition and operating conditions of various magnetic current loop antennas are described.

Figure 17:
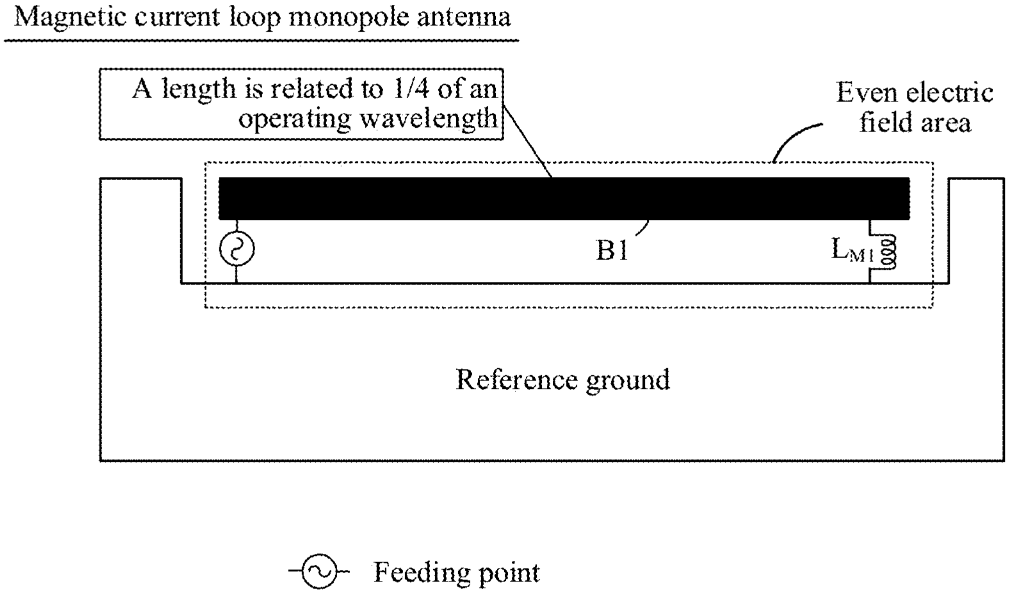
FIG. 17 is a schematic diagram of a magnetic current loop monopole antenna according to an embodiment of this application.

FIG. 17 is a schematic diagram of composition of a magnetic current loop monopole antenna according to an embodiment of this application.

As shown in FIG. 17, the magnetic current loop monopole antenna shown in this example may include one radiation branch, for example, the radiation branch may be a branch 1 as shown in FIG. 17, referred to as B1 for short. One end of the B1 may be coupled to a feeding point. The other end of the B1 may be grounded through an inductor $L_{M1}$. In different embodiments, a setting position of the inductor $L_{M1}$ on the radiation branch may be flexible. For example, a value range of the inductor $L_{M1}$ may refer to a range of $L_a$, which is also an inductor connected in parallel in the foregoing description, and will not be repeated herein. In addition, in some embodiments of this application, in an operating scenario of the fundamental mode in this example, a distance between the inductor $L_{M1}$ and the feeding point may be greater than or equal to a ⅛ wavelength of an operating wavelength. In an operating scenario of the high-order mode, the distance between the inductor $L_{M1}$ and the feeding point may be greater, for example, between a ⅛ wavelength and a 1-fold wavelength of the operating wavelength.

In embodiments of this application, a length of the radiation branch of the magnetic current loop monopole antenna may be related to an operating frequency band. For example, in an operating scenario of the fundamental mode in this example, a length of the B1 may be less than ¼ of a wavelength (for example, referred to as the operating wavelength) corresponding to the operating frequency band. Correspondingly, in an operating scenario of the high-order mode, the length of the B1 may be greater than ¼ of the operating wavelength. For example, in a 2-fold frequency scenario, the length of the B1 may be less than ½ of the operating wavelength. For another example, in a 3-fold frequency scenario, the length of the B1 may be less than ¾ of the operating wavelength. The rest is deduced by analogy.

A wavelength corresponding to the operating frequency band may be a wavelength of a central frequency point of the operating frequency band. It is to be noted that with reference to the foregoing description, a case in which the length of the B1 is less than ¼ of the operating wavelength means that the magnetic current loop antenna operates in a state of an eigenmode (namely, a 1-fold frequency). If the magnetic current loop antenna operates in the high-order mode (such as a 2-fold frequency, a 3-fold frequency, or the like), the length of the B1 may also be correspondingly lengthened, such as lengthening to a size close to the operating wavelength. In the scenario, the distance between the inductor $L_{M1}$ and the feeding point may be set to be slightly less than a 1-fold operating wavelength.

Figure 18:
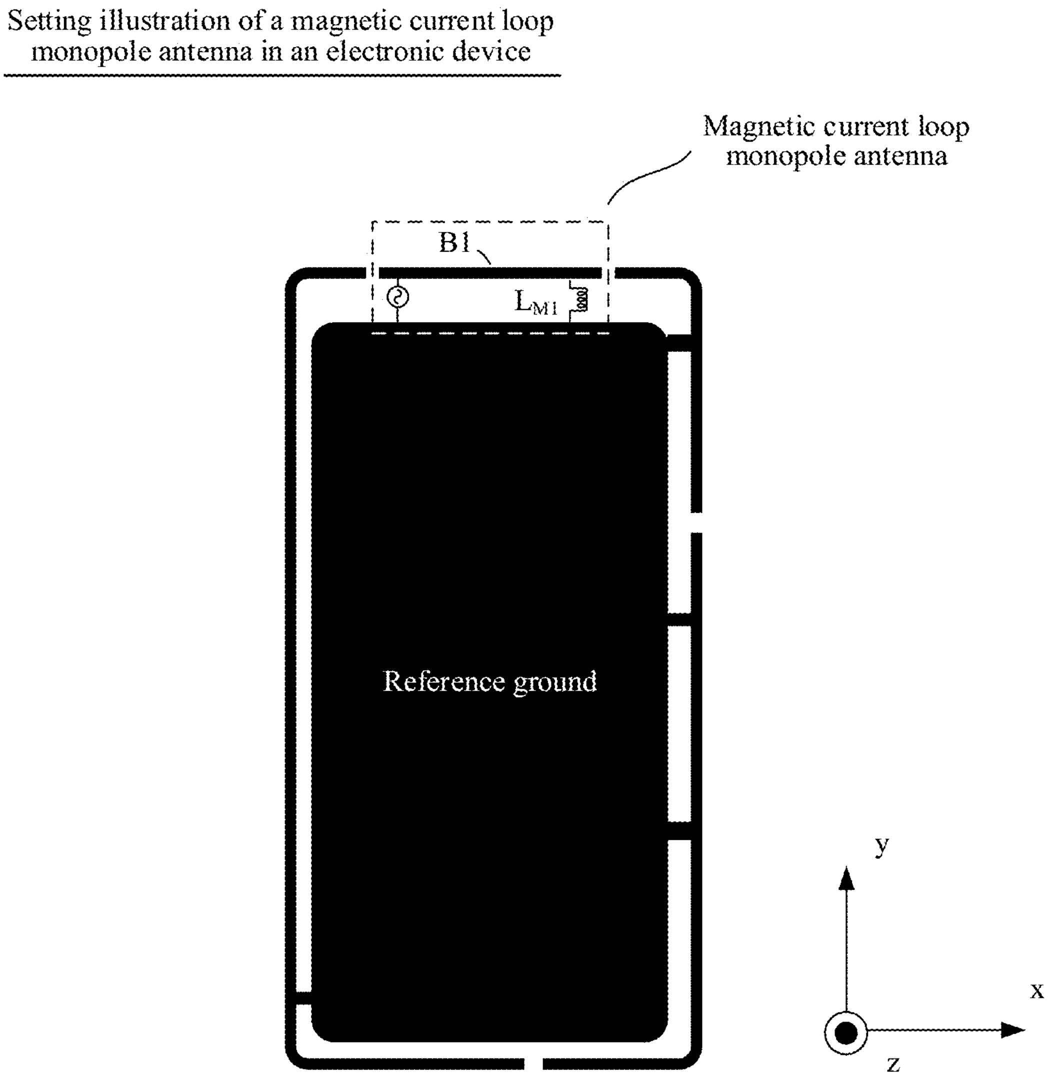
FIG. 18 is a schematic diagram of setting of a magnetic current loop monopole antenna in an electronic device according to an embodiment of this application.

The magnetic current loop monopole antenna provided in embodiments of this application may be arranged in an electronic device, to support a wireless communication function of the electronic device. For example, with reference to strong electric field distribution of the floor eigenmode shown in FIG. 2, the magnetic current loop monopole antenna provided in this example used as an electric field antenna may be arranged in a strong electric field area of a floor corresponding to the operating frequency band, to excite the floor to perform better radiation, thereby enabling the magnetic current loop monopole antenna to obtain better radiation performance. As an example, FIG. 18 shows an arrangement condition of a magnetic current loop monopole antenna in an electronic device. In this example, an example in which the magnetic current loop monopole antenna operates at a medium frequency is used. Therefore, by arranging the magnetic current loop monopole antenna on the top of the electronic device, medium frequency radiation on the floor may be better excited, thereby obtaining better radiation performance.

Figure 19:
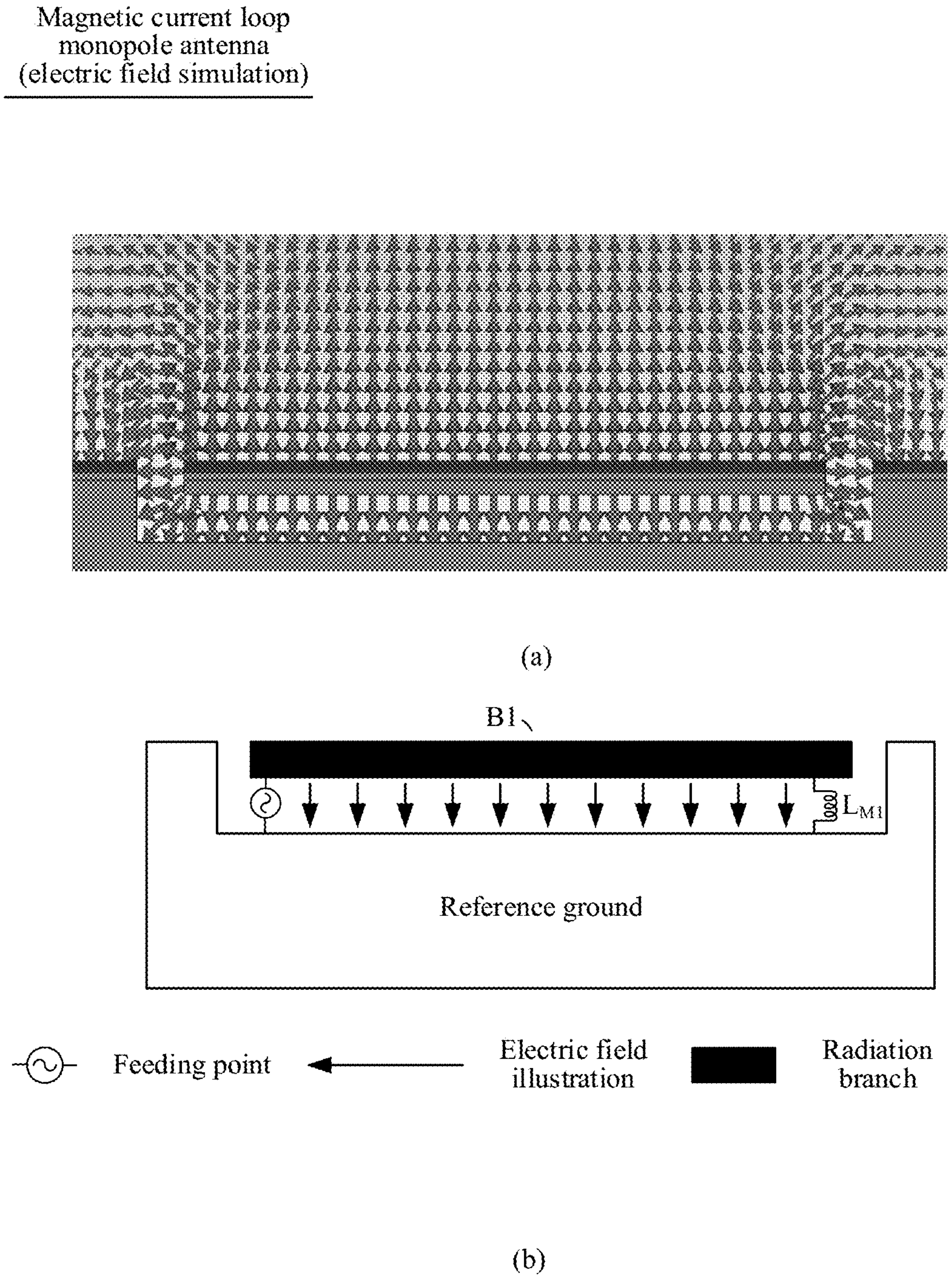
FIG. 19 is a schematic simulation diagram of an electric field of a magnetic current loop monopole antenna according to an embodiment of this application.

As a possible implementation of a magnetic current loop antenna, a magnetic current loop monopole antenna with the composition shown in FIG. 17 provided in this example may generate an even electric field close to a radiator of an antenna during operation. For example, FIG. 19 is a schematic simulation diagram of an electric field in an operating scenario of a magnetic current loop monopole antenna according to this example. (a) in FIG. 19 shows illustration of an actual simulation result. For a clearer description, (b) in FIG. 19 shows logical illustration of electric field distribution. It may be learnt that when the magnetic current loop monopole antenna is operating, an evenly distributed electric field may be generated between a radiation branch and a reference ground. Therefore, the magnetic current loop monopole antenna conforms to radiation characteristics of a magnetic current loop antenna.

The magnetic current loop monopole antenna provided in embodiments of this application may generate an evenly distributed electric field around a radiator of an antenna, and simultaneously also has better radiation performance for covering at least one operating frequency band.

For example, a radiation condition of the magnetic current loop monopole antenna will be described below with reference to the simulation result in FIG. 20 and FIG. 21.

Figure 20:
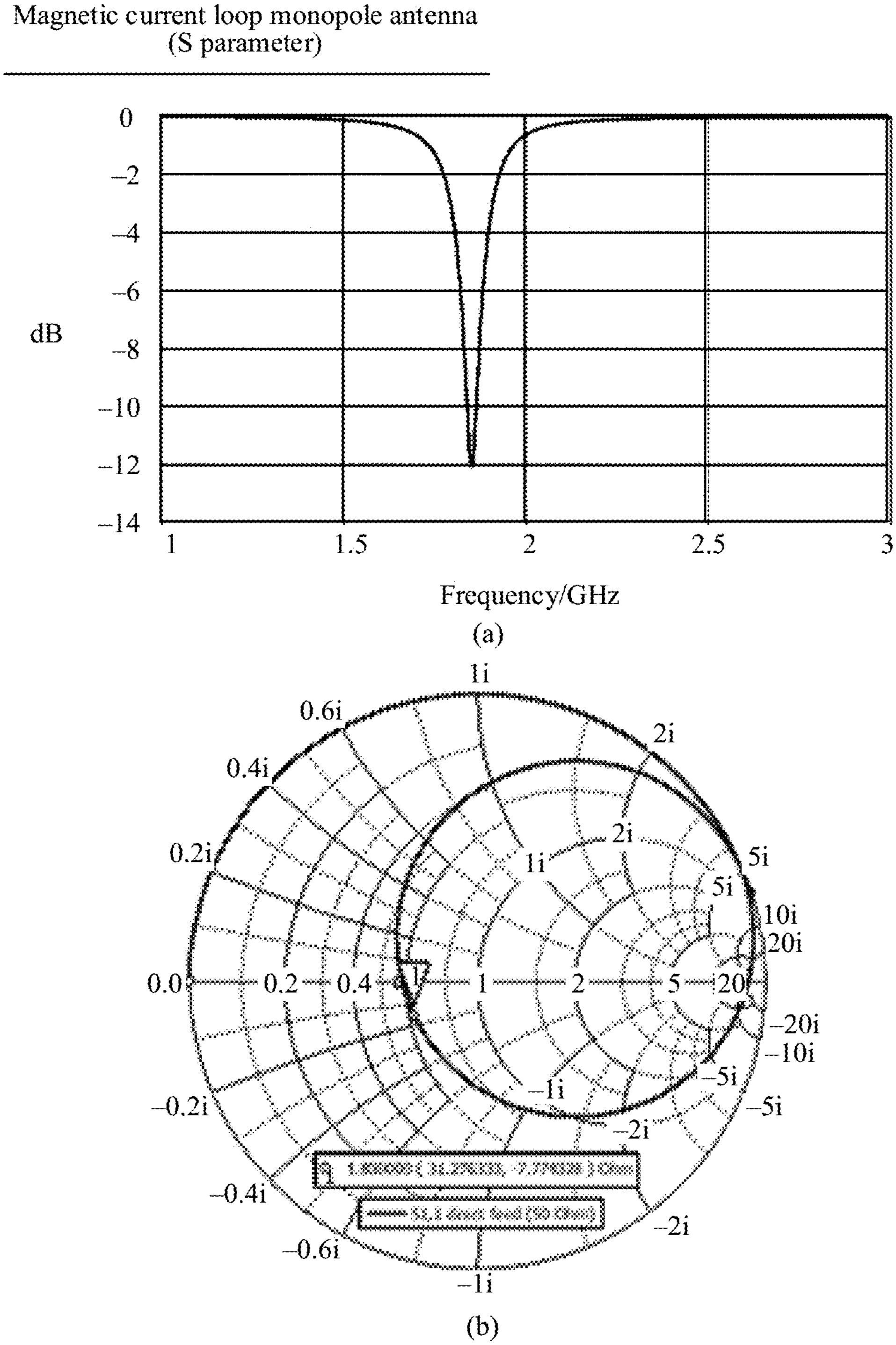
FIG. 20 is a schematic simulation diagram of an S parameter of a magnetic current loop monopole antenna according to an embodiment of this application.

FIG. 20 is a schematic simulation diagram of an S parameter of a magnetic current loop monopole antenna according to an embodiment of this application. As shown in (a) in FIG. 20, the magnetic current loop monopole antenna in this example may generate one resonance around 1.8 GHz. A bandwidth of −2 dB of the resonance on S11 is at least 100 MHz, and the deepest point reaches −12 dB. As shown in (b) in FIG. 20, in a case that without any matching circuit, the magnetic current loop monopole antenna provided in embodiments of this application has better port matching characteristics on a Smith (Smith) chart. Therefore, the magnetic current loop monopole antenna provided in embodiments of this application may save space occupied by a matching circuit in a configuration process.

Figure 21:
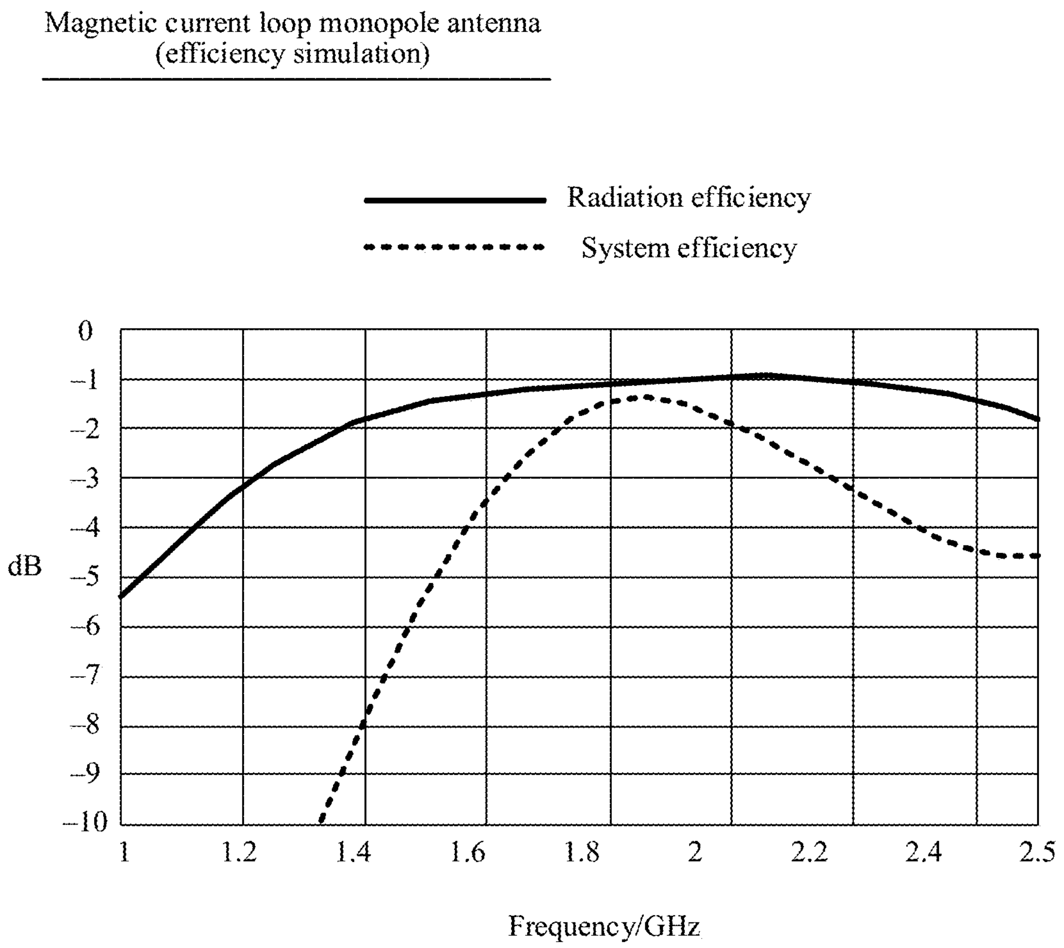
FIG. 21 is a schematic simulation diagram of efficiency of a magnetic current loop monopole antenna according to an embodiment of this application.

FIG. 21 is a schematic diagram of efficiency of a magnetic current loop monopole antenna according to an embodiment of this application. It may be learnt that radiation efficiency between 1.4 GHz and 2.5 GHz is above −2 dB, a corresponding system efficiency peak value is also close to −1 dB, and the bandwidth of −2 dB is close to 400 MHZ. Therefore, the magnetic current loop monopole antenna provided in embodiments of this application may cover at least one operating frequency band, to achieve an effect of effectively supporting a wireless communication function of an electronic device.

With reference to the foregoing description, a person skilled in the art should be able to have an accurate understanding of the magnetic current loop monopole antenna provided in embodiments of this application. The solution provided in embodiments of this application will be described below with reference to a current distribution condition of the magnetic current loop monopole antenna during operation.

Figure 22:
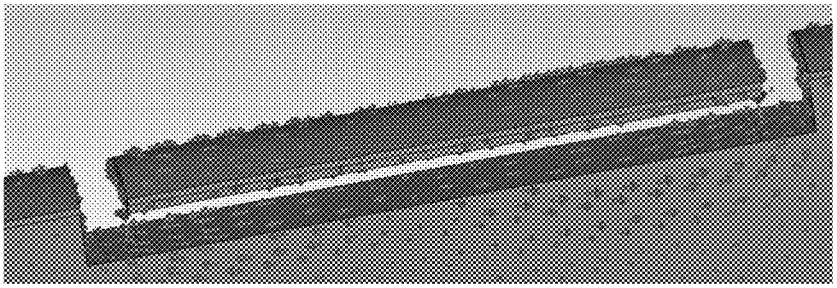
FIG. 22 is a schematic simulation diagram of a current of a magnetic current loop monopole antenna according to an embodiment of this application.
Figure 22:
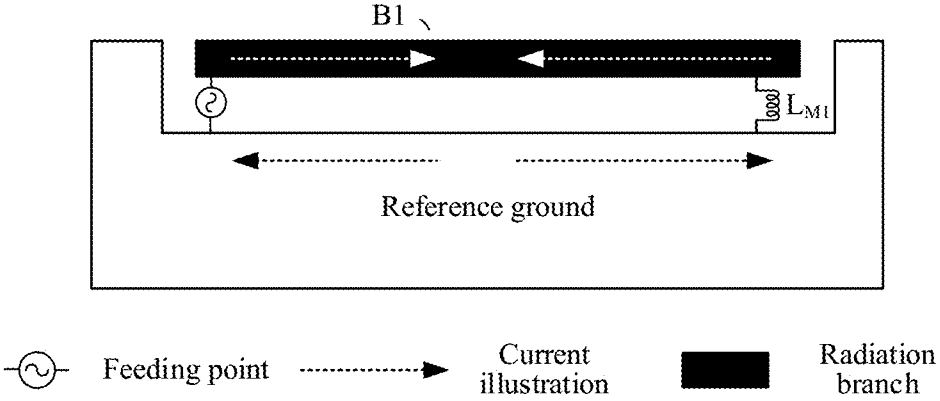

For example, FIG. 22 is a schematic simulation diagram of a current of a magnetic current loop monopole antenna according to an embodiment of this application. (a) in FIG. 22 is an actual simulation result. For the convenience of description, (b) in FIG. 22 shows logical distribution illustration of a current corresponding to (a) in FIG. 22. As shown in FIG. 22, with composition as shown in FIG. 17 of the magnetic current loop monopole antenna, during operation, even in a ¼ wavelength mode, a reverse current also appears on a radiation branch (or a floor) of the reverse current. For example, in this example, a current on the radiation branch is used as an example. A primary reverse current may be distributed on the radiation branch between an inductor $L_{M1}$ and a feeding point. However, when a general monopole antenna (such as an ILA antenna) operates in the ¼ wavelength mode, the reverse current does not appear on a radiator. It may be understood that with reference to the foregoing description of the magnetic current loop wire antenna, in this example, by setting the inductor $L_{M1}$ at one end of the radiator that is away from the feeding point, through energy storage characteristics of the inductor $L_{M1}$ for magnetic energy, a change of a current is later than a change of a voltage, so that in a case that a current close to the feeding point has been reversed (to the right as shown in (b) in FIG. 22), the current close to the inductor $L_{M1}$ still maintains a previous direction (to the left as shown in (b) in FIG. 22). This creates a reverse current on the radiator. Generation of the reverse current may effectively adjust electric field distribution between the radiator and the reference ground, to obtain even electric field distribution. The radiation characteristics of the magnetic current loop antenna are also obtained.

Figure 23:
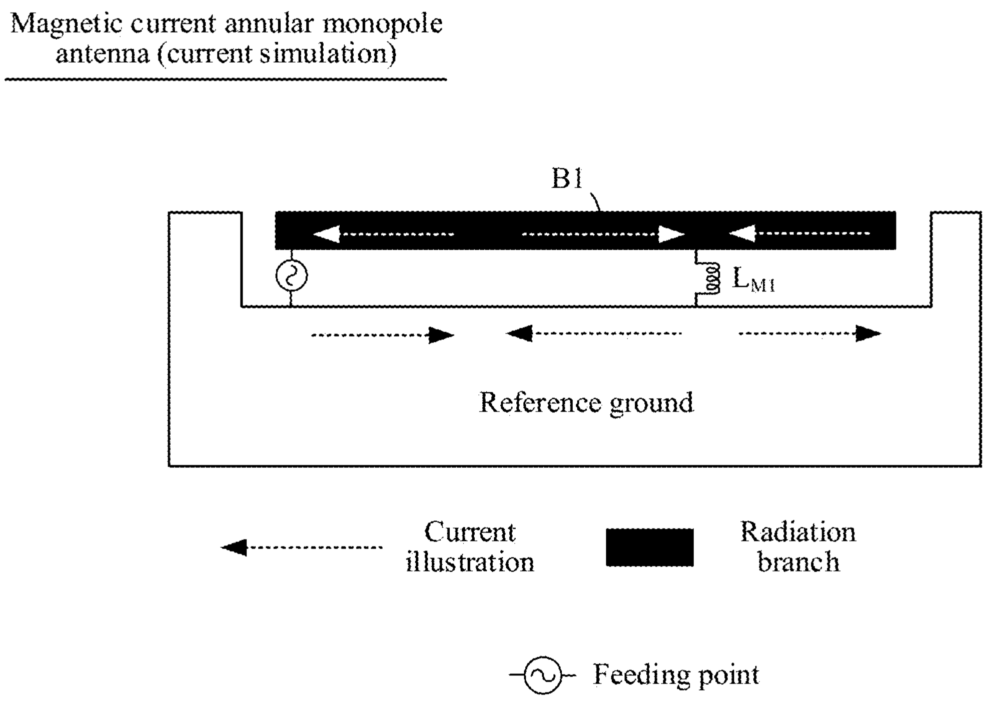
FIG. 23 is a schematic simulation diagram of a current of a magnetic current loop monopole antenna according to an embodiment of this application.

In the foregoing example, an example in which the inductor $L_{M1}$ is arranged at an end away from the feeding point is used for description. In some other embodiments of this application, the inductor $L_{M1}$ may further be arranged at another position on the radiation branch. For example, FIG. 23 is a schematic diagram of still another magnetic current loop monopole antenna. In this example, the inductor $L_{M1}$ may be arranged at a position close to an end of a non-feeding point. Similar to the example in FIG. 22, a reverse current may be formed on the radiator between the inductor $L_{M1}$ and the feeding point. For the inductor $L_{M1}$ and a radiator at an end on a right side, with reference to the foregoing description about the magnetic current loop wire antenna, the inductor $L_{M1}$ may reduce a potential of a position at which the radiator coupled to the inductor is located, thereby reducing a potential at an end of the magnetic current loop antenna. In other words, a current at an end of the antenna may return to the ground through the inductor $L_{M1}$ (namely, a leftward current as shown in FIG. 23). Therefore, a more evenly distributed electric field may be formed on a right side of the inductor $L_{M1}$.

With reference to the foregoing examples in FIG. 22 and FIG. 23, it may be learnt that in the magnetic current loop monopole antenna provided in this example, a configuration position of the inductor $L_{M1}$ is very flexible. Different configuration positions of the inductor $L_{M1}$ do not affect a distribution area of the even electric field of the magnetic current loop monopole antenna, to be specific, including at least an area between the radiation branch and the reference ground.

Figure 24:
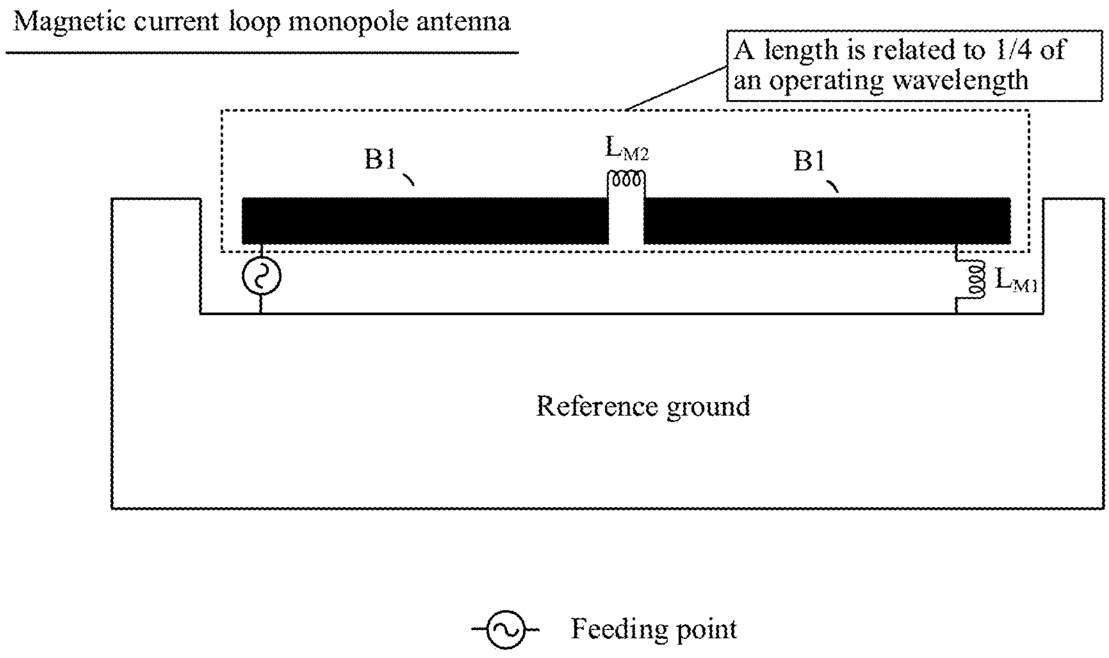
FIG. 24 is a schematic diagram of a magnetic current loop monopole antenna according to an embodiment of this application.

It is to be noted that in some other embodiments of this application, at least one inductor may further be connected in series on the radiator of the magnetic current loop monopole antenna. For example, as shown in FIG. 24, an inductor $L_{M2}$ may be connected in series on the radiator of the magnetic current loop monopole antenna, to cause the electric field distribution to be more even and improve the radiation efficiency of the magnetic current loop monopole antenna. In different implementations of this application, setting of a position of the inductor connected in series on the radiator and setting of a quantity of inductors may be flexibly selected based on actual needs. This is not limited in embodiments of this application. For example, a value range of the inductor $L_{M2}$ may refer to a range of $L_b$, which is also an inductor connected in series in the foregoing description, and will not be repeated herein.

In different specific implementation processes, a specific implementation of the magnetic current loop monopole antenna having any composition as shown in FIG. 17 to FIG. 24 may be different. For example, in some embodiments, radiation branches of the magnetic current loop monopole antenna may be fully or partially multiplexed by a metal frame of the electronic device. In some other embodiments, the radiation branch of the magnetic current loop monopole antenna may also be implemented in a form such as a flexible printed circuit (Flexible Printed Circuit, FPC), and a metal frame diecasting for anodic oxidation (Metal frame Diecasting for Anodicoxidation, MDA). A specific implementation form of the magnetic current loop monopole antenna is not limited in embodiments of this application.

The foregoing describes the solution of the magnetic current loop antenna provided in embodiments of this application with reference to the magnetic current loop monopole antenna. An example in which the magnetic current loop antenna is used as a magnetic current loop dipole antenna as an example, the description of the magnetic current loop antenna provided in embodiments of this application will be continued below.

It may be understood that an existing monopole antenna implements radiation through a radiation structure of a ¼ wavelength. Correspondingly, based on a mirror image principle, a dipole antenna implements radiation through a radiation structure of a ½ wavelength.

In this example, based on the existing dipole, the dipole is improved, to obtain a corresponding magnetic current loop dipole antenna.

Figure 25:
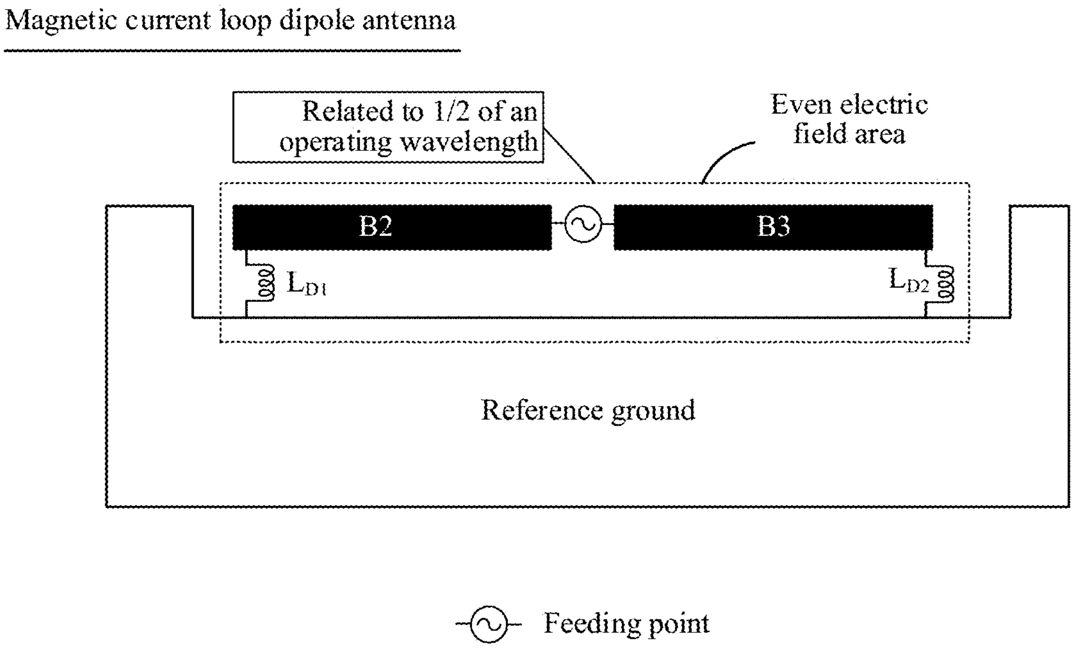
FIG. 25 is a schematic diagram of a magnetic current loop dipole antenna according to an embodiment of this application.

FIG. 25 is a schematic diagram of composition of a magnetic current loop dipole antenna according to an embodiment of this application. It may be understood that with reference to the foregoing description, the following definitions are all used as an example when the magnetic current loop dipole antenna operates in a fundamental mode scenario, and similar extensions may be made in an operating scenario of a high-order mode. Details are not repeated herein.

As shown in FIG. 25, the magnetic current loop dipole antenna shown in the example may include at least two radiation branches, such as B2 and B3 shown in FIG. 25.

One end of the B2 and one end of the B3 that are arranged opposite to each other may be respectively coupled to a feeding point. For example, a positive pole of the feeding point may be coupled to the B2, and a negative pole of the feeding point may be coupled to the B3. The other end of the B2 and the other end of the B3 that are away from the feeding point may be respectively grounded through an inductor. For example, one end of the B2 that is away from the feeding point may be grounded through an inductor $L_{D1}$, and correspondingly, one end of the B3 that is away from the feeding point may be grounded through an inductor $L_{D2}$.

It is to be noted that a value range of the inductor $L_{D1}$ and a value range of the inductor $L_{D2}$ may refer to a range of $L_a$, which is also an inductor connected in parallel in the foregoing description, and will not be repeated herein. In different embodiments, a position of the inductor arranged on the radiation branch may be flexible. In addition, in some embodiments of this application, a distance between the inductor $L_{D1}$ and the feeding point may be between a ⅛ wavelength and a 1-fold wavelength of the operating wavelength. Similarly, in some other embodiments of this application, a distance between the inductor $L_{D2}$ and the feeding point may also be between the ⅛ wavelength and the 1-fold wavelength of the operating wavelength.

In embodiments of this application, a size of the radiation branch of the magnetic current loop dipole antenna may be related to an operating frequency band. For example, a length of the B2 or the B3 may be less than ¼ of the wavelength corresponding to the operating frequency band. In other words, in embodiments of this application, a length of the radiation branch including the B2 and the B3 may be less than ½ of the wavelength corresponding to the operating frequency band. In some embodiments, the length of the radiation branch including the B2 and the B3 may be greater than ¼ of the operating frequency band. A wavelength corresponding to the operating frequency band may be a wavelength of a central frequency point of the operating frequency band.

Figure 26:
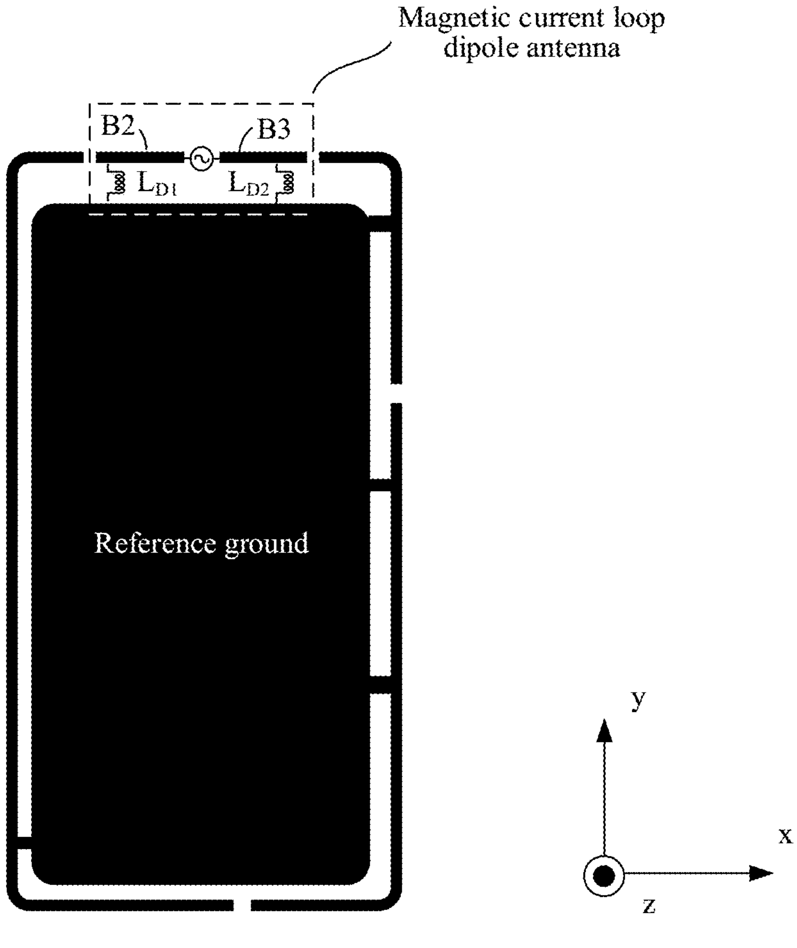
FIG. 26 is a schematic diagram of setting of a magnetic current loop dipole antenna in an electronic device according to an embodiment of this application.

The magnetic current loop dipole antenna provided in embodiments of this application may be arranged in an electronic device, to support a wireless communication function of the electronic device. For example, with reference to strong electric field distribution of the floor eigenmode shown in FIG. 2, the magnetic current loop dipole antenna provided in this example used as an electric field antenna may be arranged in a strong electric field area of a floor corresponding to the operating frequency band, to excite the floor to perform better radiation, thereby enabling the magnetic current loop dipole antenna to obtain better radiation performance. As an example, FIG. 26 shows an arrangement condition of a magnetic current loop dipole antenna in an electronic device. In this example, an example in which the magnetic current loop dipole antenna operates at a medium frequency is used. Therefore, by arranging the magnetic current loop dipole antenna on the top of an electronic device, medium frequency radiation on the floor may be better excited, thereby obtaining better radiation performance.

Figure 27:
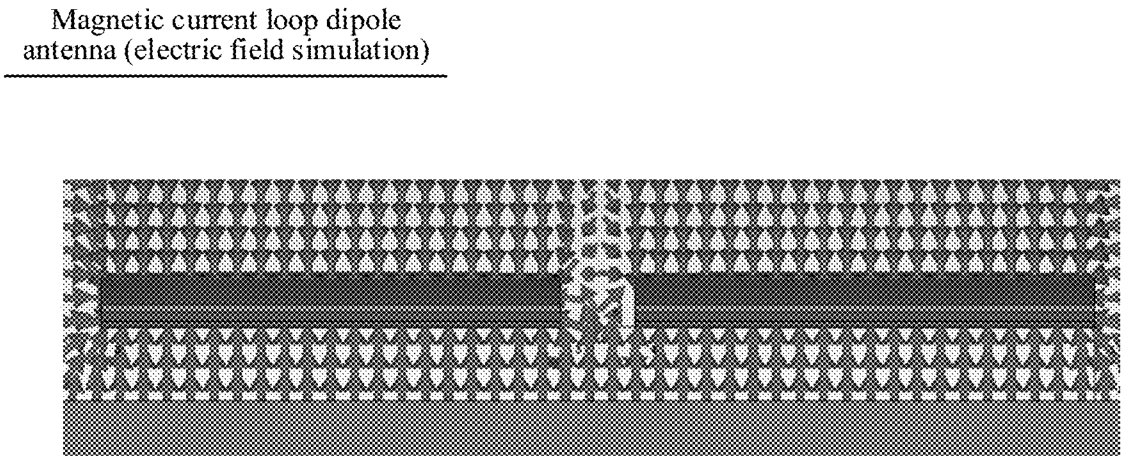
FIG. 27 is a schematic simulation diagram of an electric field of a magnetic current loop dipole antenna according to an embodiment of this application.
Figure 27:
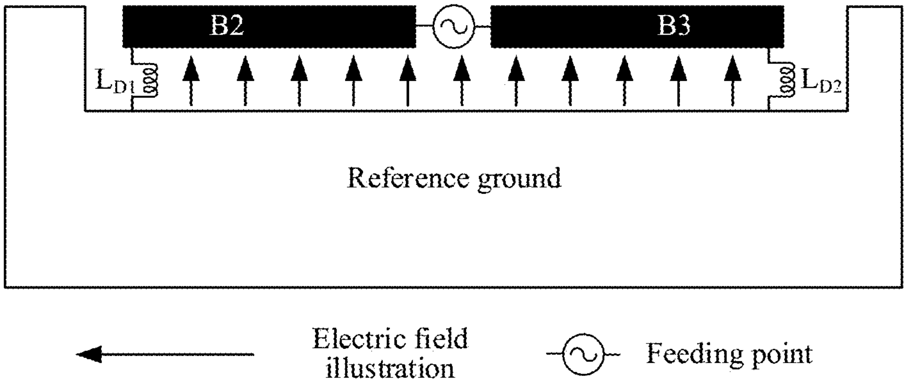

As a possible implementation of a magnetic current loop antenna, a magnetic current loop dipole antenna with the composition shown in FIG. 27 provided in this example may generate an even electric field close to a radiator of an antenna during operation. For example, FIG. 27 is a schematic simulation diagram of an electric field in an operating scenario of a magnetic current loop dipole antenna according to this example. (a) in FIG. 27 shows illustration of an actual simulation result. For a clearer description, (b) in FIG. 27 shows logical illustration of electric field distribution. It may be learnt that when the magnetic current loop dipole antenna is operating, an evenly distributed electric field may be generated between the radiation branch and the reference ground. Therefore, the magnetic current loop dipole antenna conforms to the radiation characteristics of the magnetic current loop antenna.

The magnetic current loop dipole antenna provided in embodiments of this application may generate an evenly distributed electric field around the radiator of the antenna, and simultaneously also has better radiation performance for covering at least one operating frequency band.

For example, the radiation condition of the magnetic current loop dipole antenna will be described below with reference to the simulation result in FIG. 28 and FIG. 29.

Figure 28:
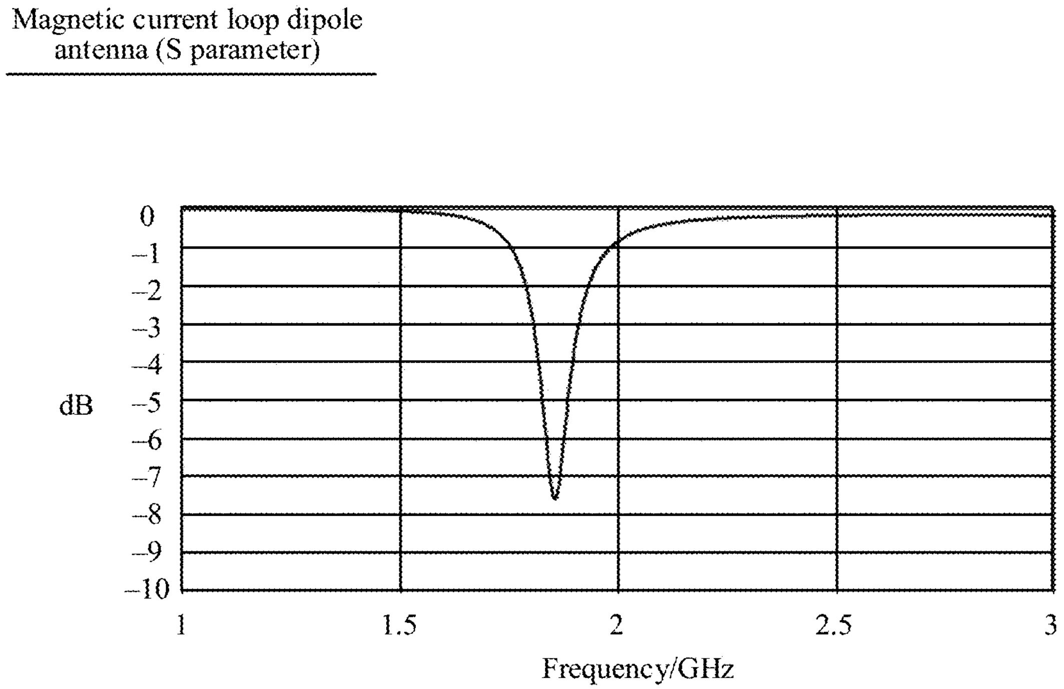
FIG. 28 is a schematic simulation diagram of an S parameter of a magnetic current loop dipole antenna according to an embodiment of this application.
Figure 28:
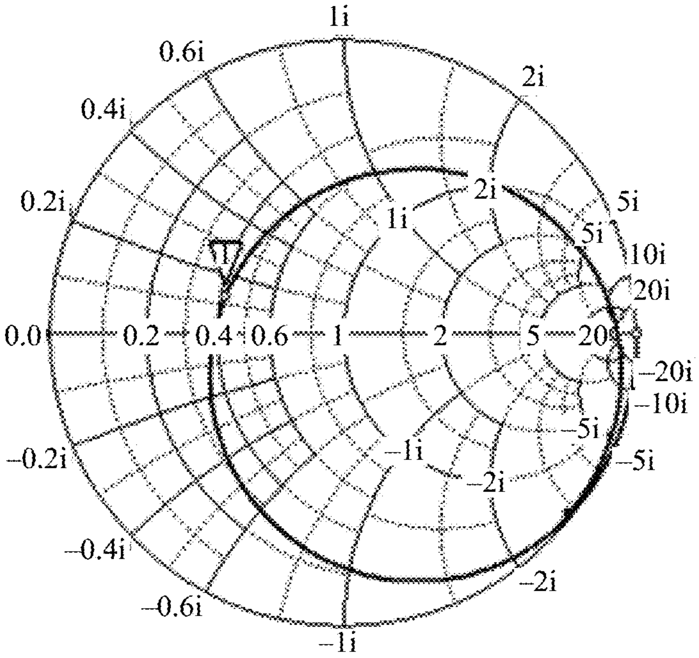

FIG. 28 is a schematic simulation diagram of an S parameter of a magnetic current loop dipole antenna according to an embodiment of this application. As shown in (a) in FIG. 28, the magnetic current loop dipole antenna in this example may generate one resonance around 1.8 GHz. A bandwidth of −2 dB of the resonance on S11 is at least 100 MHz, and the deepest point reaches −7.5 dB. As shown in (b) in FIG. 28, in a case that without any matching circuit, the magnetic current loop dipole antenna provided in embodiments of this application has better port matching characteristics on a Smith (Smith) chart. Therefore, the magnetic current loop dipole antenna provided in embodiments of this application may save space occupied by a matching circuit in a configuration process.

Figure 29:
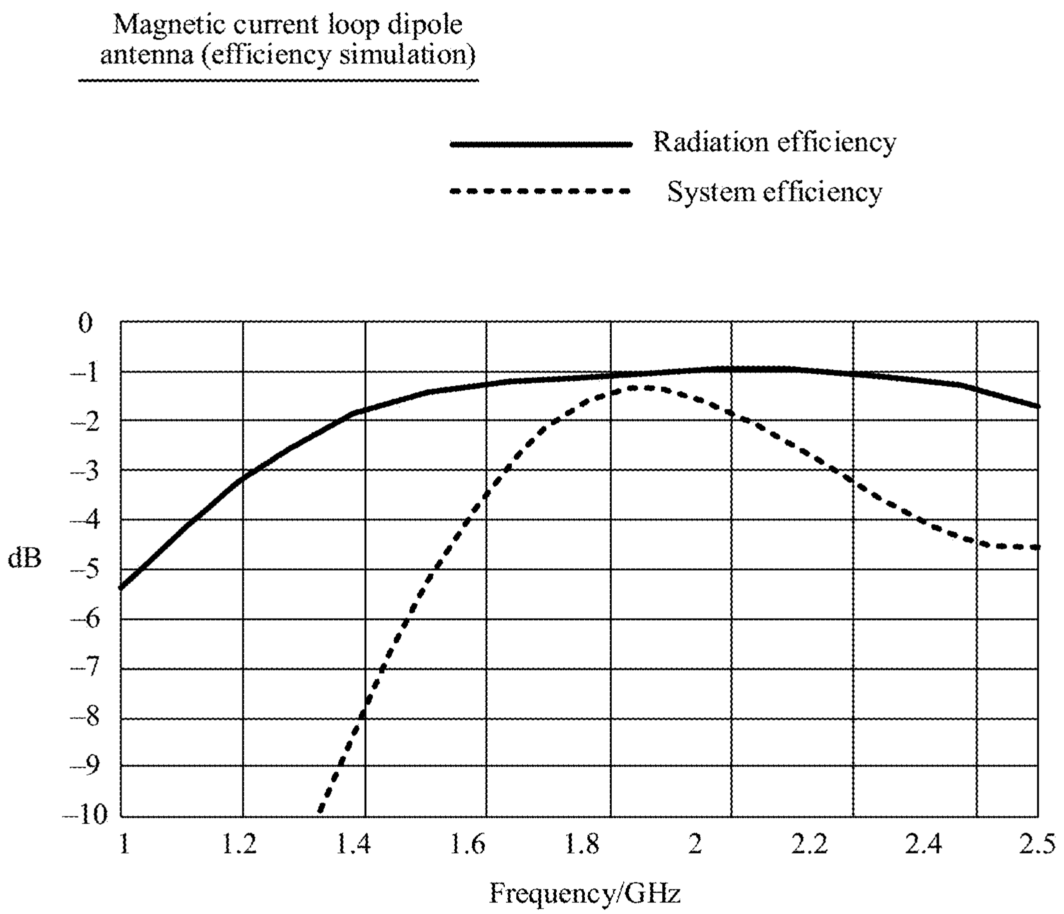
FIG. 29 is a schematic simulation diagram of efficiency of a magnetic current loop dipole antenna according to an embodiment of this application.

FIG. 29 is a schematic diagram of efficiency of a magnetic current loop dipole antenna according to an embodiment of this application. It may be learnt that radiation efficiency between 1.4 GHz and 2.5 GHz is above −2 dB, a corresponding system efficiency peak value also exceeds −1 dB, and the −2 dB bandwidth exceeds 400 MHZ. Therefore, the magnetic current loop dipole antenna provided in embodiments of this application may cover at least one operating frequency band, to achieve an effect of effectively supporting a wireless communication function of the electronic device.

With reference to the foregoing description, a person skilled in the art should be able to have an accurate understanding of the magnetic current loop dipole antenna provided in embodiments of this application. The solution provided in embodiments of this application will be described below with reference to a current distribution condition of the magnetic current loop dipole antenna during operation.

Figure 30:
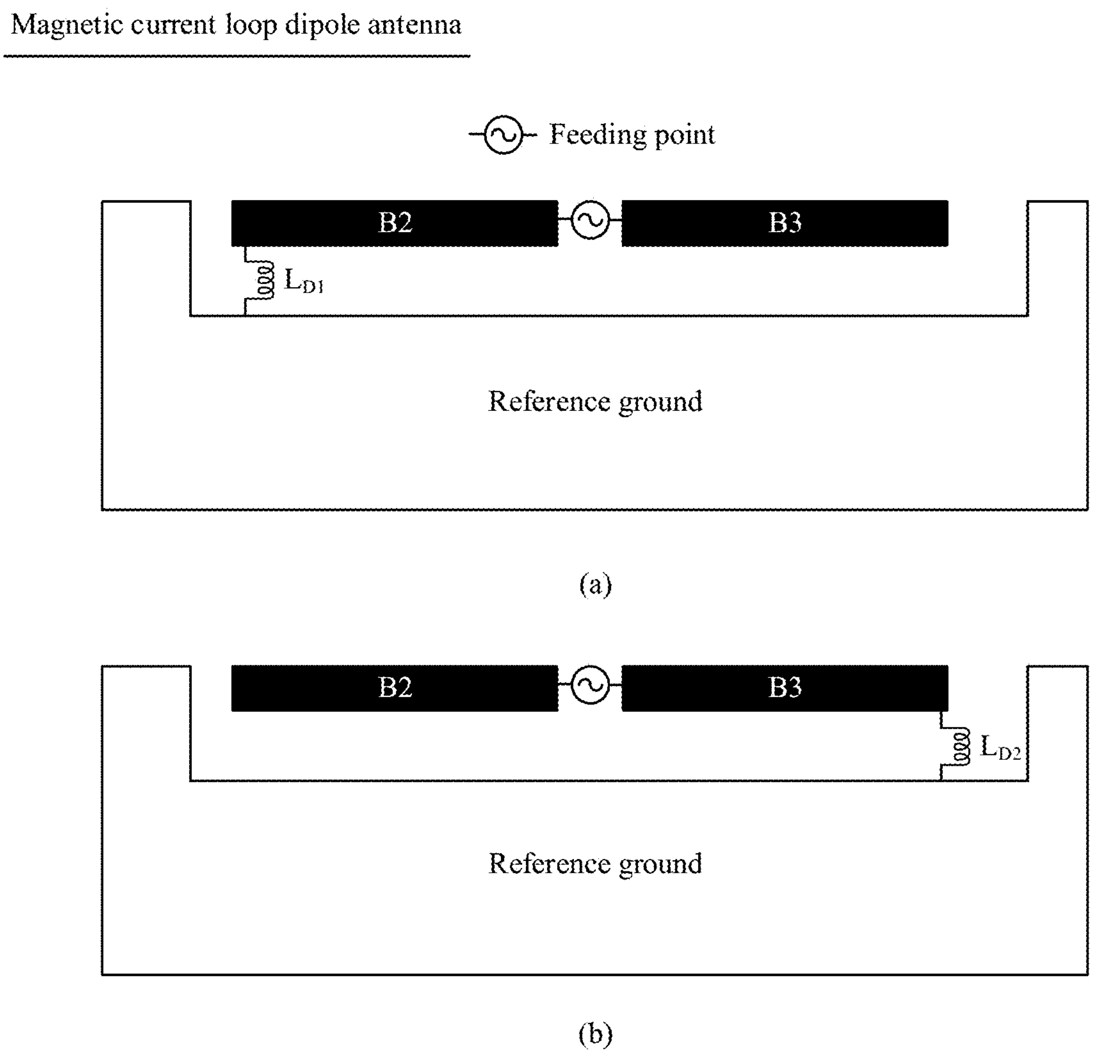
FIG. 30 is a schematic diagram of a magnetic current loop dipole antenna according to an embodiment of this application.

It is to be noted that in the foregoing examples in FIG. 25 to FIG. 29, a configuration of left-right symmetry of the magnetic current loop dipole antenna is used as an example for description. For example, sizes and positions of the B2 and the B3 may be set in left-right symmetry. For another example, a position of the inductor LD, and a position of the inductor $L_{D2}$ may also be set in left-right symmetry. Therefore, even electric field distribution may be obtained between the B2 and the B3 and the reference ground. In some other embodiments of this application, the position of the B2, the position of the B3, and a position of a corresponding inductor may also be asymmetrical. For example, with reference to the example in FIG. 30, as shown in (a) in FIG. 30, the position of the B2 and arrangement of the inductor may be similar to those in FIG. 25. In other words, one end of the B2 may be coupled to the feeding point, and the other end of the B2 may be grounded through the inductor $L_{D1}$. Correspondingly, setting of the B3 may be different from setting in left-right symmetry as shown in FIG. 25. For example, in this example, the B3 may be arranged symmetrically with the B2, and one end of the B3 may not be grounded through the inductor. In this way, radiation similar to radiation of the magnetic current loop monopole antenna in the foregoing example may be obtained between the B2 and the reference ground. The B3 may form radiation of the existing monopole antenna. In some other embodiments, as shown in (b) in FIG. 30, one end of the B3 that is away from the feeding point may also be grounded through the inductor, to obtain the radiation of the magnetic current loop monopole antenna. When one end of the B2 that is away from the feeding point is suspended, the radiation of the existing monopole antenna may be formed. Certainly, in some other embodiments of this application, a body of the B2 and a body of the B3 may also be asymmetrically arranged. For example, the length of the B2 may be different from the length of the B3.

In addition, similar to the description of the magnetic current loop monopole antenna, on the magnetic current loop dipole antenna provided in this example, a setting position of the inductor may also be flexible. Different configuration positions of an inductor $L_{S1}$ do not affect a distribution area of the even electric field of the magnetic current loop dipole antenna.

Figure 31:
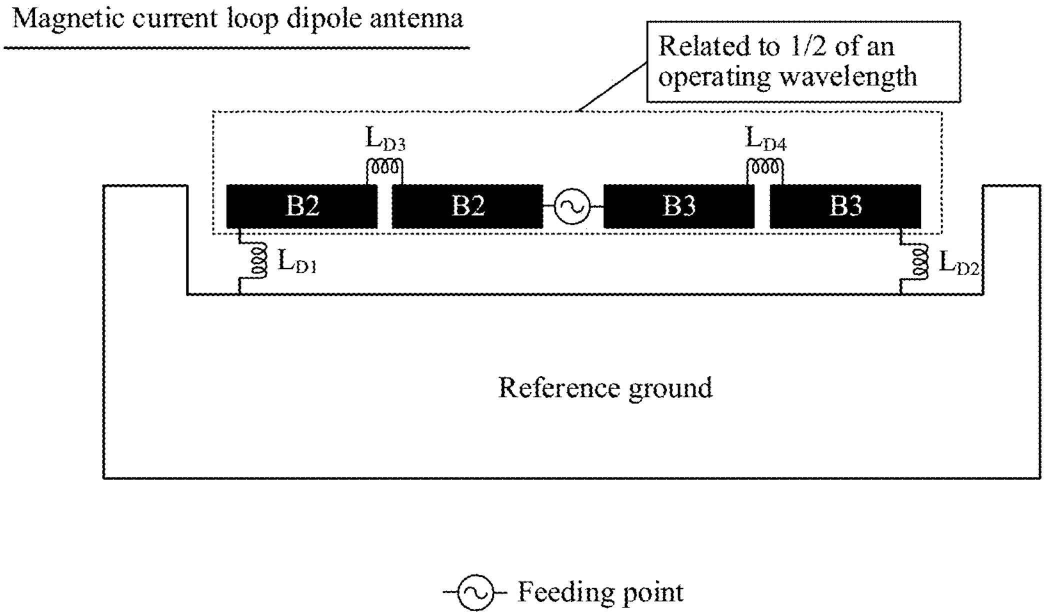
FIG. 31 is a schematic diagram of a magnetic current loop dipole antenna according to an embodiment of this application.

It is to be noted that in some other embodiments of this application, at least one inductor may further be connected in series on the radiator of the magnetic current loop dipole antenna. For example, as shown in FIG. 31, an inductor $L_{D3}$ may be connected in series on the B2, and an inductor $L_{D4}$ may further be connected in series on the B3, to cause the electric field distribution to be more even and improve the radiation efficiency of the magnetic current loop dipole antenna. In different implementations of this application, setting of a position of the inductor connected in series on the radiator and setting of a quantity of inductors may be flexibly selected based on actual needs. This is not limited in embodiments of this application. For example, a value range of the inductor $L_{D3}$ a value range of the inductor $L_{D4}$ may refer to a range of $L_b$, which is also an inductor connected in series in the foregoing description, and will not be repeated herein.

In different specific implementation processes, a specific implementation of the magnetic current loop dipole antenna having any composition as shown in FIG. 25 to FIG. 31 may be different. For example, in some embodiments, radiation branches of the magnetic current loop dipole antenna may be fully or partially multiplexed by a metal frame of the electronic device. In some other embodiments, the radiation branch of the magnetic current loop dipole antenna may be implemented in a form such as a flexible printed circuit (Flexible Printed Circuit, FPC), and a metalframe diecasting for anodicoxidation (Metalframe Diecasting for Anodicoxidation, MDA). A specific implementation form of the magnetic current loop dipole antenna is not limited in embodiments of this application.

It may be understood that composition of the magnetic current loop monopole antenna and the magnetic current loop dipole antenna respectively shown in FIG. 17 to FIG. 31 are only two possible examples of the magnetic current loop wire antenna provided in embodiments of this application. In other implementations provided in embodiments of this application, the radiation characteristics of the magnetic current loop antenna may further be obtained through similar processing (such as arranging a ground inductor on the radiator) based on other existing electric field wire antennas. For a specific similar implementation, details are not repeated herein.

The specific implementation of the magnetic current loop groove antenna provided in embodiments of this application will be described below with reference to examples. The magnetic current loop slot antenna and the magnetic current loop left-hand antenna are used as examples.

Figure 32:
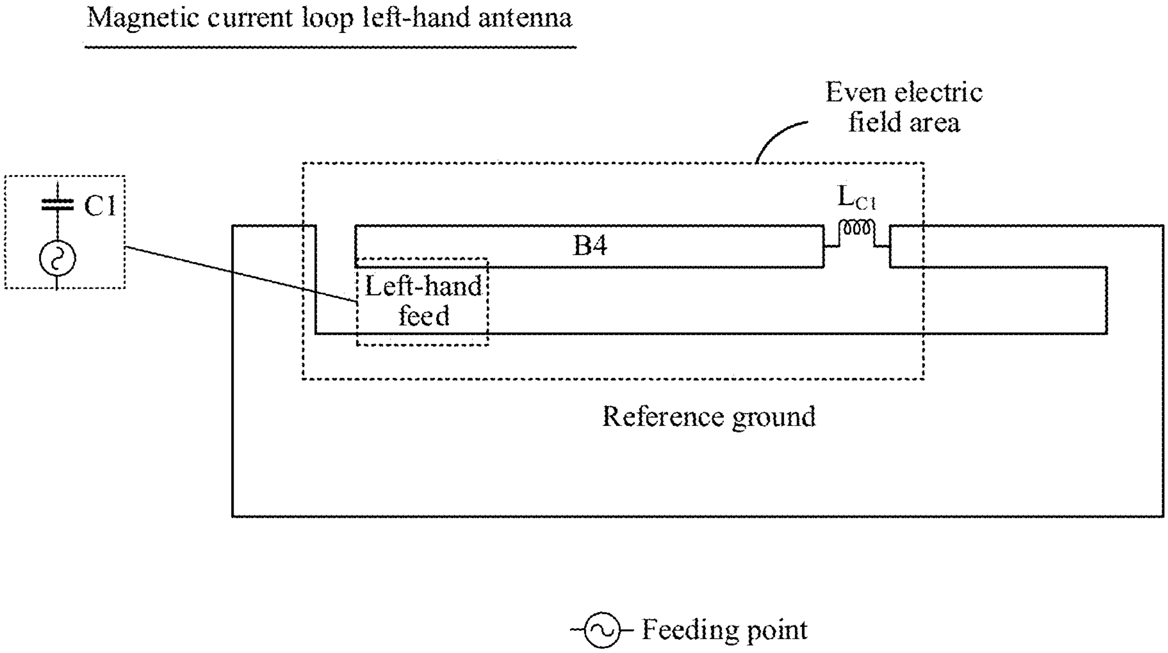
FIG. 32 is a schematic diagram of a magnetic current loop left-hand antenna according to an embodiment of this application.

For example, FIG. 32 is a schematic diagram of composition of a magnetic current loop left-hand antenna according to an embodiment of this application.

As shown in FIG. 32, the magnetic current loop left-hand antenna shown in the example may include at least one radiation branch, such as B4 shown in FIG. 32. One end of the B4 may be grounded. The other end of the B4 may be coupled to a feeding point. In this example, an inductor $L_{C1}$ may be connected in series on a radiator of the B4 close to a ground end. It may be understood that when the inductor $L_{C1}$ is not arranged, the B4 may be directly coupled to a reference ground. When a position of the feeding point has left-hand feeding composition as shown in FIG. 32, an existing left-hand antenna may be constructed. In this example, the left-hand feed composition may include the feeding point, and a capacitor C1 (for example, C1 is referred to as a left-hand capacitor) connected in series with the feeding point. Arrangement of the left-hand capacitor may be used to excite the B4 to generate a corresponding left-hand mode for radiation. For example, by arranging the left-hand capacitor, a non-reverse current may be formed on a radiation branch 4, and a resonance corresponding to the current may achieve coverage of an operating frequency band (such as a low frequency) in small space.

It is to be noted that in the example shown in FIG. 32, an inductor $L_{C1}$ is arranged on the B4, so that even electric field distribution may be formed between a radiator of the B4 between the inductor $L_{C1}$ and the feeding point and the reference ground. In different embodiments, a position of the inductor $L_{C1}$ may be flexible. For example, a value range of the inductor $L_{C1}$ may refer to a range of $L_b$, which is also an inductor connected in series in the foregoing description, and will not be repeated herein. In addition, in some embodiments of this application, a distance between the inductor $L_{C1}$ and the feeding point may be between a ⅛ wavelength and a 1-fold wavelength of the operating wavelength.

Figure 33:
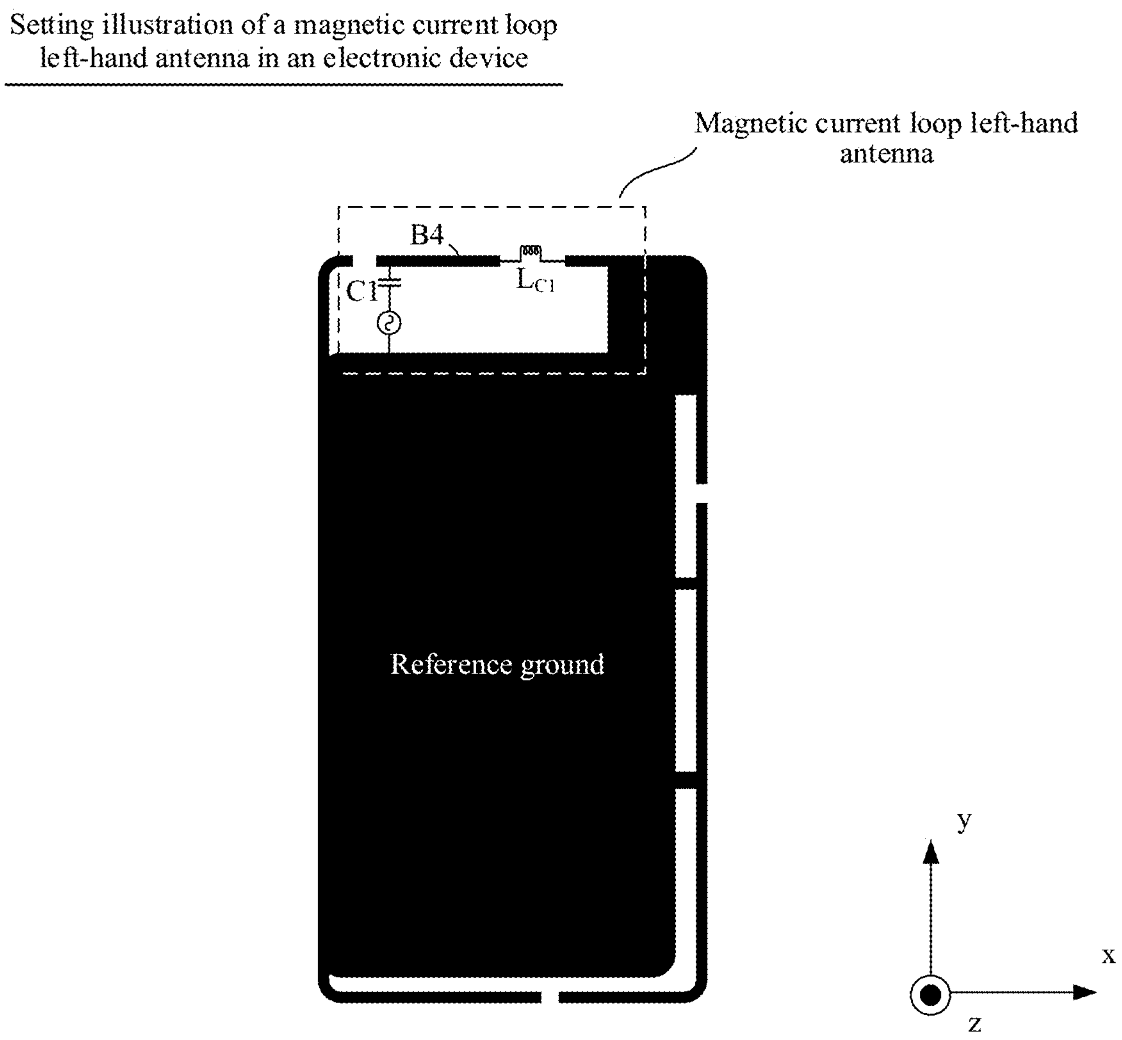
FIG. 33 is a schematic diagram of setting of a magnetic current loop left-hand antenna in an electronic device according to an embodiment of this application.

The magnetic current loop left-hand antenna provided in embodiments of this application may be arranged in an electronic device, to support a wireless communication function of the electronic device. For example, with reference to strong electric field distribution of the floor eigenmode shown in FIG. 2, the magnetic current loop left-hand antenna provided in this example used as an electric field antenna may be arranged in a strong electric field area of a floor corresponding to the operating frequency band, to excite the floor to perform better radiation, thereby enabling the magnetic current loop left-hand antenna to obtain better radiation performance. As an example, FIG. 33 shows an arrangement condition of a magnetic current loop left-hand antenna in an electronic device. In this example, an example in which the magnetic current loop left-hand antenna operates at a medium frequency is used. Therefore, by arranging the magnetic current loop left-hand antenna on the top of the electronic device, medium frequency radiation on the floor may be better excited, thereby obtaining better radiation performance.

It may be understood that in this example, an inductor Lei is arranged close to a ground position of the magnetic current loop left-hand antenna to return to the ground. With reference to analysis of operating characteristics of the magnetic current loop groove antenna, the structure may form the even electric field distribution between the inductor Lei and the feeding point, namely, between the B4 and the reference ground, to obtain the radiation characteristics of the magnetic current loop groove antenna in the part.

Figure 34:
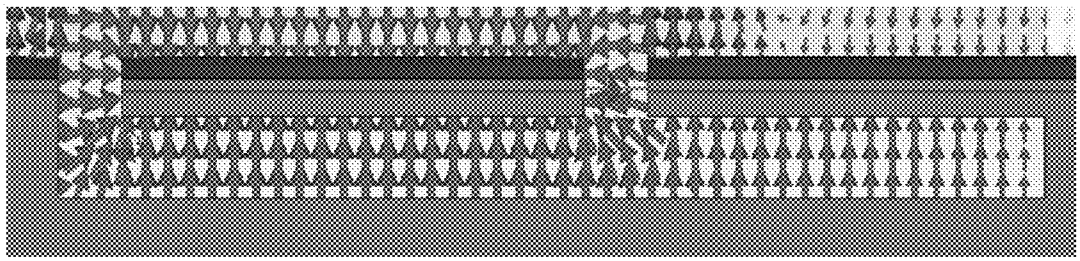
FIG. 34 is a schematic simulation diagram of an electric field of a magnetic current loop left-hand antenna according to an embodiment of this application.
Figure 34:
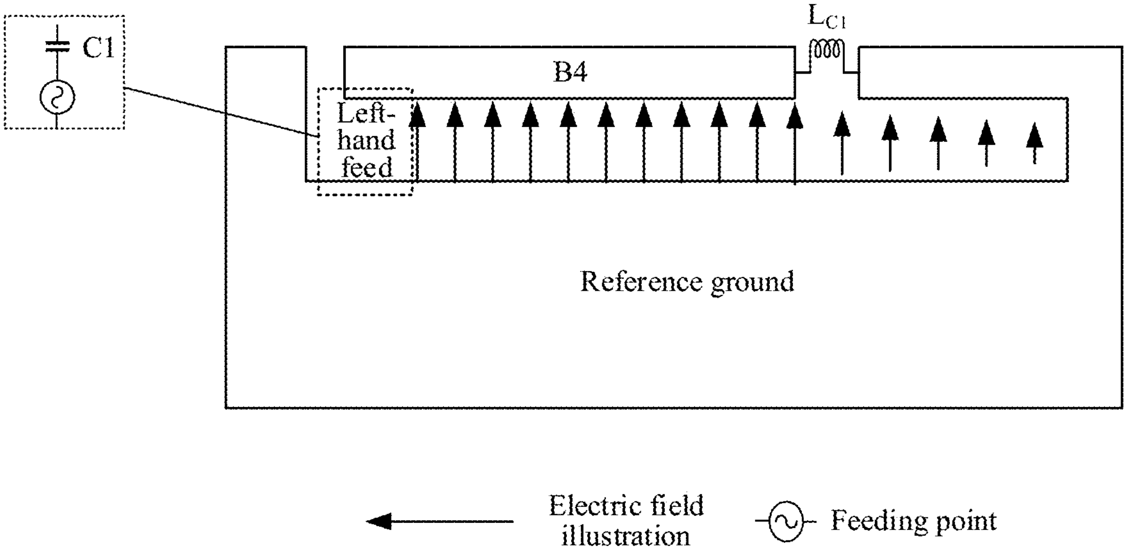

As a possible implementation of a magnetic current loop antenna, FIG. 34 is a schematic simulation diagram of an electric field in an operating scenario of a magnetic current loop left-hand antenna according to this example. (a) in FIG. 34 shows illustration of an actual simulation result. For a clearer description, (b) in FIG. 34 shows logical illustration of electric field distribution. It may be learnt that when the magnetic current loop left-hand antenna is operating, an evenly distributed electric field may be generated between a radiation branch and a reference ground. Therefore, the magnetic current loop left-hand antenna conforms to radiation characteristics of the magnetic current loop antenna.

The magnetic current loop left-hand antenna provided in embodiments of this application may generate the evenly distributed electric field around a radiator of an antenna, and simultaneously also has better radiation performance for covering at least one operating frequency band.

For example, a radiation condition of the magnetic current loop left-hand antenna will be described below with reference to the simulation result in FIG. 35 and FIG. 36.

Figure 35:
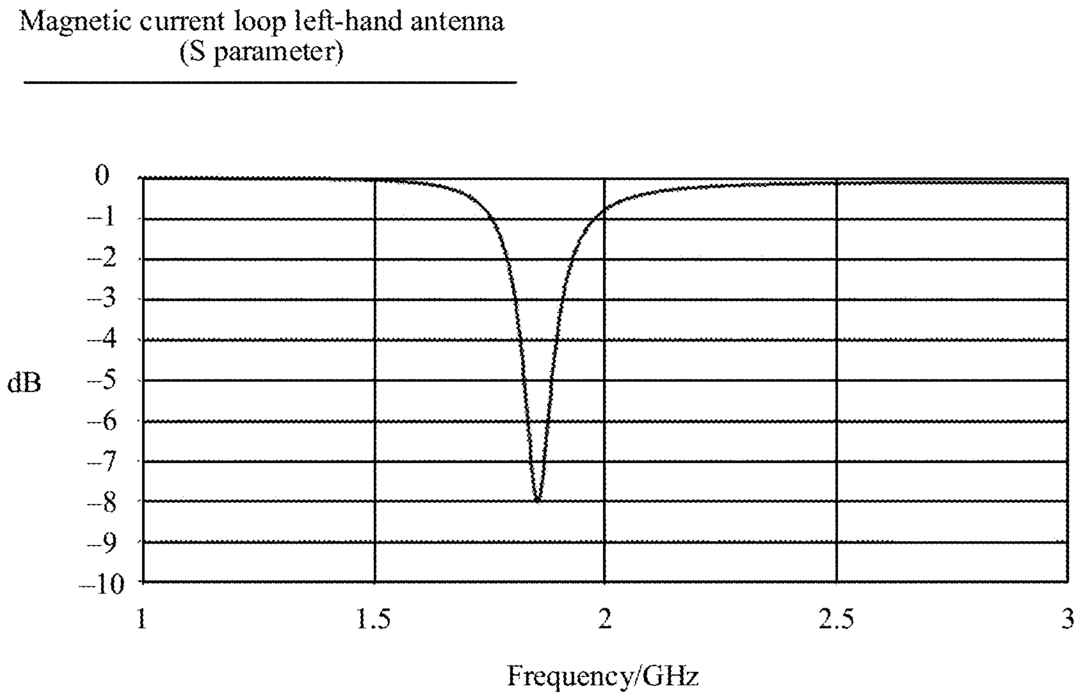
FIG. 35 is a schematic simulation diagram of an S parameter of a magnetic current loop left-hand antenna according to an embodiment of this application.
Figure 35:
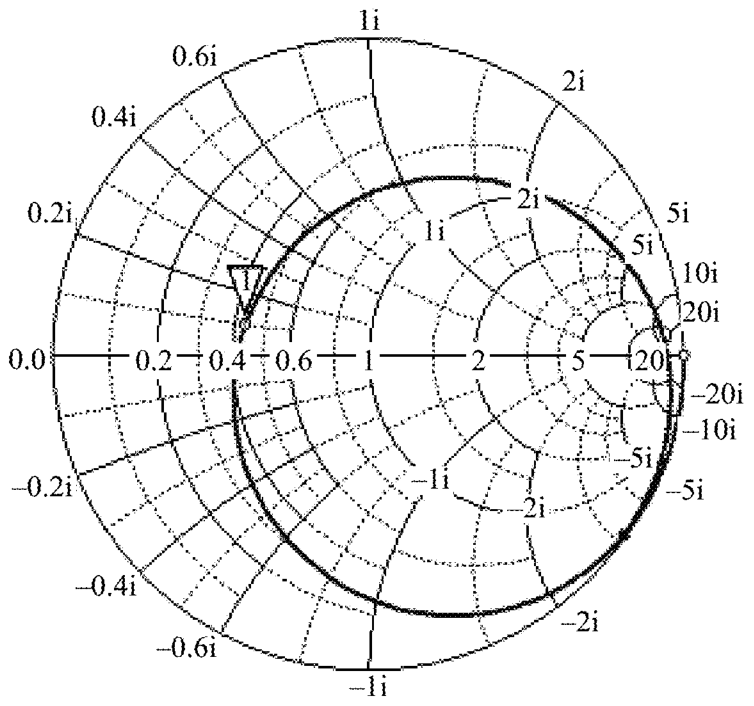

FIG. 35 is a schematic simulation diagram of an S parameter of a magnetic current loop left-hand antenna according to an embodiment of this application. As shown in (a) in FIG. 35, the magnetic current loop left-hand antenna in this example may generate one resonance around 1.8 GHz. A bandwidth of −2 dB of the resonance on S11 is at least 100 MHz, and the deepest point reaches-8 dB. As shown in (b) in FIG. 35, in a case that without any matching circuit, the magnetic current loop left-hand antenna provided in embodiments of this application has better port matching characteristics on a Smith (Smith) chart. Therefore, the magnetic current loop left-hand antenna provided in embodiments of this application may save space occupied by a matching circuit in a configuration process.

Figure 36:
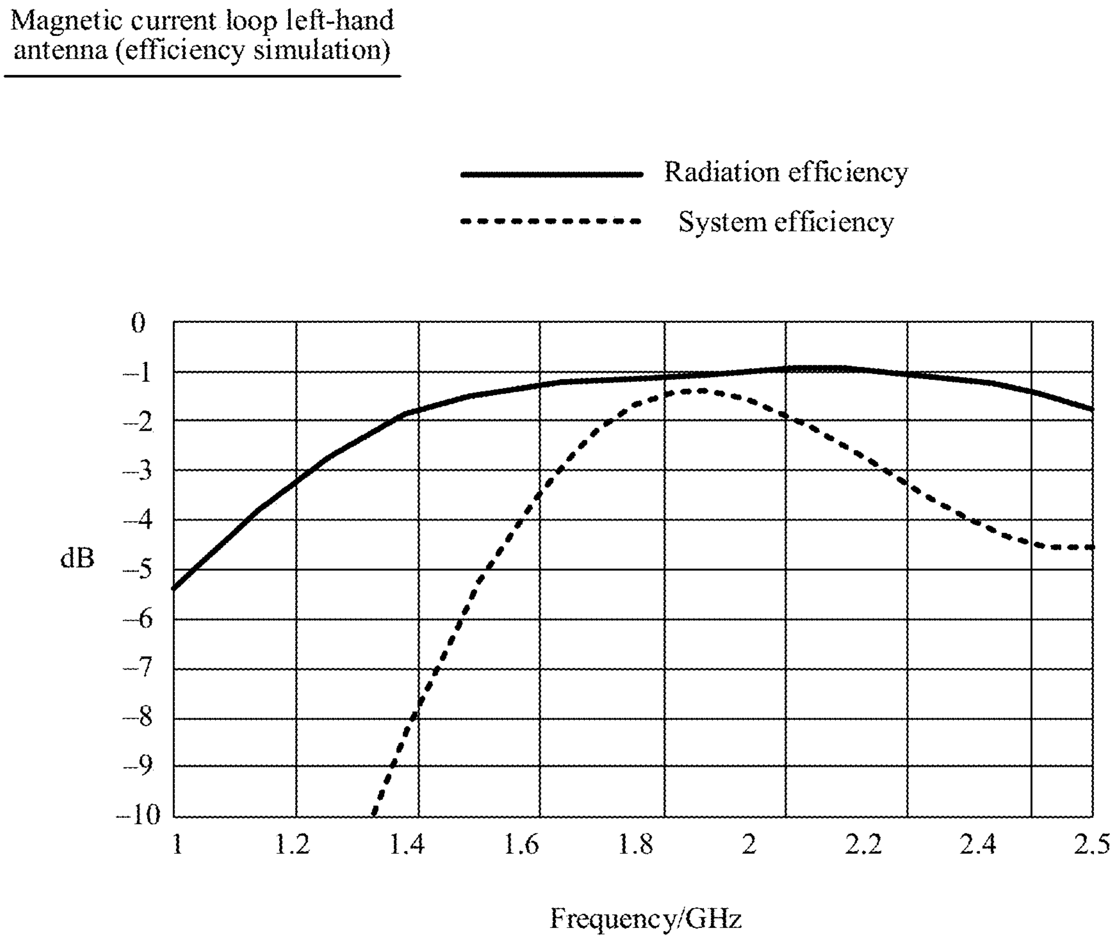
FIG. 36 is a schematic simulation diagram of efficiency of a magnetic current loop left-hand antenna according to an embodiment of this application.

FIG. 36 is a schematic diagram of efficiency of a magnetic current loop left-hand antenna according to an embodiment of this application. It may be learnt that radiation efficiency between 1.4 GHz and 2.5 GHz is above −2 dB, a corresponding system efficiency peak value is also close to −1 dB, and the bandwidth of −2 dB exceeds 400 MHz. Therefore, the magnetic current loop left-hand antenna provided in embodiments of this application may cover at least one operating frequency band, to achieve an effect of effectively supporting a wireless communication function of the electronic device.

Figure 37:
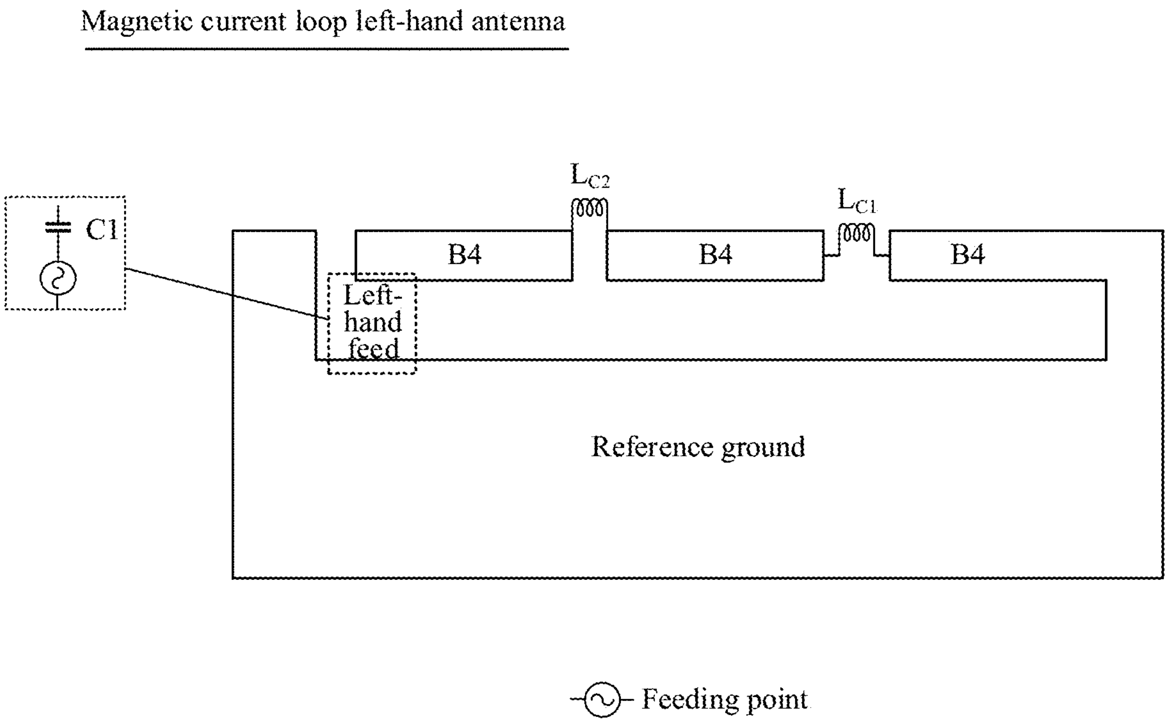
FIG. 37 is a schematic diagram of a magnetic current loop left-hand antenna according to an embodiment of this application.

It is to be noted that in some other embodiments of this application, at least one inductor may further be connected in series on the radiator of the magnetic current loop left-hand antenna. For example, as shown in FIG. 37, an inductor $L_{C2}$ may be connected in series on the B4, to cause the electric field distribution to be more even and improve the radiation efficiency of the magnetic current loop left-hand antenna. In different implementations of this application, setting of a position of the inductor connected in series on the radiator and setting of a quantity of inductors may be flexibly selected based on actual needs. This is not limited in embodiments of this application. For example, a value range of the inductor $L_{C2}$ may refer to a range of $L_b$, which is also an inductor connected in series in the foregoing description, and will not be repeated herein.

In different specific implementation processes, a specific implementation of the magnetic current loop left-hand antenna having any composition as shown in FIG. 32 to FIG. 37 may be different. For example, in some embodiments, radiation branches of the magnetic current loop left-hand antenna may be fully or partially multiplexed by a metal frame of the electronic device. In some other embodiments, the radiation branch of the magnetic current loop left-hand antenna may be implemented in a form such as a flexible printed circuit (Flexible Printed Circuit, FPC), and a metalframe diecasting for anodicoxidation (Metalframe Diecasting for Anodicoxidation, MDA). A specific implementation form of the magnetic current loop left-hand antenna is not limited in embodiments of this application.

Figure 38:
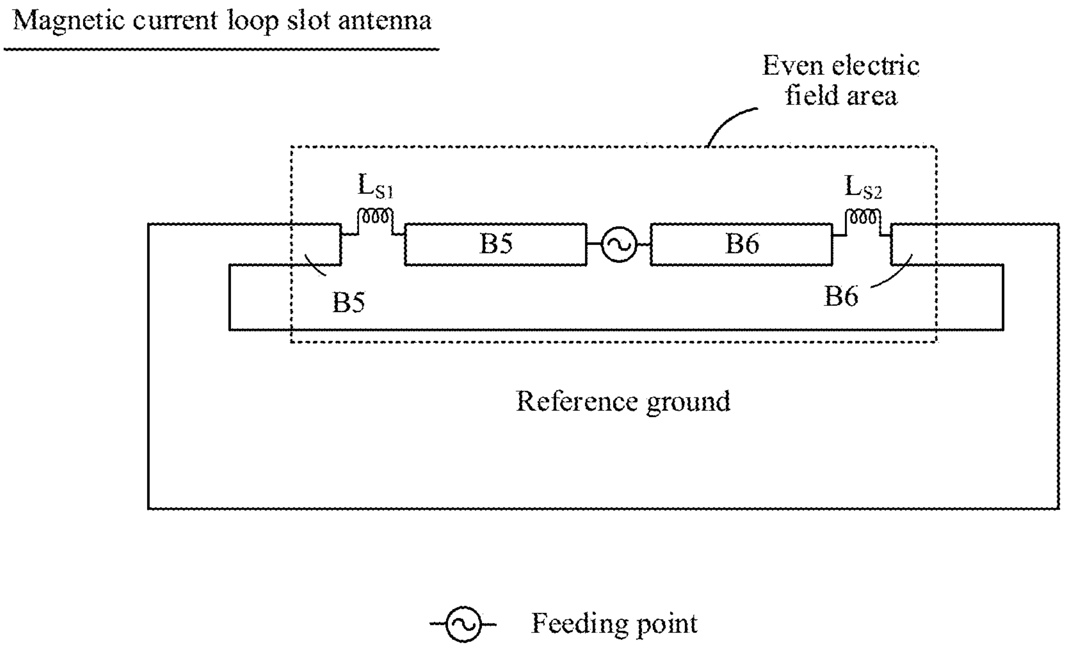
FIG. 38 is a schematic diagram of a magnetic current loop slot antenna according to an embodiment of this application.

FIG. 38 is a schematic diagram of composition of a magnetic current loop slot antenna according to an embodiment of this application.

It may be understood that based on a mirror image principle, with reference to the magnetic current loop left-hand antenna shown in FIG. 32, in a case of setting a PMC on a left side of the magnetic current loop left-hand antenna for mirror image setting, structural composition of the magnetic current loop slot antenna provided in this example may be obtained. A feeding point of the magnetic current loop slot antenna may be arranged at a middle position of the PMC. Composition and operating conditions of a magnetic current loop slot antenna will be described below with reference to the example shown in FIG. 38.

As shown in FIG. 38, the magnetic current loop slot antenna shown in the example may include at least two radiation branches, such as B5 and B6 shown in FIG. 38. One end of the B5 and one end of the B6 that are arranged opposite to each other may be respectively coupled to a feeding point. For example, a positive pole of the feeding point may be coupled to the B5, and a negative pole of the feeding point may be coupled to the B6.

One end of the B5 and one end of the B6 that are away from the feeding point may be coupled to the ground. In this example, inductors may be connected in series on both the B5 and the B6. For example, the inductor $L_{S1}$ may be connected in series on the B5, and the inductor $L_{S2}$ may be connected in series on the B6.

It may be understood that when the inductor connected in series is not arranged, the B5, the B6, and the reference ground may enclose one slot, thereby forming the existing slot antenna radiation under excitation of the feeding point. In this example, by respectively arranging inductors on the B5 and the B6, an even electric field may be formed between the two inductors, the radiator of the B5 and the radiator of the B6, and the reference ground, and the radiation characteristics of the magnetic current loop groove antenna may be obtained.

It may be understood that based on the foregoing description of the mirror image principle, corresponding even electric field distribution may be obtained from the feeding point to the inductor $L_{S1}$ due to energy storage characteristics of the inductor $L_{S1}$ for magnetic energy. Correspondingly, corresponding even electric field distribution may also be obtained from the feeding point to the inductor $L_{S2}$ due to energy storage characteristics of the inductor $L_{S2}$ for magnetic energy. Therefore, by superimposing the foregoing two scenarios, the even electric field distribution between the inductor $L_{S1}$ and the inductor $L_{S2}$, and between the radiator of the B5 and the radiator of the B6 and the reference ground may be obtained.

It is to be noted that a value range of the inductor $L_{S1}$ a value range of the inductor $L_{S2}$ may refer to a range of $L_b$, which is also an inductor connected in series in the foregoing description, and will not be repeated herein. In different embodiments, a position of the inductor $L_{S1}$ and/or a position of the inductor $L_{S2}$ may be flexible. In addition, in some embodiments of this application, a distance between the inductor $L_{S1}$ and the feeding point may be between a ⅛ wavelength and a 1-fold wavelength of the operating wavelength. Similarly, in some other embodiments of this application, a distance between the inductor $L_{S2}$ and the feeding point may also be between the ⅛ wavelength and the 1-fold wavelength of the operating wavelength.

Figure 39:
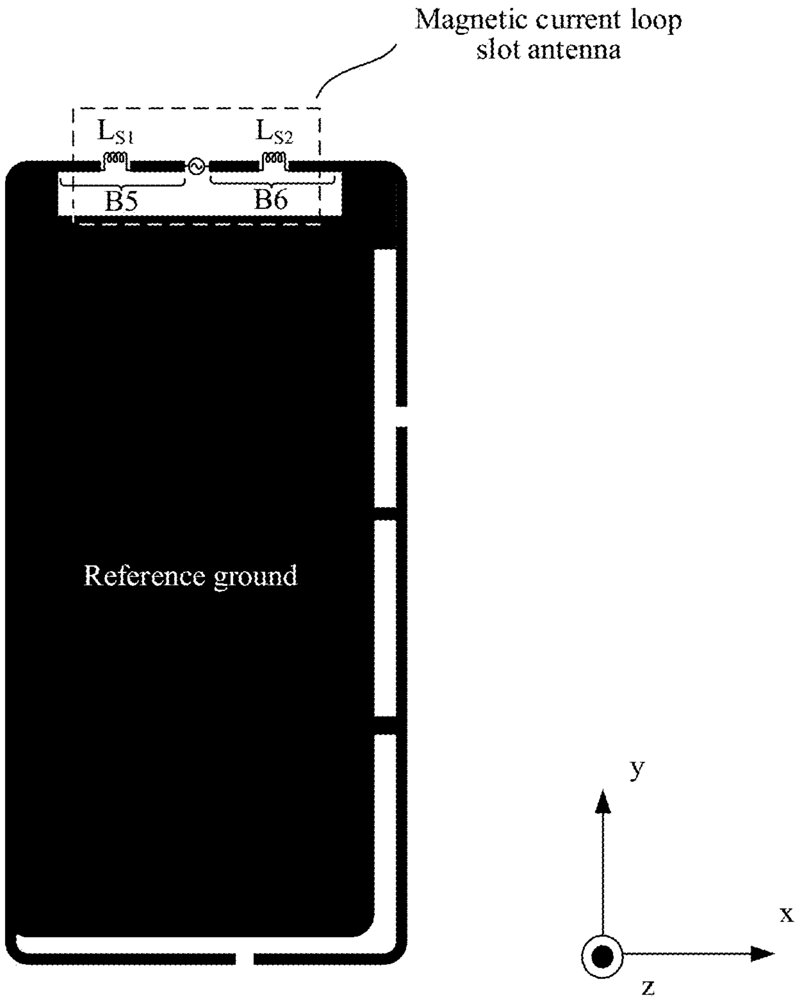
FIG. 39 is a schematic diagram of setting of a magnetic current loop slot antenna in an electronic device according to an embodiment of this application.

The magnetic current loop slot antenna provided in embodiments of this application may be arranged in an electronic device, to support a wireless communication function of the electronic device. For example, with reference to strong electric field distribution of the floor eigenmode shown in FIG. 2, the magnetic current loop slot antenna provided in this example used as an electric field antenna may be arranged in a strong electric field area of a floor corresponding to the operating frequency band, to excite the floor to perform better radiation, thereby enabling the magnetic current loop slot antenna to obtain better radiation performance. As an example, FIG. 39 shows an arrangement condition of a magnetic current loop slot antenna in an electronic device. In this example, an example in which the magnetic current loop slot antenna operates at a medium frequency is used. Therefore, by arranging the magnetic current loop slot antenna on the top of an electronic device, medium frequency radiation on the floor may be better excited, thereby obtaining better radiation performance.

It may be understood that in this example, inductors are respectively arranged close to a ground (such as a B5 ground end and a B6 ground end) position of the magnetic current loop slot antenna to return to the ground. With reference to analysis of operating characteristics of the magnetic current loop groove antenna, the structure may form the even electric field distribution between the inductor and the feeding point. With reference to the electric field distribution on two sides of the PMC, the radiation characteristics of the magnetic current loop groove antenna between the B5 and the B6 and the reference ground may be obtained.

Figure 40:
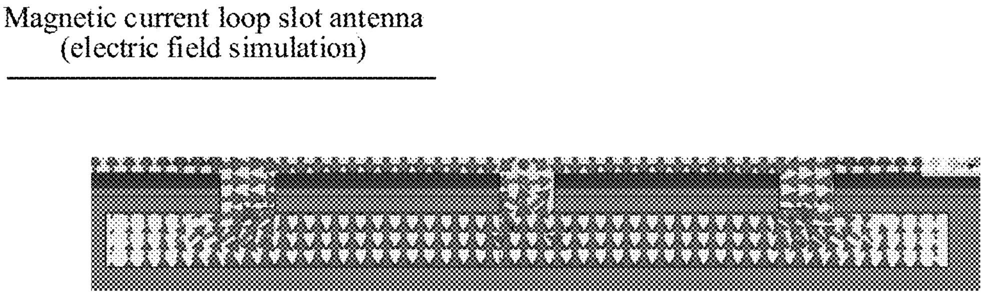
FIG. 40 is a schematic simulation diagram of an electric field of a magnetic current loop slot antenna according to an embodiment of this application.
Figure 40:
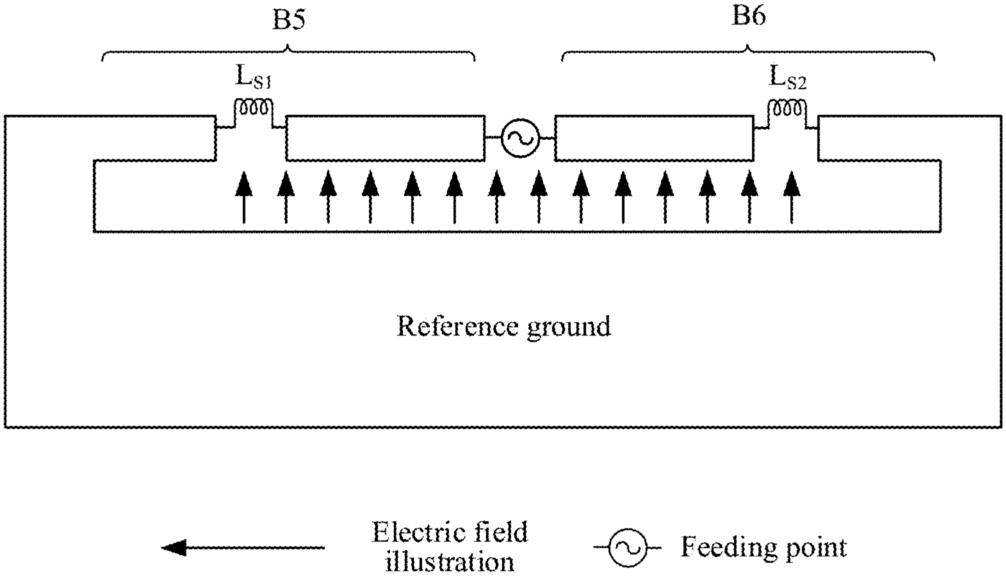

As a possible implementation of a magnetic current loop antenna, FIG. 40 is a schematic simulation diagram of an electric field in an operating scenario of a magnetic current loop slot antenna according to this example. (a) in FIG. 40 shows illustration of an actual simulation result. For a clearer description, (b) in FIG. 40 shows logical illustration of electric field distribution. It may be learnt that when the magnetic current loop slot antenna is operating, an evenly distributed electric field may be generated between a radiation branch and a reference ground. Therefore, the magnetic current loop slot antenna conforms to radiation characteristics of the magnetic current loop antenna.

The magnetic current loop slot antenna provided in embodiments of this application may generate an evenly distributed electric field around a radiator of an antenna, and simultaneously also has better radiation performance for covering at least one operating frequency band.

For example, a radiation condition of the magnetic current loop slot antenna will be described below with reference to the simulation result in FIG. 41 and FIG. 42.

Figure 41:
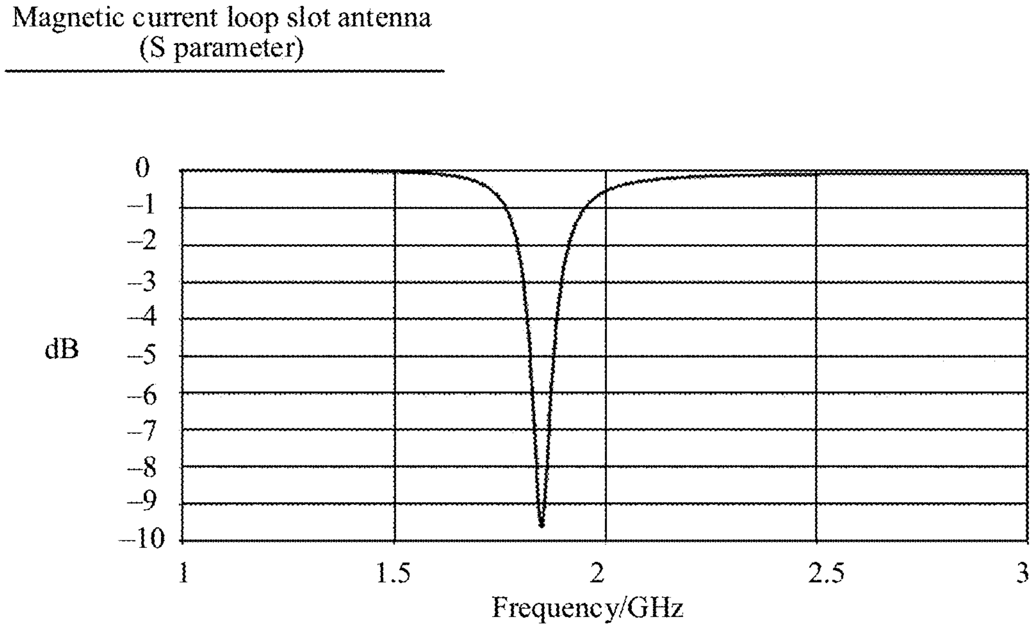
FIG. 41 is a schematic simulation diagram of an S parameter of a magnetic current loop slot antenna according to an embodiment of this application.
Figure 41:
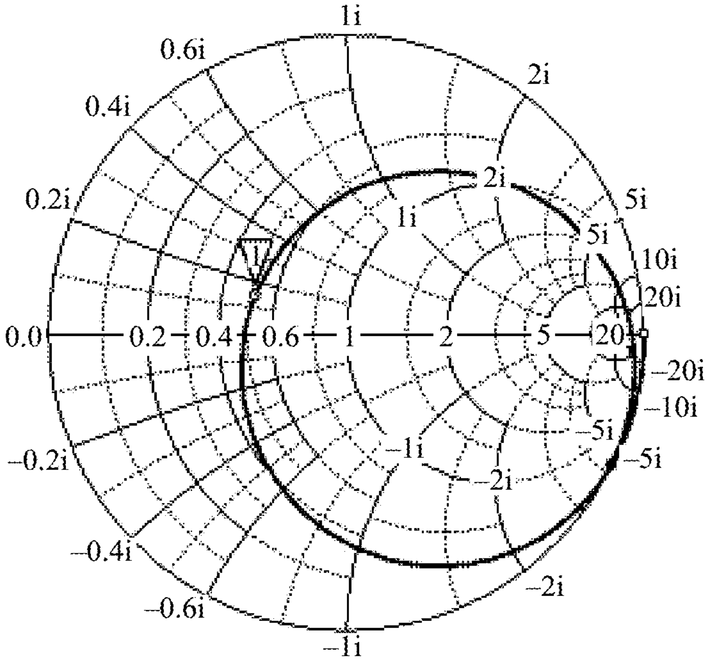

FIG. 41 is a schematic simulation diagram of an S parameter of a magnetic current loop slot antenna according to an embodiment of this application. As shown in (a) in FIG. 41, the magnetic current loop slot antenna in this example may generate one resonance around 1.8 GHz. A bandwidth of −2 dB of the resonance on S11 is close to 100 MHz, and the deepest point is close to −11 dB. As shown in (b) in FIG. 41, in a case that without any matching circuit, the magnetic current loop slot antenna provided in embodiments of this application has better port matching characteristics on a Smith (Smith) chart. Therefore, the magnetic current loop slot antenna provided in embodiments of this application may save space occupied by a matching circuit in a configuration process.

Figure 42:
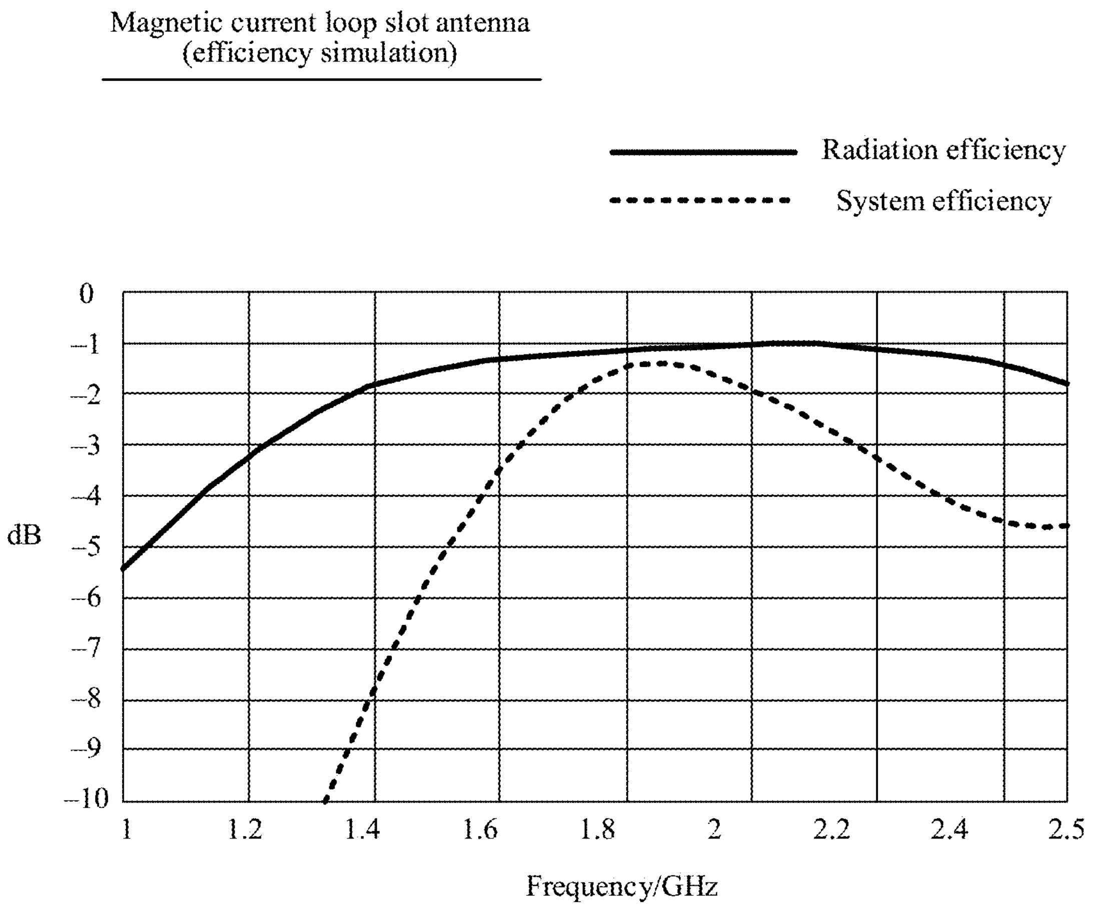
FIG. 42 is a schematic simulation diagram of efficiency of a magnetic current loop slot antenna according to an embodiment of this application.

FIG. 42 is a schematic diagram of efficiency of a magnetic current loop slot antenna according to an embodiment of this application. It may be learnt that radiation efficiency between 1.4 GHz and 2.5 GHz is above −2 dB, a corresponding system efficiency peak value is also close to −1 dB, and the bandwidth of −2 dB exceeds 400 MHZ. Therefore, the magnetic current loop slot antenna provided in embodiments of this application may cover at least one operating frequency band, to achieve an effect of effectively supporting a wireless communication function of an electronic device.

It is to be noted that in the foregoing examples in FIG. 38 to FIG. 42, a configuration of left-right symmetry of the magnetic current loop slot antenna is used as an example for description. For example, sizes and positions of the B5 and the B6 may be set in left-right symmetry. For another example, a position of the inductor $L_{S1}$ and a position of the inductor $L_{S2}$ may also be set in left-right symmetry. Therefore, the even electric field distribution may be obtained between the B5 and the B6 and the reference ground. In some other embodiments of this application, the position of the B5, the position of the B6, and a position of a corresponding inductor may also be asymmetrical. For example, with reference to the example in FIG. 43, as shown in (a) in FIG. 43, the position of the B5, the position of the B6, and arrangement of the inductor may be similar to those in FIG. 38. However, arrangement of the inductor may be different from the example shown in FIG. 38.

Figure 43:
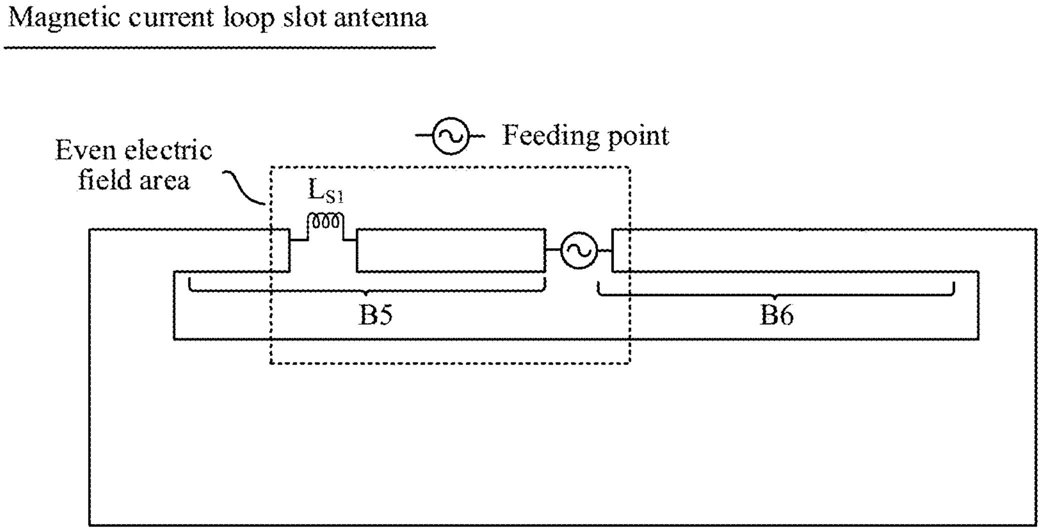
FIG. 43 is a schematic diagram of a magnetic current loop slot antenna according to an embodiment of this application.
Figure 43:
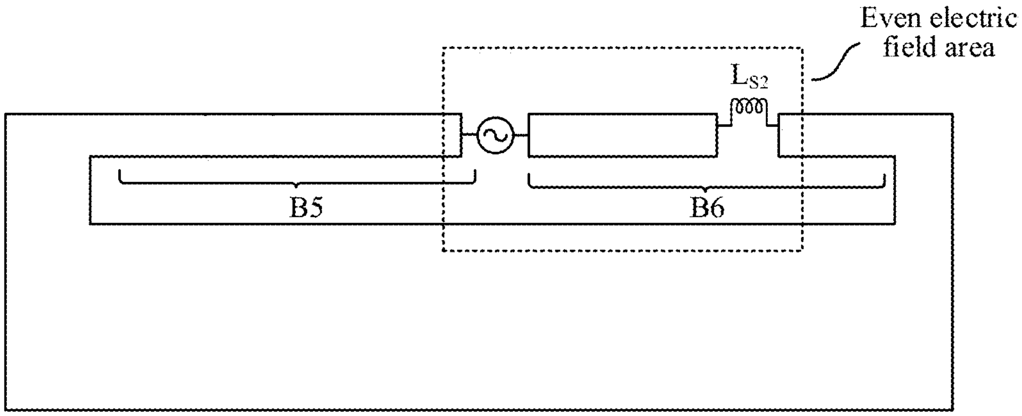

For example, in the example in (a) in FIG. 43, the inductor $L_{S1}$ may be connected in series on the B5, thereby obtaining the even electric field distribution between the inductor $L_{S2}$ and the feeding point, and between the B5 and the reference ground. Correspondingly, the inductor may not be connected in series on the B6. Therefore, the electric field distribution of the existing slot antenna may be obtained between the B6 and the reference ground. For another example, in the example in (b) in FIG. 43, the inductor $L_{S2}$ may be connected in series on the B6, thereby obtaining the even electric field distribution between the inductor $L_{S2}$ and the feeding point, and between the B6 and the reference ground. Correspondingly, the inductor may not be connected in series on the B5. Therefore, the electric field distribution of the existing slot antenna may be obtained between the B5 and the reference ground. Certainly, in some other embodiments of this application, a body of the B5 and a body of the B6 may also be asymmetrically arranged. For example, a length and/or the position of the B5 may be different from a length and/or the position of the B6.

Figure 44:
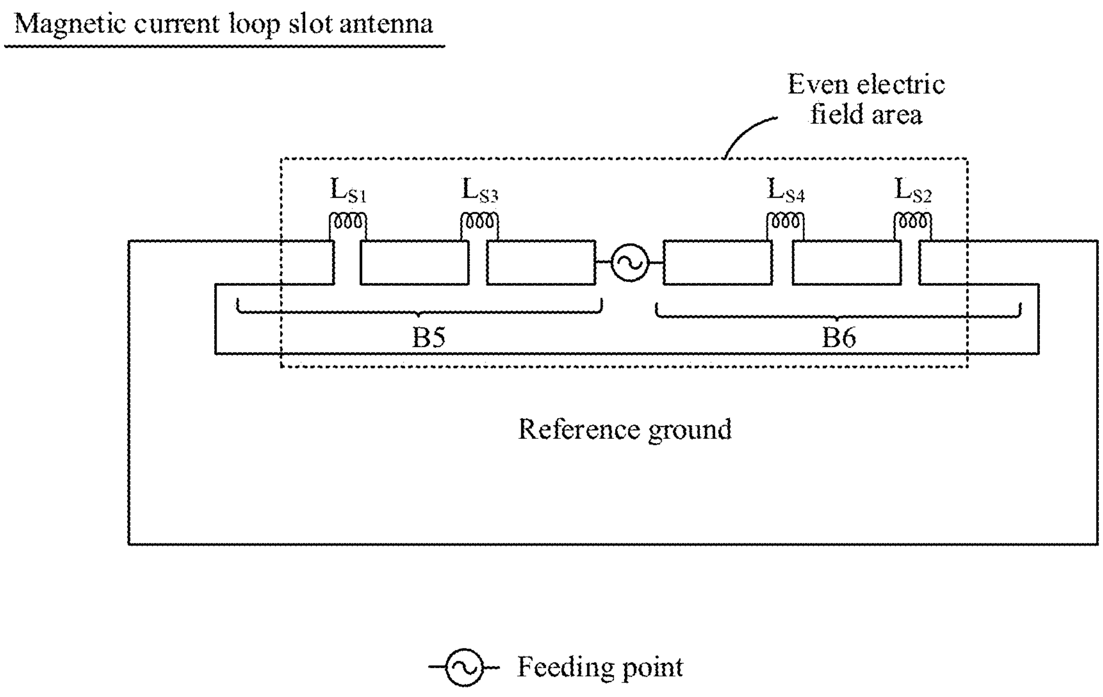
FIG. 44 is a schematic diagram of a magnetic current loop slot antenna according to an embodiment of this application.

It is to be noted that in some other embodiments of this application, at least one inductor may be further connected in series on the radiator of the magnetic current loop slot antenna. For example, as shown in FIG. 44, an inductor $L_{S3}$ may be connected in series on the B5, to cause the electric field distribution to be more even and improve the radiation efficiency of the magnetic current loop slot antenna. Certainly, in some other embodiments, more inductors may be connected in series on the B6, such as an inductor $L_{S4}$ connected in series, thereby further improving the radiation efficiency. In different implementations of this application, setting of a position of the inductor connected in series on the radiator and setting of a quantity of inductors may be flexibly selected based on actual needs. This is not limited in embodiments of this application. For example, a value range of the inductor $L_{S3}$ a value range of the inductor $L_{S4}$ may refer to a range of $L_b$, which is also an inductor connected in series in the foregoing description, and will not be repeated herein.

In different specific implementation processes, a specific implementation of the magnetic current loop slot antenna having any composition as shown in FIG. 38 to FIG. 44 may be different. For example, in some embodiments, radiation branches of the magnetic current loop slot antenna may be fully or partially multiplexed by a metal frame of the electronic device. In some other embodiments, the radiation branch of the magnetic current loop slot antenna may be implemented in a form such as a flexible printed circuit (Flexible Printed Circuit, FPC), and a metalframe diecasting for anodicoxidation (Metalframe Diecasting for Anodicoxidation, MDA). A specific implementation form of the magnetic current loop slot antenna is not limited in embodiments of this application.

It may be understood that composition of the magnetic current loop left-hand antenna and the magnetic current loop slot antenna respectively shown in FIG. 32 to FIG. 44 are only two possible examples of the magnetic current loop groove antenna provided in embodiments of this application. In other implementations provided in embodiments of this application, the radiation characteristics of the magnetic current loop antenna may be further obtained through similar processing (such as arranging an inductor connected in series on the radiator) based on other existing electric field groove antennas. For a specific similar implementation, details are not repeated herein.

It is to be noted that the magnetic current loop antennas provided in the foregoing examples are all fed in the form of directly feeding for description.

In some other embodiments of this application, the magnetic current loop antenna, the magnetic current loop wire antenna as shown in FIG. 10, and/or the magnetic current loop groove antenna as shown in FIG. 11, as well as various subsequent specific examples may also be excited by coupled feeding.

It may be understood that in an excitation manner of directly feeding, a feeding point needs to be set at a fixed position, and simultaneously, structural space further needs to be reserved for arranging a feeding component close to the feeding point. Correspondingly, in the coupled feeding manner provided in embodiments of this application, because the radiation branch is fed in a manner of electromagnetic coupling, the feeding component is not needed. In addition, because a configuration of the feeding branch is more flexible, it is more conducive to implementation of the magnetic current loop antenna provided in embodiments of this application.

The magnetic current loop antenna based on coupled feeding provided in embodiments of this application will be described below with reference to the accompanying drawings. It should be noted that in the following example, a radiator body of the magnetic current loop antenna is similar to the example in the foregoing description, and the only difference is that in the foregoing description, a position of the feeding point may be replaced by arranging an inductor. In the following example, with reference to the four antenna solution examples in the foregoing examples, such as a magnetic current loop monopole antenna, a magnetic current loop dipole antenna, a magnetic current loop left-hand antenna, a magnetic current loop slot antenna, or the like. A mechanism of coupled feeding is mainly described in detail.

Figure 45:
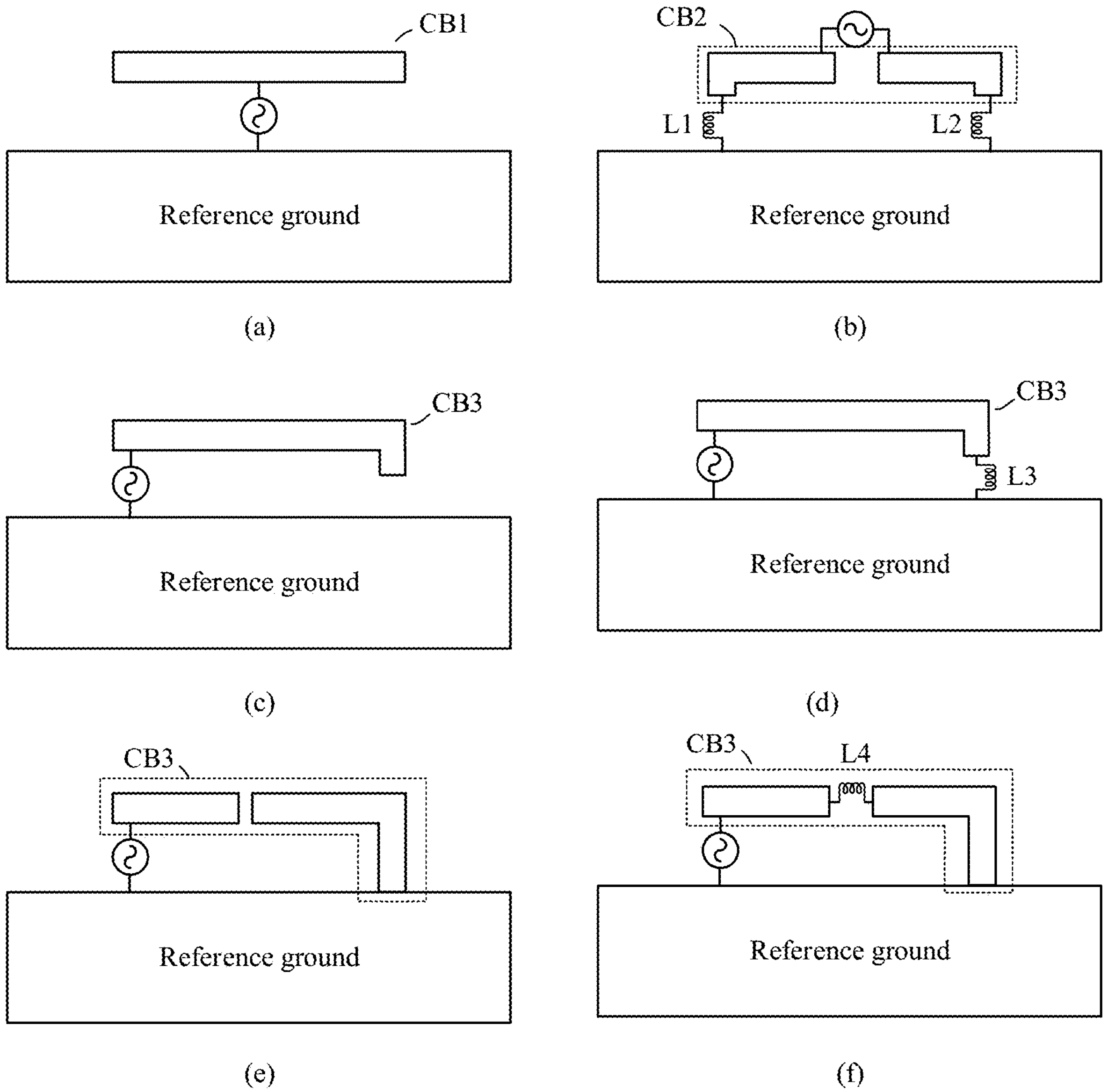
FIG. 45 is a schematic diagram of a feeding branch in a coupled feeding scenario according to an embodiment of this application.

For example, FIG. 45 shows six possible compositions of feeding branches used for feeding in the magnetic current loop antenna system that is coupled and fed provided in embodiments of this application.

In the example in (a) in FIG. 45, the feeding branch may include one radiator, such as CB1 shown in (a) in FIG. 45. Two ends of the CB1 are suspended, and a feeding point may be arranged on the CB1. For example, one end of the feeding point (such as a positive pole) may be coupled to the CB1, and the other end of the feeding point (such as a negative pole) may be coupled to a radio frequency signal line arranged on a reference ground. It is to be noted that in different implementations, a coupling position of the feeding point and a coupling position of the CB1 may be different. For example, in the example shown in (a) in FIG. 45, the feeding point may be coupled to the CB1 at a center position of the CB1. In some other implementations of this example, a coupling position between the feeding point and the CB1 may be further another position on the CB1, such as a left part on the CB1, or a right part on the CB1.

(b) in FIG. 45 is a schematic diagram of composition of still another feeding branch for coupled feeding according to an embodiment of this application. In the example of (b) in FIG. 45, the feeding branch may include one radiator CB2. A feeding point may be connected in series on the CB2. The feeding point may divide the CB2 into a left part and a right part. As a possible implementation, one end of the feeding point (such as the positive pole) may be coupled to the left part, and the other end of the feeding point (such as the negative pole) may be coupled to the right part. In this example, two ends of the CB2 may be respectively grounded through the inductor. For example, as shown in (b) in FIG. 45, one end of the CB2 may be grounded through an inductor L1. The other end of the CB2 may be grounded through an inductor L2. It is to be noted that a setting position of the feeding point as shown in (b) in FIG. 45 is merely an example. Similar to the example in (a) in FIG. 45, the setting position of the feeding point may also be another position on the CB2.

(c) in FIG. 45 is a schematic diagram of composition of still another feeding branch for coupled feeding according to an embodiment of this application. As shown in (c) in FIG. 45, the feeding branch in this example may include one radiator CB3. One end of the CB3 may be coupled to a feeding point. The other end of the CB3 may be suspended.

(d) in FIG. 45 is a schematic diagram of composition of still another feeding branch for coupled feeding according to an embodiment of this application. Composition of the feeding branch in this example may be obtained by improving the composition as shown in (c) in FIG. 45. For example, as shown in (d) in FIG. 45, the feeding branch provided in this example may also include one radiator CB3. One end of the CB3 may be coupled to a feeding point. Different from the example shown in (c) in FIG. 45, in this example, the other end of the CB3 may be grounded through an inductor. For example, one end of the CB3 that is away from the feeding point may be coupled to the ground through an inductor L3.

(e) in FIG. 45 is a schematic diagram of composition of still another feeding branch used for coupled feeding according to an embodiment of this application. Composition of the feeding branch in this example may be obtained by improving the composition as shown in (c) in FIG. 45. For example, as shown in (e) in FIG. 45, the feeding branch provided in this example may also include one radiator CB3. One end of the CB3 may be coupled to a feeding point. Different from the example shown in (c) in FIG. 45, in this example, the other end of the CB3 may be directly coupled to the reference ground. In addition, a through slot may be provided on the CB3. The slot may divide the CB3 into two disconnected parts. In different implementations, a position of the slot on the CB3 may be flexibly set.

(f) in FIG. 45 is a schematic diagram of composition of still another feeding branch for coupled feeding according to an embodiment of this application. Composition of the feeding branch in this example may be obtained by improving the composition as shown in (e) in FIG. 45. For example, as shown in (e) in FIG. 45, the feeding branch provided in this example may also include one radiator CB3. One end of the CB3 may be coupled to a feeding point. the other end of the CB3 may be directly coupled to the reference ground. Different from the example shown in (e) in FIG. 45, in this example, an inductor connected in series may be arranged on the CB3. For example, in this example, an inductor L4 connected in series may be arranged on the CB3, and the inductor L4 may divide the CB3 into two separate parts. The two separate parts are coupled through the inductor L4.

In different implementations of this application, a feeding branch of any composition as shown in FIG. 45 may be arranged between the radiation branch of the magnetic current loop antenna and the reference ground, to excite the radiation branch of the magnetic current loop antenna, so that the even electric field distribution may be obtained in an area enclosed by the radiation branch, the reference ground, and the feeding branch, to obtain the radiation characteristics of the magnetic current loop antenna.

It is to be noted that the foregoing six examples shown in FIG. 45 are not exhaustive. The feeding branch for coupled feeding of the magnetic current loop antenna provided in embodiments of this application may obtain the even electric field distribution in a same direction as the radiation branch during operation between the feeding branch and the radiation branch during operation. In other words, in a process of performing coupled feeding, an electric field generated by the feeding branch may be evenly distributed in an area between the feeding branch and the radiation branch. In addition, a direction of the electric field generated by the feeding branch may be the same as a direction of the electric field generated by the radiation branch. In some other implementations, a feeding branch having the electric field distribution characteristics that is different from the feeding branch of the composition shown in FIG. 45 may also implement excitation to the feeding branch through coupled feeding, so that the radiation characteristics of the magnetic current loop antenna may be obtained when the feeding branch is operating. Therefore, other compositions of the feeding branch having the electric field distribution characteristics should also be included in the protection scope of embodiments of this application.

In a coupled feeding mechanism provided in this example, because the feeding branch is arranged in an area between the radiation branch and the reference ground, the area may have the even electric field distribution in a radiation process of the magnetic current loop antenna. Therefore, a specific position of the feeding branch in the area may be flexibly set without significantly affecting operation of the magnetic current loop antenna. In addition, similar to the magnetic current loop antenna that is directly fed, the magnetic current loop antenna based on coupled feeding in this example also does not require an additional matching circuit for port matching. In different scenarios, port matching may be implemented by adjusting the length of the feeding branch and/or the size of the inductor arranged on the feeding branch.

The coupled feeding mechanism provided in this example will be described in detail below with reference to the four specific implementations in the foregoing examples. For ease of description, in the following example, an example in which coupled feeding is performed by using the feeding branch of composition as shown in (a) in FIG. 45 is used.

Figure 46:
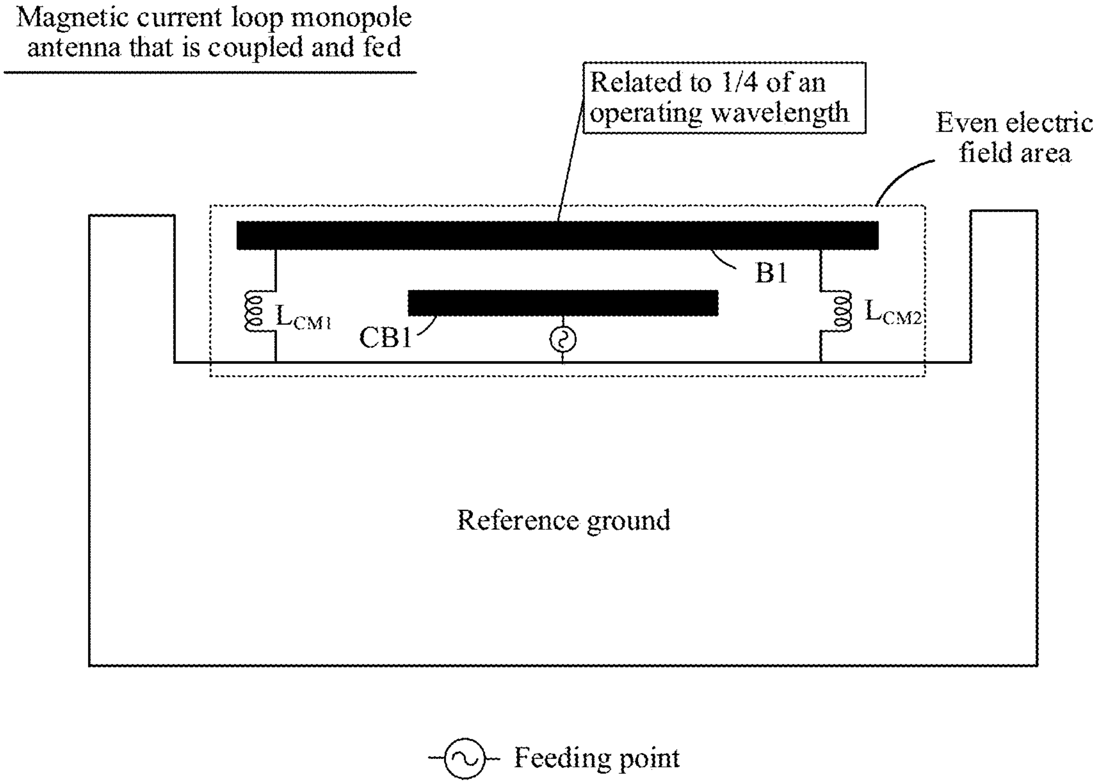
FIG. 46 is a schematic diagram of a magnetic current loop monopole antenna that is coupled and fed according to an embodiment of this application.

For example, FIG. 46 is a schematic diagram of composition of a magnetic current loop monopole antenna that is coupled and fed according to an embodiment of this application.

With reference to the description in the direct feed solution (description as shown in FIG. 17), the magnetic current loop monopole antenna shown in this example may include one radiation branch B1. One end of the B1 may be grounded through an inductor. For example, in this example, one end of the B1 may be grounded through an inductor $L_{CM1}$. Different from the composition shown in FIG. 17, in this example, one end of the B1 that is coupled to the feeding point as shown in FIG. 17 may also be grounded through an inductor. For example, the other end of the B1 may be grounded through an inductor $L_{CM2}$. For example, a value range of the inductor $L_{CM1}$ and a value range of the inductor $L_{CM2}$ may refer to a range of $L_a$, which is also an inductor connected in parallel in the foregoing description.

It is to be noted that with reference to the description of a distance between the inductor and the feeding point in the direct feed solution, in some implementations of this example, a distance between the inductor $L_{CM1}$ and the inductor $L_{CM2}$ may also be controlled to be between a ⅛ wavelength and a 1-fold wavelength of an operating wavelength, thereby obtaining magnetic current loop radiation having characteristics of an even electric field.

In embodiments of this application, a length of the radiation branch B1 of the magnetic current loop monopole antenna may be related to an operating frequency band. For example, a length of the B1 may be less than ¼ of the wavelength corresponding to the operating frequency band. A wavelength corresponding to the operating frequency band may be a wavelength of a central frequency point of the operating frequency band.

In this example, between the B1 and the reference ground, the feeding branch may be further arranged. For example, the feeding branch may have composition as shown in (a) in FIG. 45. For example, the feeding branch may include a radiator CB1, and a feeding point arranged at a center of the CB1. The feeding branch may be used to excite the radiation branch B1 to perform radiation having the radiation characteristics of the magnetic current loop antenna through electromagnetic coupling during operation.

In some embodiments, when the magnetic current loop monopole antenna that is coupled and fed is arranged in an electronic device, a configuration position of the magnetic current loop monopole antenna and a method example are similar to the direct feed solution shown in FIG. 17. This is not repeated herein.

Figure 47:
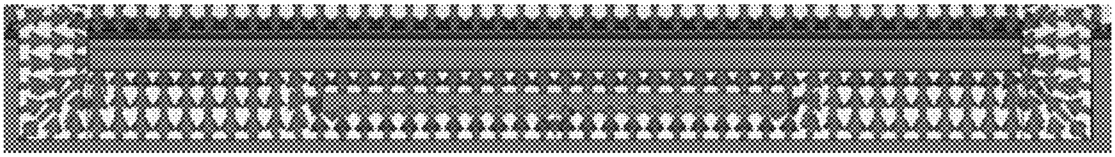
FIG. 47 is a schematic simulation diagram of an electric field of a magnetic current loop monopole antenna that is coupled and fed according to an embodiment of this application.
Figure 47:
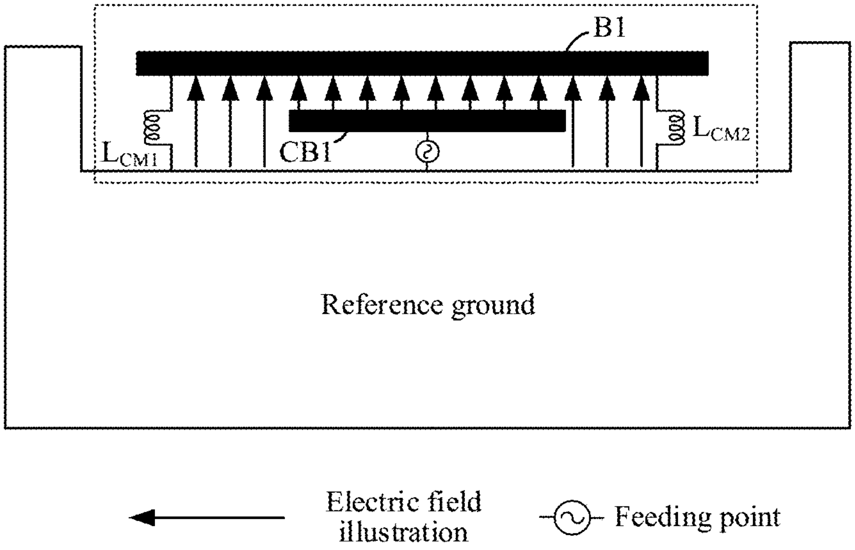

As a possible implementation of a magnetic current loop antenna, a magnetic current loop monopole antenna with the composition shown in FIG. 46 provided in this example may generate an even electric field close to a radiator of an antenna during operation. For example, FIG. 47 is a schematic simulation diagram of an electric field in an operating scenario of a magnetic current loop monopole antenna according to this example. (a) in FIG. 47 shows illustration of an actual simulation result. For a clearer description, (b) in FIG. 47 shows logical illustration of electric field distribution. It may be learnt that when the magnetic current loop monopole antenna is operating, an evenly distributed electric field may be generated in an area enclosed by the B1, the reference ground, and the CB1. Therefore, the magnetic current loop monopole antenna conforms to radiation characteristics of a magnetic current loop antenna.

The magnetic current loop monopole antenna that is coupled and fed provided in embodiments of this application may generate an evenly distributed electric field around a radiator of an antenna, and simultaneously also has better radiation performance for covering at least one operating frequency band.

For example, a radiation condition of the magnetic current loop monopole antenna that is coupled and fed will be described below with reference to the simulation result in FIG. 48 and FIG. 49.

Figure 48:
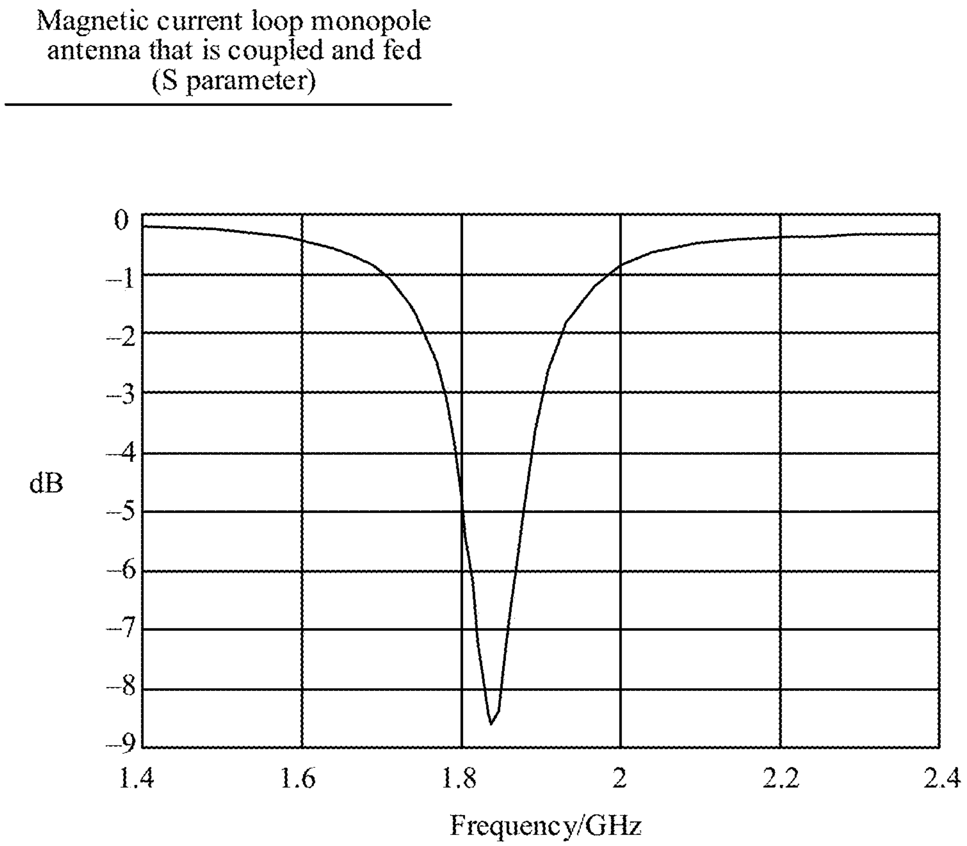
FIG. 48 is a schematic simulation diagram of an S parameter of a magnetic current loop monopole antenna that is coupled and fed according to an embodiment of this application.
Figure 48:
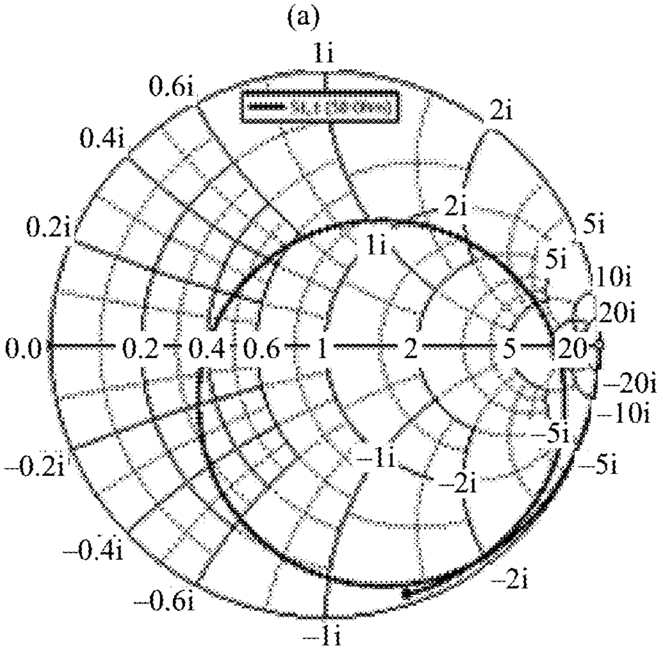

FIG. 48 is a schematic simulation diagram of an S parameter of a magnetic current loop monopole antenna that is coupled and fed according to an embodiment of this application. As shown in (a) in FIG. 48, the magnetic current loop monopole antenna in this example may generate one resonance around 1.85 GHz. A bandwidth of −2 dB of the resonance on S11 is close to 200 MHz, and the deepest point exceeds −8 dB. As shown in (b) in FIG. 48, in a case that without any matching circuit, the magnetic current loop monopole antenna that is coupled and fed provided in embodiments of this application has better port matching characteristics on a Smith (Smith) chart. Therefore, the magnetic current loop monopole antenna that is coupled and fed provided in embodiments of this application may save space occupied by a matching circuit in a configuration process.

Figure 49:
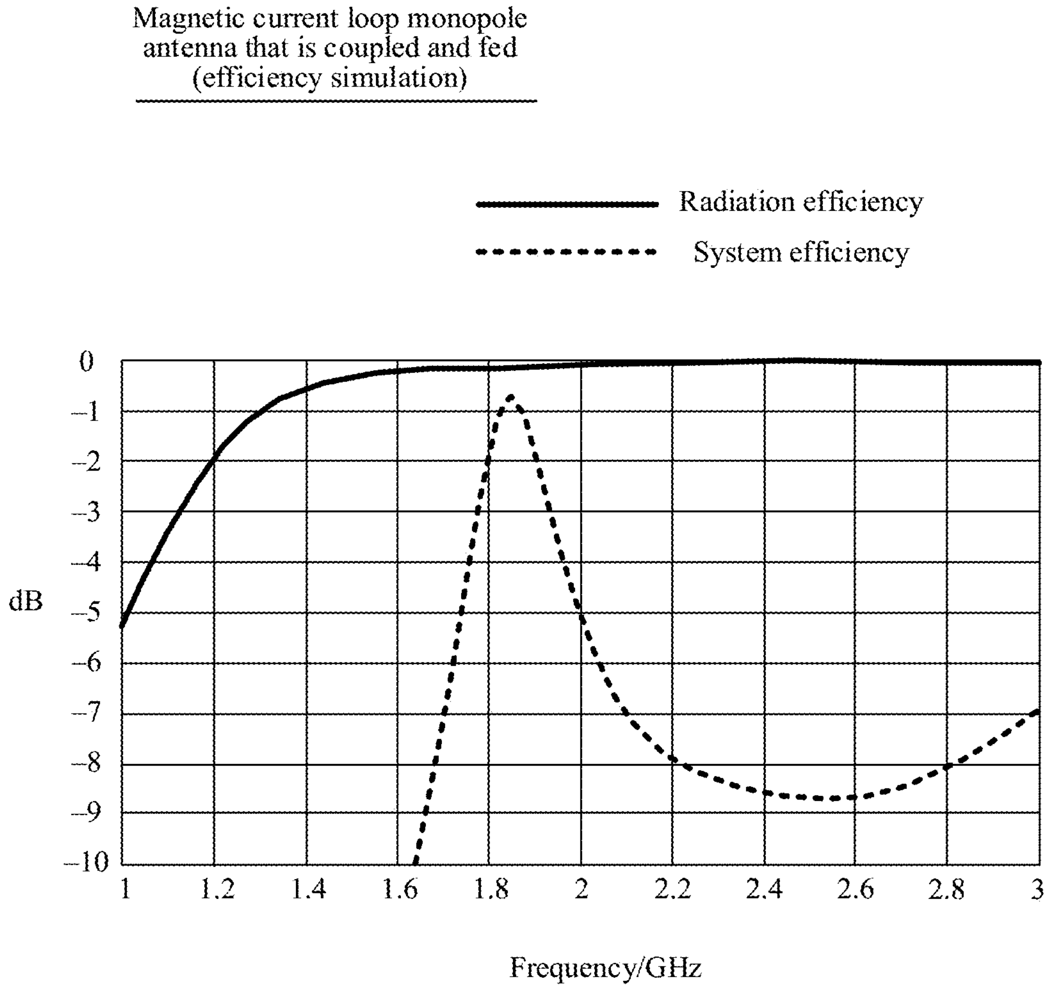
FIG. 49 is a schematic simulation diagram of efficiency of a magnetic current loop monopole antenna that is coupled and fed according to an embodiment of this application.

FIG. 49 is a schematic diagram of efficiency of a magnetic current loop monopole antenna that is coupled and fed according to an embodiment of this application. It may be learnt that radiation efficiency between 1.4 GHz and 2.5 GHz is above −1 dB and is close to 0 dB, a corresponding system efficiency peak value also exceeds −1 dB, and the bandwidth of −2 dB exceeds 200 MHz. Therefore, the magnetic current loop monopole antenna that is coupled and fed provided in embodiments of this application may cover at least one operating frequency band, to achieve an effect of effectively supporting a wireless communication function of the electronic device.

Figure 50:
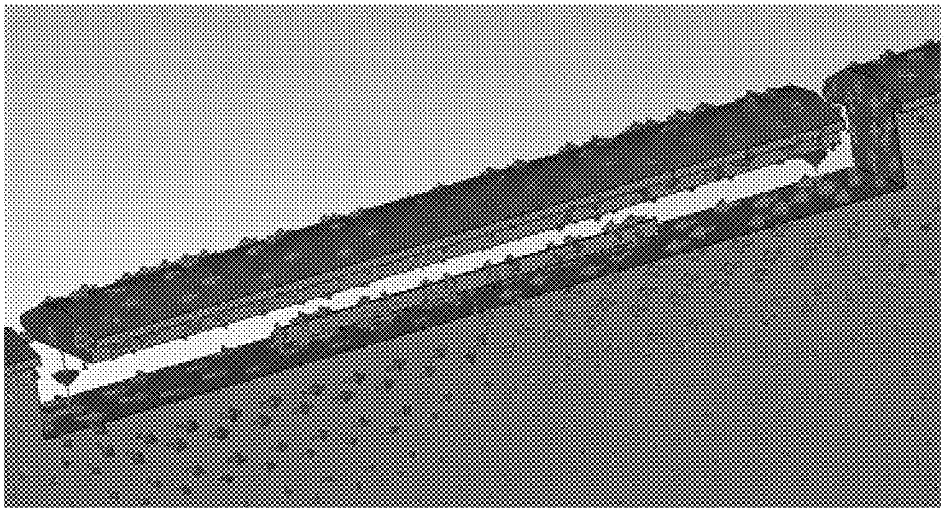
FIG. 50 is a schematic simulation diagram of a current of a magnetic current loop monopole antenna that is coupled and fed according to an embodiment of this application.
Figure 50:
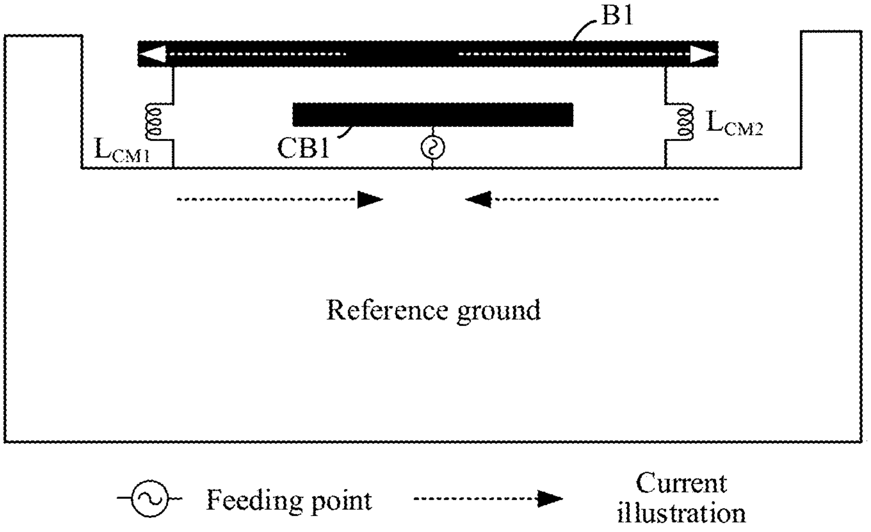

Based on the foregoing description, this example further provides a schematic simulation diagram of a current of the magnetic current loop monopole antenna that is coupled and fed. For example, referring to FIG. 50, (a) in FIG. 50 is an actual simulation result. For the convenience of description, (b) in FIG. 50 shows logical distribution illustration of a current corresponding to (a) in FIG. 22. With reference to the example and description in FIG. 22, in this example, through excitation of coupled feeding, a primary reverse current may be formed on the radiation branch B1 and the reference ground. It may be understood that the primary reverse current is caused by the inductor arranged at one end of the B1, and therefore, conforms to current distribution characteristics of the magnetic current loop antenna during operation.

With reference to the foregoing description, in this example, as well as the magnetic current loop antenna based on coupled feeding provided in the subsequent description, a position of the feeding branch may be flexibly set, and a length of the feeding branch may be used to adjust a port matching condition of the antenna.

The conclusion is verified by using the magnetic current loop monopole antenna that is coupled and fed as an example.

Figure 51:
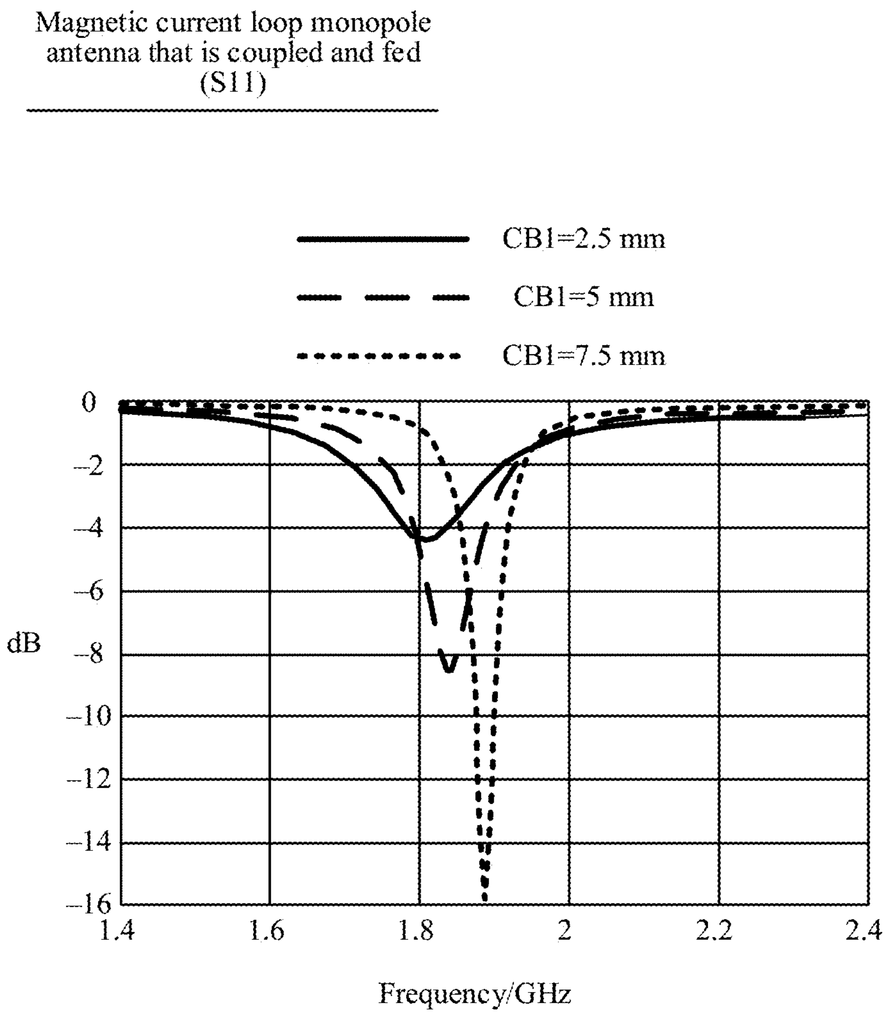
FIG. 51 is a schematic S11 simulation diagram of a feeding branch with different lengths according to an embodiment of this application.
Figure 52:
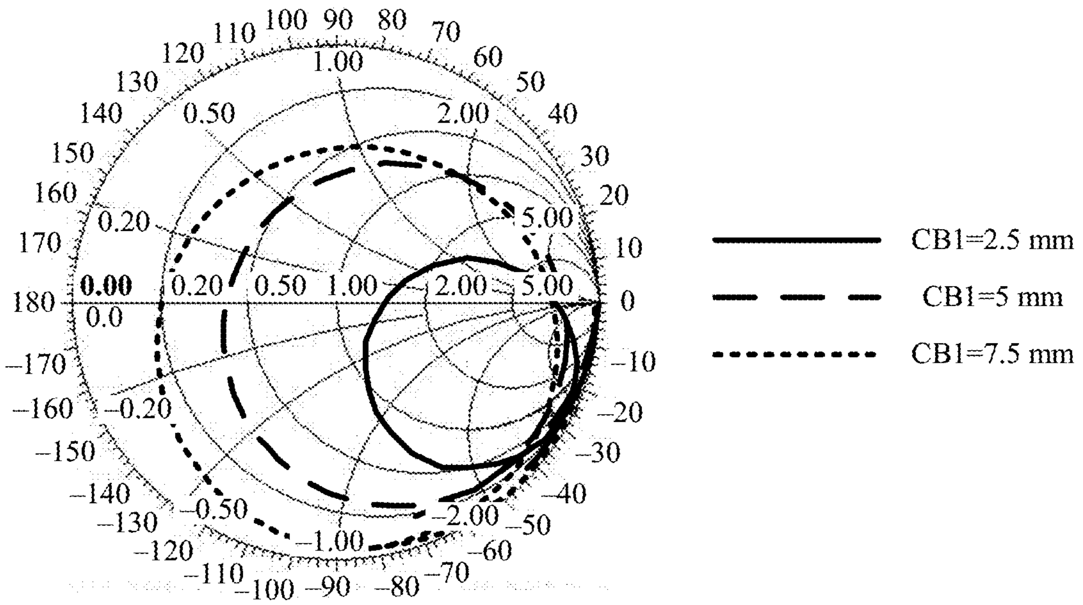
FIG. 52 is a schematic simulation diagram of a Smith chart of a feeding branch with different lengths according to an embodiment of this application.
Figure 53:
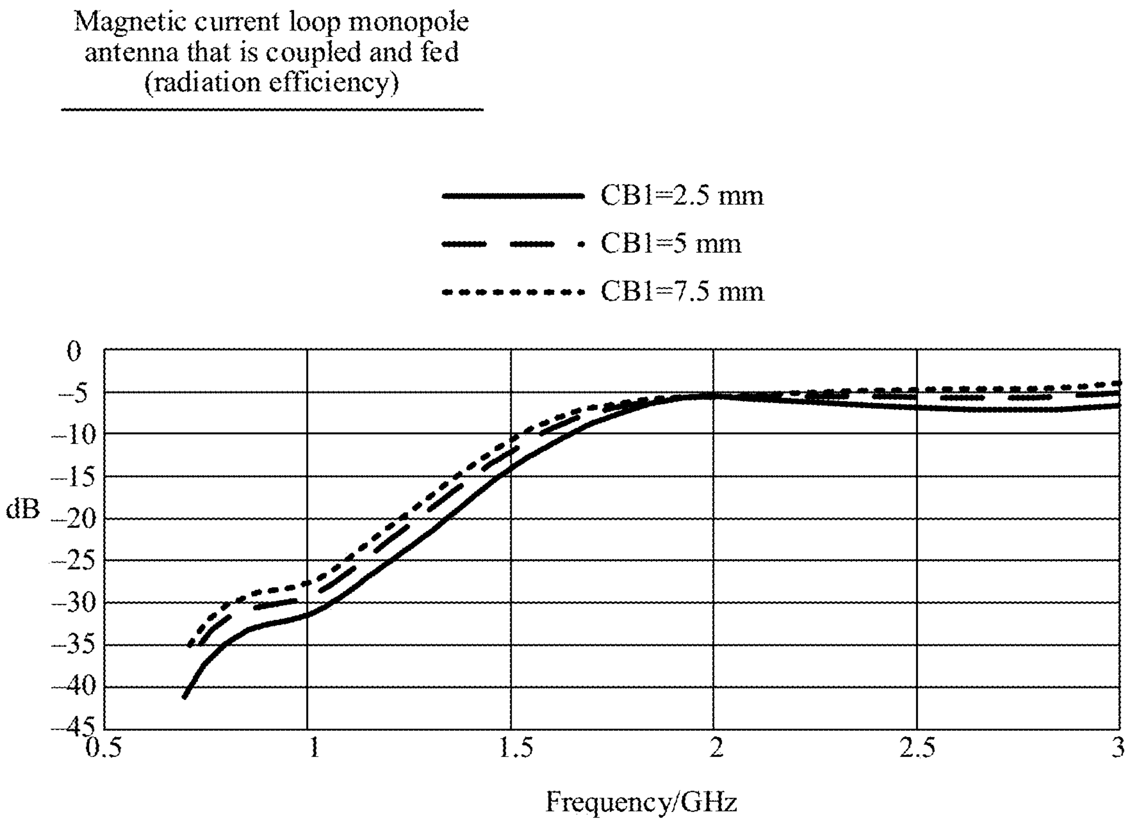
FIG. 53 is a schematic simulation diagram of efficiency of a feeding branch with different lengths according to an embodiment of this application.

For example, FIG. 51 is a schematic diagram of comparison of S11 of the magnetic current loop antenna that is coupled and fed in a case that the feeding branch has different lengths and other conditions remain the same. It may be learnt that when the length of the CB1 is set to 2.5 mm, 5 mm, or 7.5 mm, there is a significant change in S11. Specific representation is a significant change in a resonant depth and a small frequency deviation. The change conforms to a change trend of S11 under a condition of a port matching change. Verification is further performed with reference to comparison of the Smith (Smith) chart subsequently. Referring to FIG. 52, it may be learnt that as the length of the CB1 increases, an impedance circle becomes larger, and therefore, port matching of a corresponding antenna changes. For example, in a current environment, it may be learnt that, relatively speaking, when the CB1 is between 2.5 mm and 5 mm, the port matching is better, and therefore, better radiation performance in the current environment may be obtained. Still with reference to the efficiency illustration in FIG. 53, it may be learnt that under different lengths of the CB1, due to a change of the port matching, the radiation efficiency has an obvious change at around 1.5 GHz. But it may be simultaneously learnt that there is no big difference in a slot of the radiation efficiency. Therefore, it may also be considered that the difference is caused by a difference in a port matching state.

Figure 54:
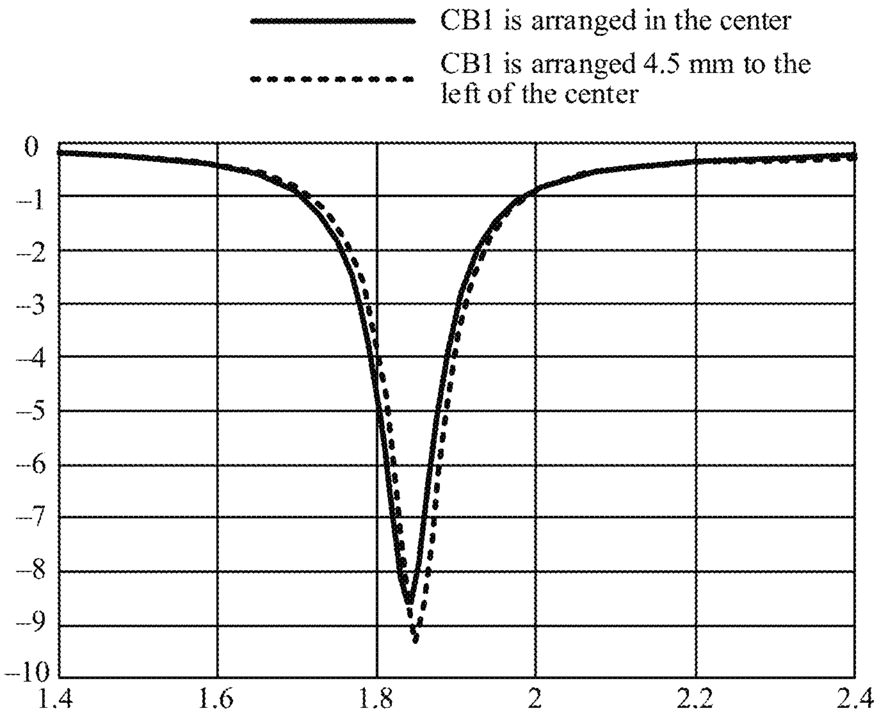
FIG. 54 is a schematic simulation diagram of an S parameter of a feeding branch at different positions according to an embodiment of this application.
Figure 54:
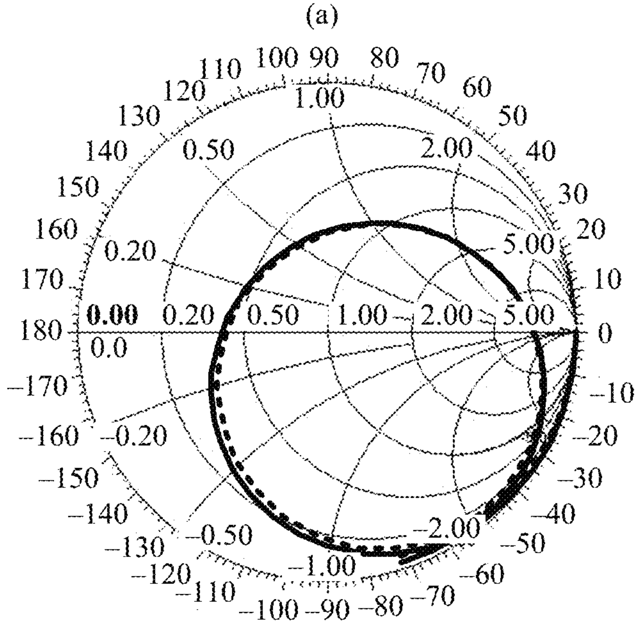
Figure 55:
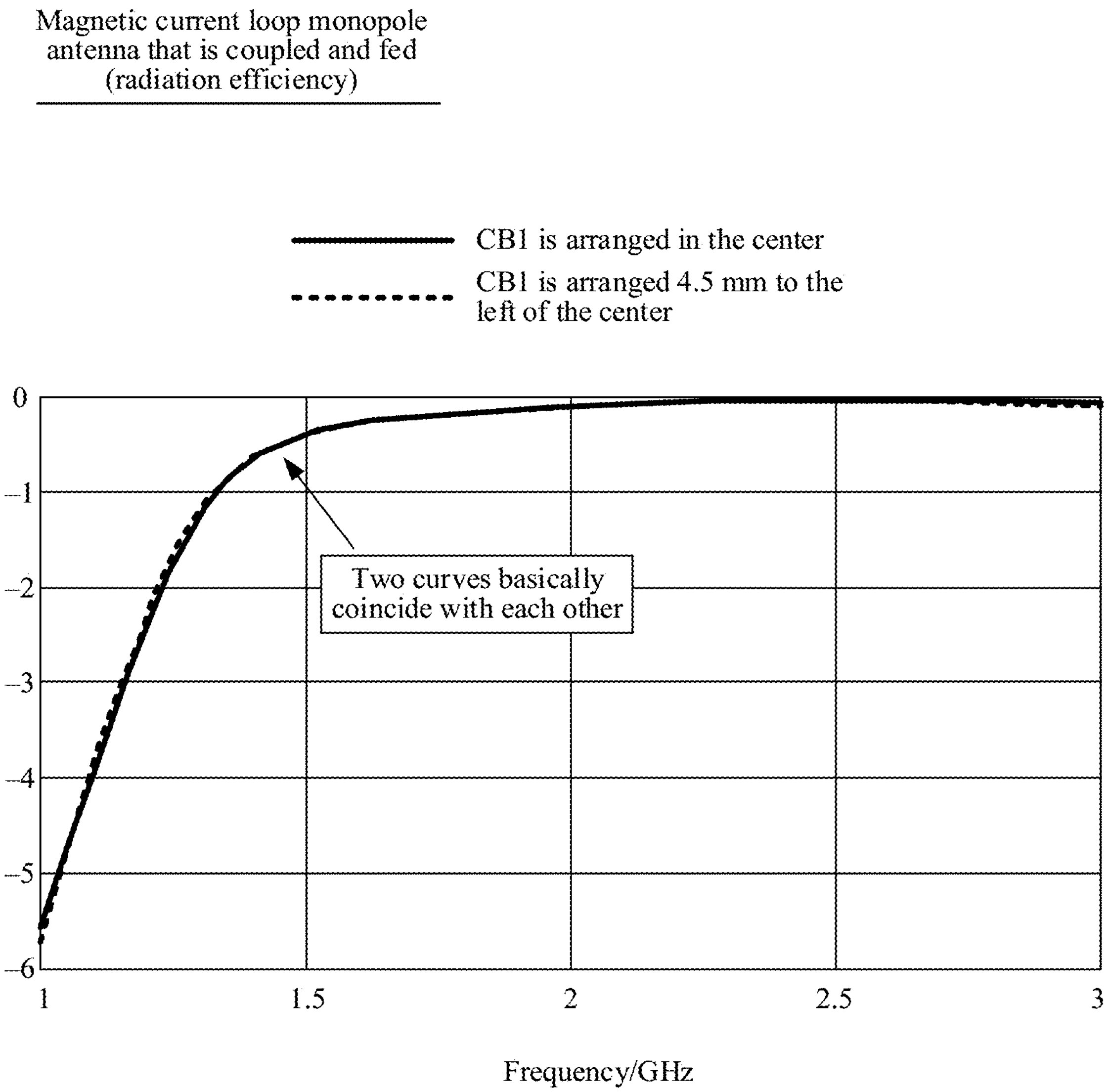
FIG. 55 is a schematic simulation diagram of efficiency of a feeding branch at different positions according to an embodiment of this application.

The influence of feeding branches at different positions on antenna radiation is verified below with reference to the accompanying drawings. For example, FIG. 54 is a schematic simulation diagram of an S parameter of the antenna at different CB1 positions. (a) in FIG. 54 shows comparison of S11, and (b) in FIG. 54 shows comparison of the Smith chart. It may be learnt that when a position of the CB1 is in the center, and the position of the CB1 is 4.5 mm to the left of the center, there is no significant change in the S11 and the Smith chart. It may be understood that the conclusion is similar when the CB1 moves to the right. Still with reference to the schematic simulation diagram of efficiency shown in FIG. 55, it may be learnt that there is no significant change in the radiation efficiency when the CB1 is at different positions, such as when the CB1 is arranged in the center, and when the CB1 is arranged 4.5 mm to the left of the center.

This may prove the conclusion mentioned in the foregoing description that the length of the feeding branch may be used for port matching and the position of the feeding branch may be flexibly set. The conclusion is also applicable to other magnetic current loop antennas that are coupled and fed. The description will not be repeated subsequently.

Figure 56:
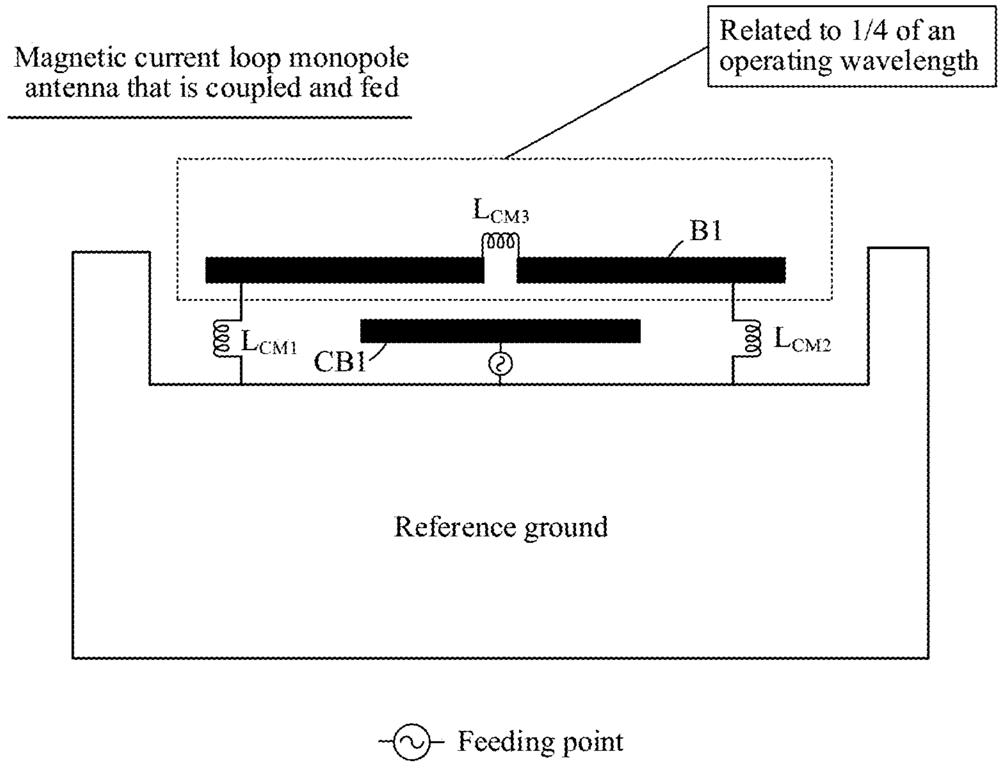
FIG. 56 is a schematic diagram of a magnetic current loop monopole antenna that is coupled and fed according to an embodiment of this application.

It is to be noted that in some other embodiments of this application, based on the composition of the magnetic current loop monopole that is coupled and fed as shown in FIG. 46, an enhanced design of the radiation efficiency may be further implemented by connecting more inductors in series on the radiator B1. For example, in the example shown in FIG. 56, an inductor $L_{CM3}$ connected in series may be arranged on the B1, to cause the electric field distribution to be more even, thereby improving the radiation efficiency. In different implementations of this application, setting of a position of the inductor connected in series on the radiator and setting of a quantity of inductors may be flexibly selected based on actual needs. This is not limited in embodiments of this application. For example, a value range of the inductor $L_{CM3}$ may refer to a range of $L_b$, which is also an inductor connected in series in the foregoing description, and will not be repeated herein.

In addition, in this example, the description is made by using the composition of the feeding branch as shown in (a) in FIG. 45 to perform coupled feeding. It may be understood that when feeding branches of other compositions as shown in FIG. 45 are used for coupled feeding, an effect in the foregoing example may also be obtained, and details will not be repeated herein.

In different specific implementation processes, a specific implementation of the magnetic current loop monopole antenna having any composition as shown in FIG. 46 to FIG. 56 may be different. For example, in some embodiments, radiation branches of the magnetic current loop monopole antenna may be fully or partially multiplexed by a metal frame of the electronic device. In some other embodiments, the radiation branch of the magnetic current loop monopole antenna may also be implemented in a form such as a flexible printed circuit (Flexible Printed Circuit, FPC), and a metalframe diecasting for anodicoxidation (Metalframe Diecasting for Anodicoxidation, MDA). A specific implementation form of the magnetic current loop monopole antenna is not limited in embodiments of this application.

The foregoing describes the coupled feeding solution provided in embodiments of this application with reference to the magnetic current loop monopole antenna. An example in which the magnetic current loop antenna is used as the magnetic current loop dipole antenna as an example, the description of the coupled feeding solution provided in embodiments of this application will be continued below.

It may be understood that an existing monopole antenna implements radiation through a radiation structure of a ¼ wavelength. Correspondingly, based on a mirror image principle, a dipole antenna implements radiation through a radiation structure of a ½ wavelength.

In this example, based on the existing dipole, the dipole is improved, to obtain a corresponding magnetic current loop dipole antenna that is coupled and fed.

Figure 57:
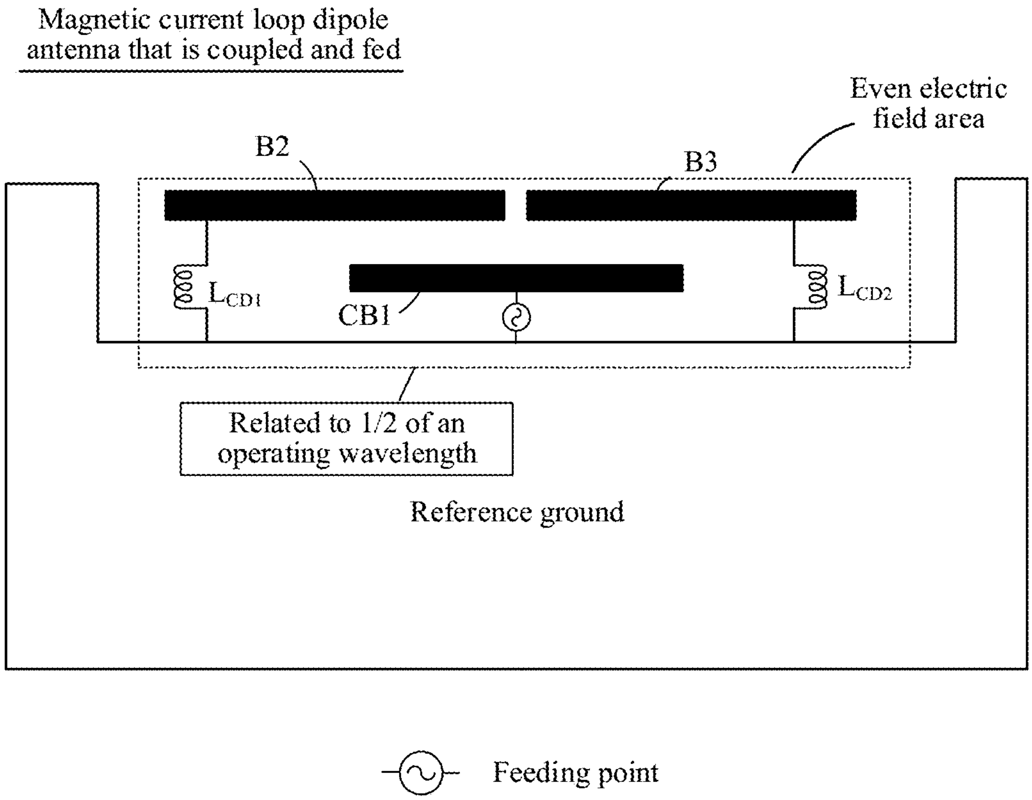
FIG. 57 is a schematic diagram of a magnetic current loop dipole antenna that is coupled and fed according to an embodiment of this application.

FIG. 57 is a schematic diagram of composition of a magnetic current loop dipole antenna according to an embodiment of this application. Similar to the direct feed solution design in FIG. 25, the magnetic current loop dipole antenna shown in this example may include at least two radiation branches, such as the B2 and the B3. One end of the B2 and one end of the B3 that are arranged opposite to each other may be separated by a slot. One end of the B2 that is away from the B3 and one end of the B3 that is away from the B2 may be respectively grounded through an inductor. For example, one end of the B2 that is away from the B3 may be grounded through an inductor $L_{CD1}$, and correspondingly, one end of the B3 that is away from the B2 may be grounded through an inductor $L_{CD2}$. For example, a value range of the inductor $L_{CD1}$ and a value range of the inductor $L_{CD2}$ may refer to a range of $L_a$, which is also an inductor connected in parallel in the foregoing description, and will not be repeated herein.

It is to be noted that with reference to the description of a distance between the inductor and the feeding point in the direct feed solution, in some implementations of this example, a distance between the inductor $L_{CD1}$ and the slot (namely, one end of the inductor $L_{CD1}$ to the B2 close to the B3) may also be controlled to be between a ⅛ wavelength and a 1-fold wavelength of an operating wavelength, thereby obtaining magnetic current loop radiation having even electric field characteristics. Similarly, in some other embodiments of this example, a distance between the inductor $L_{CD2}$ and the slot (namely, one end of the inductor $L_{CD2}$ to the B3 close to the B2) may also be controlled to be between the ⅛ wavelength and the 1-fold wavelength of the operating wavelength, thereby obtaining magnetic current loop radiation having even electric field characteristics.

In embodiments of this application, a size of the radiation branch of the magnetic current loop dipole antenna may be related to an operating frequency band. For example, a length of the B2 or the B3 may be less than ¼ of the wavelength corresponding to the operating frequency band. In other words, in embodiments of this application, a length of the radiation branch including the B2 and the B3 may be less than ½ of the wavelength corresponding to the operating frequency band. In some embodiments, the length of the radiation branch including the B2 and the B3 may be greater than ¼ of the operating frequency band. A wavelength corresponding to the operating frequency band may be a wavelength of a central frequency point of the operating frequency band.

In some embodiments, when the magnetic current loop dipole antenna that is coupled and fed is arranged in an electronic device, a configuration position of the magnetic current loop dipole antenna and a method example are similar to the direct feed solution shown in FIG. 26. This is not repeated herein.

Figure 58:
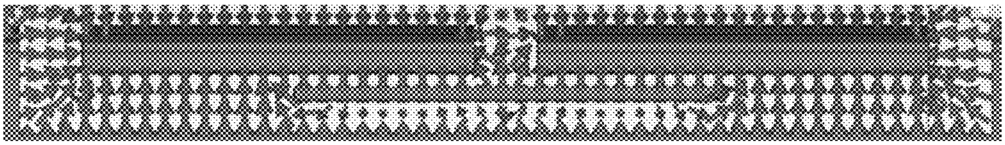
FIG. 58 is a schematic simulation diagram of an electric field of a magnetic current loop dipole antenna that is coupled and fed according to an embodiment of this application.
Figure 58:
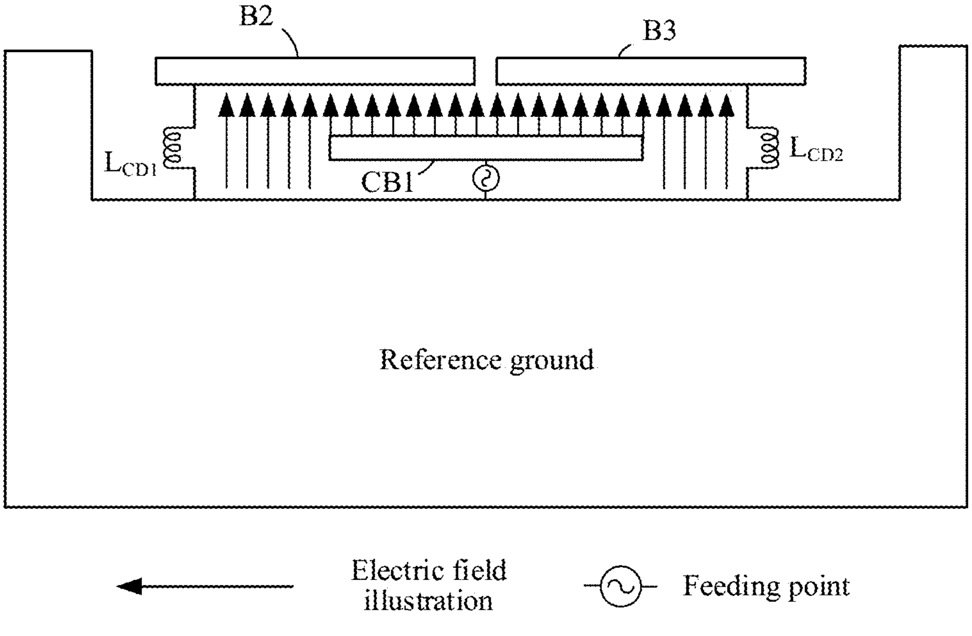

As a possible implementation of a magnetic current loop antenna, a magnetic current loop dipole antenna with the composition shown in FIG. 57 provided in this example may generate an even electric field close to a radiator of an antenna during operation. For example, FIG. 58 is a schematic simulation diagram of an electric field in an operating scenario of a magnetic current loop dipole antenna according to this example. (a) in FIG. 58 shows illustration of an actual simulation result. For a clearer description, (b) in FIG. 58 shows logical illustration of electric field distribution. It may be learnt that when the magnetic current loop dipole antenna is operating, an evenly distributed electric field may be generated in an area enclosed by the B2, the B3, the reference ground, and the CB1. Therefore, the magnetic current loop dipole antenna conforms to the radiation characteristics of the magnetic current loop antenna.

The magnetic current loop dipole antenna that is coupled and fed provided in embodiments of this application may generate an evenly distributed electric field around a radiator of an antenna, and simultaneously also has better radiation performance for covering at least one operating frequency band.

For example, a radiation condition of the magnetic current loop dipole antenna that is coupled and fed will be described below with reference to the simulation result in FIG. 59 and FIG. 60.

Figure 59:
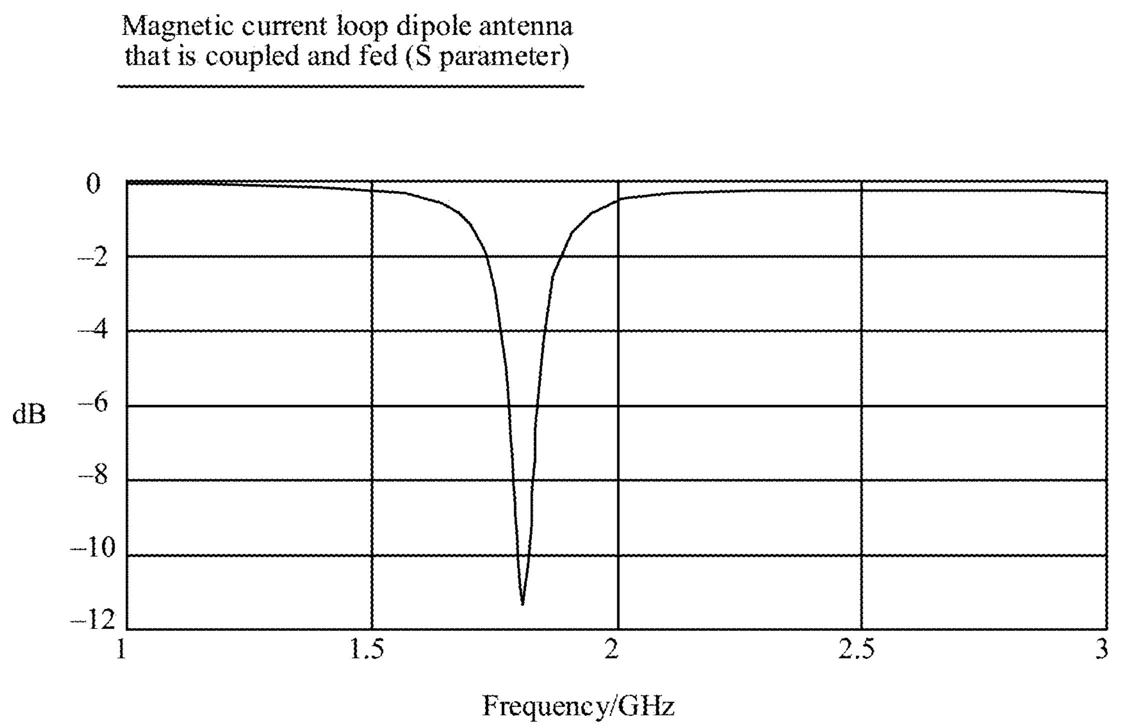
FIG. 59 is a schematic simulation diagram of an S parameter of a magnetic current loop dipole antenna that is coupled and fed according to an embodiment of this application.
Figure 59:
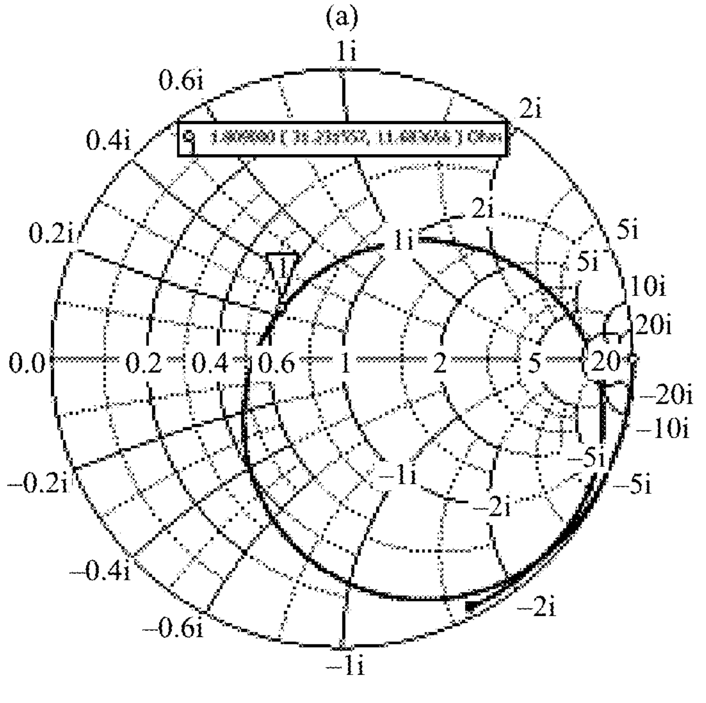

FIG. 59 is a schematic simulation diagram of an S parameter of a magnetic current loop dipole antenna that is coupled and fed according to an embodiment of this application. As shown in (a) in FIG. 59, the magnetic current loop dipole antenna in this example may generate one resonance around 1.8 GHz. A bandwidth of −2 dB of the resonance on S11 is close to 200 MHz, and the deepest point exceeds −10 dB. As shown in (b) in FIG. 59, in a case that without any matching circuit, the magnetic current loop dipole antenna that is coupled and fed provided in embodiments of this application has better port matching characteristics on a Smith (Smith) chart. Therefore, the magnetic current loop dipole antenna that is coupled and fed provided in embodiments of this application may save space occupied by a matching circuit in a configuration process.

Figure 60:
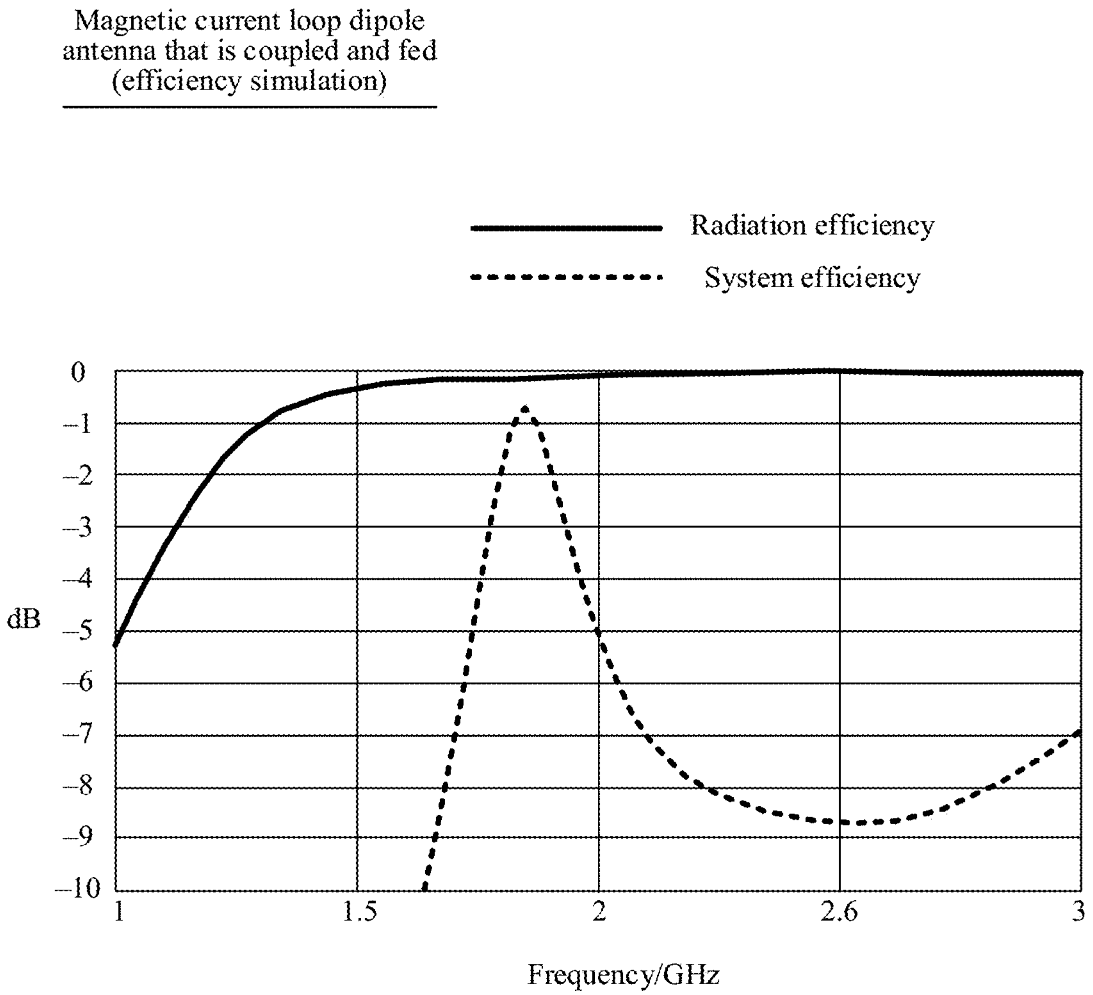
FIG. 60 is a schematic simulation diagram of efficiency of a magnetic current loop dipole antenna that is coupled and fed according to an embodiment of this application.
Figure 61:
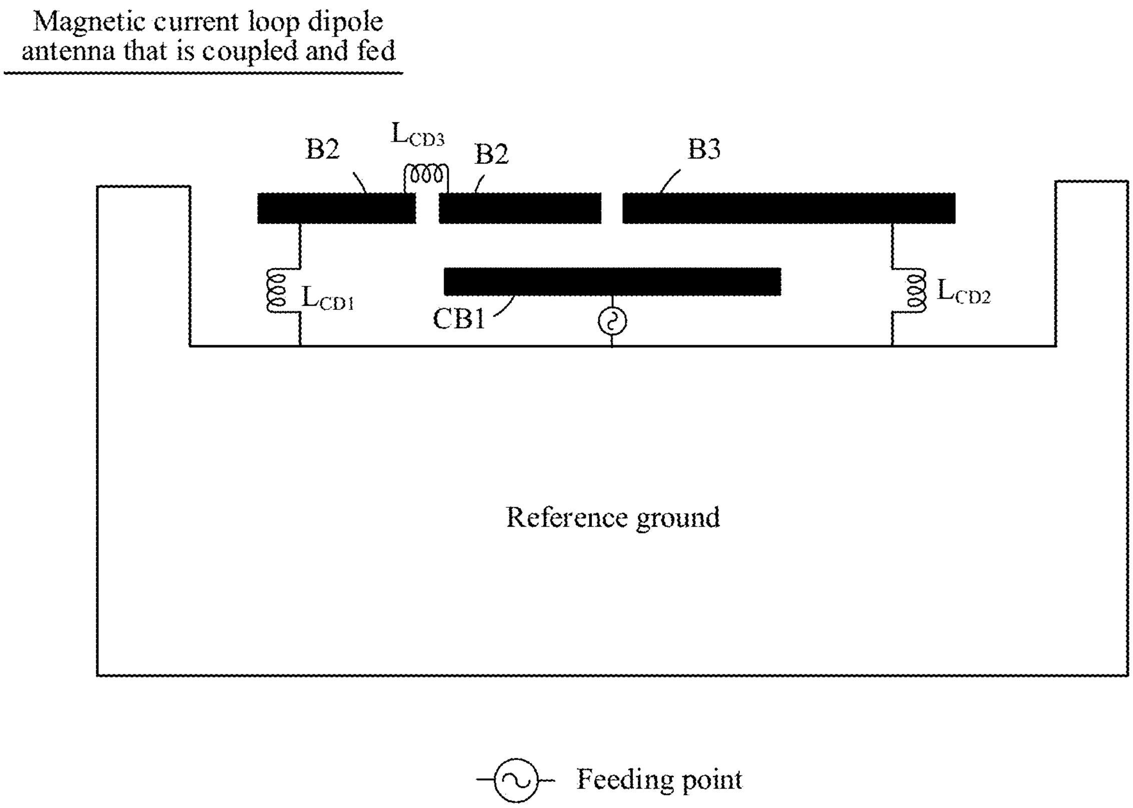
FIG. 61 is a schematic diagram of a magnetic current loop dipole antenna that is coupled and fed according to an embodiment of this application.

FIG. 60 is a schematic diagram of efficiency of a magnetic current loop dipole antenna that is coupled and fed according to an embodiment of this application. It may be learnt that radiation efficiency between 1.4 GHz and 2.5 GHz is above −1 dB and is close to 0 dB, a corresponding system efficiency peak value also exceeds −1 dB, and the bandwidth of −2 dB exceeds 200 MHz. Therefore, the magnetic current loop dipole antenna that is coupled and fed provided in embodiments of this application may cover at least one operating frequency band, to achieve an effect of effectively supporting a wireless communication function of the electronic device.

It is to be noted that in some other embodiments of this application, based on the composition of the magnetic current loop dipole that is coupled and fed as shown in FIG. 57, an enhanced design of the radiation efficiency may be further implemented by connecting more inductors in series on the radiator B2 and/or B3. For example, in the example shown in FIG. 57, an inductor $L_{CD3}$ may be connected in series on the B2, to cause the electric field distribution to be more even, thereby improving the radiation efficiency. Certainly, in some other embodiments, an inductor may also be connected in series on the B3, or one or more inductors may be connected in series on the B2 and the B3, to improve the radiation efficiency of the antenna. In different implementations of this application, setting of a position of the inductor connected in series on the radiator and setting of a quantity of inductors may be flexibly selected based on actual needs. This is not limited in embodiments of this application. For example, a value range of the inductor $L_{CD3}$ may refer to a range of $L_b$, which is also an inductor connected in series in the foregoing description, and will not be repeated herein.

In addition, in this example, the description is made by using the composition of the feeding branch as shown in (a) in FIG. 45 to perform coupled feeding. It may be understood that when feeding branches of other compositions as shown in FIG. 45 are used for coupled feeding, an effect in the foregoing example may also be obtained, and details will not be repeated herein.

In different specific implementation processes, a specific implementation of the magnetic current loop dipole antenna having any composition as shown in FIG. 57 to FIG. 61 may be different. For example, in some embodiments, radiation branches of the magnetic current loop dipole antenna may be fully or partially multiplexed by a metal frame of the electronic device. In some other embodiments, the radiation branch of the magnetic current loop dipole antenna may be implemented in a form such as a flexible printed circuit (Flexible Printed Circuit, FPC), and a metalframe diecasting for anodicoxidation (Metalframe Diecasting for Anodicoxidation, MDA). A specific implementation form of the magnetic current loop dipole antenna is not limited in embodiments of this application.

The coupled feeding solution provided in embodiments of this application is described above with reference to a magnetic current loop wire antenna such as a magnetic current loop dipole antenna and a magnetic current loop dipole antenna. The coupled feeding solution provided in embodiments of this application will be described below with reference to the magnetic current loop groove antenna, such as a magnetic current loop left-hand antenna and a magnetic current loop slot antenna.

In this example, based on the existing left-hand pole, the left-hand pole is improved, to obtain a corresponding magnetic current loop left-hand antenna that is coupled and fed.

Figure 62:
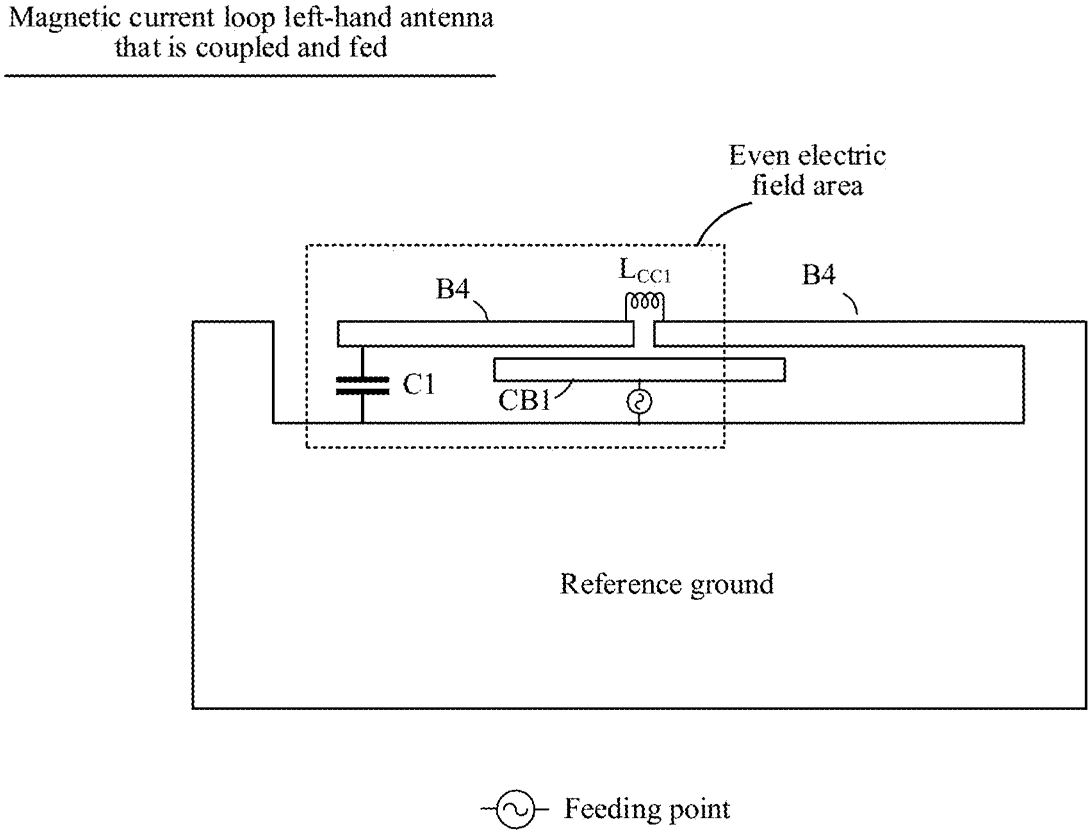
FIG. 62 is a schematic diagram of a magnetic current loop left-hand antenna that is coupled and fed according to an embodiment of this application.

FIG. 62 is a schematic diagram of composition of a magnetic current loop left-hand antenna that is coupled and fed according to an embodiment of this application. Similar to the design of the direct feed solution in FIG. 32, the magnetic current loop left-hand antenna shown in the example may include at least one radiation branch B4. One end of the B4 may be grounded. The other end of the B4 may be grounded through a capacitor C1. A left-hand characteristic of the antenna is implemented based on the C1. In some embodiments, a capacitance value of the capacitor C1 may not be greater than 3 PF.

The inductor $L_{CC1}$ may be connected in series on the radiator close to a ground end on the B4, and the inductor $L_{CC1}$ may be used to form an evenly distributed electric field between the radiator and the reference ground when the B4 is operating, to obtain the radiation characteristics of the magnetic current loop antenna.

In different embodiments, a position of the inductor $L_{CC1}$ may be flexible. In addition, for example, a value range of the inductor $L_{CC1}$ may refer to a range of $L_b$, which is also an inductor connected in series in the foregoing description, and will not be repeated herein.

It is to be noted that with reference to the description of a distance between the inductor and the feeding point in the direct feed solution, in some implementations of this example, a distance between one end of the inductor $L_{CC1}$ to the B4 close to the C1 may also be controlled to be between a ⅛ wavelength and a 1-fold wavelength of an operating wavelength, thereby obtaining magnetic current loop radiation having even electric field characteristics.

In some embodiments, when the magnetic current loop left-hand antenna that is coupled and fed is arranged in an electronic device, a configuration position of the magnetic current loop left-hand antenna and a method example are similar to the direct feed solution shown in FIG. 32. This is not repeated herein.

Figure 63:
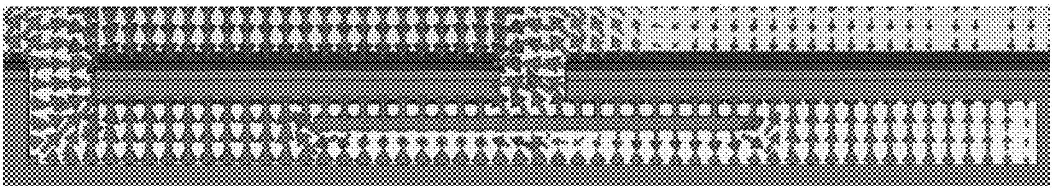
FIG. 63 is a schematic simulation diagram of an electric field of a magnetic current loop left-hand antenna that is coupled and fed according to an embodiment of this application.
Figure 63:
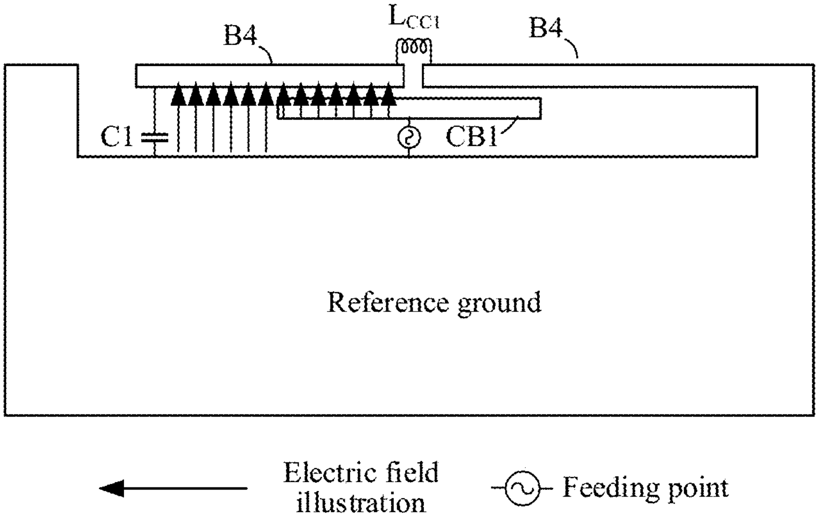

As a possible implementation of a magnetic current loop antenna, this example provides a magnetic current loop left-hand antenna with the composition shown in FIG. 62, which may generate an even electric field close to a radiator of an antenna during operation. For example, FIG. 63 is a schematic simulation diagram of an electric field in an operating scenario of a magnetic current loop left-hand antenna according to this example. (a) in FIG. 63 shows illustration of an actual simulation result. For a clearer description, (b) in FIG. 63 shows logical illustration of electric field distribution. It may be learnt that when the magnetic current loop left-hand antenna is operating, an evenly distributed electric field may be generated in an area enclosed by the B4, the reference ground, and the CB1. Therefore, the magnetic current loop left-hand antenna conforms to radiation characteristics of the magnetic current loop antenna.

The magnetic current loop left-hand antenna that is coupled and fed provided in embodiments of this application may generate an evenly distributed electric field around a radiator of an antenna, and simultaneously also has better radiation performance for covering at least one operating frequency band.

For example, a radiation condition of the magnetic current loop left-hand antenna that is coupled and fed will be described below with reference to the simulation result in FIG. 64 and FIG. 65.

Figure 64:
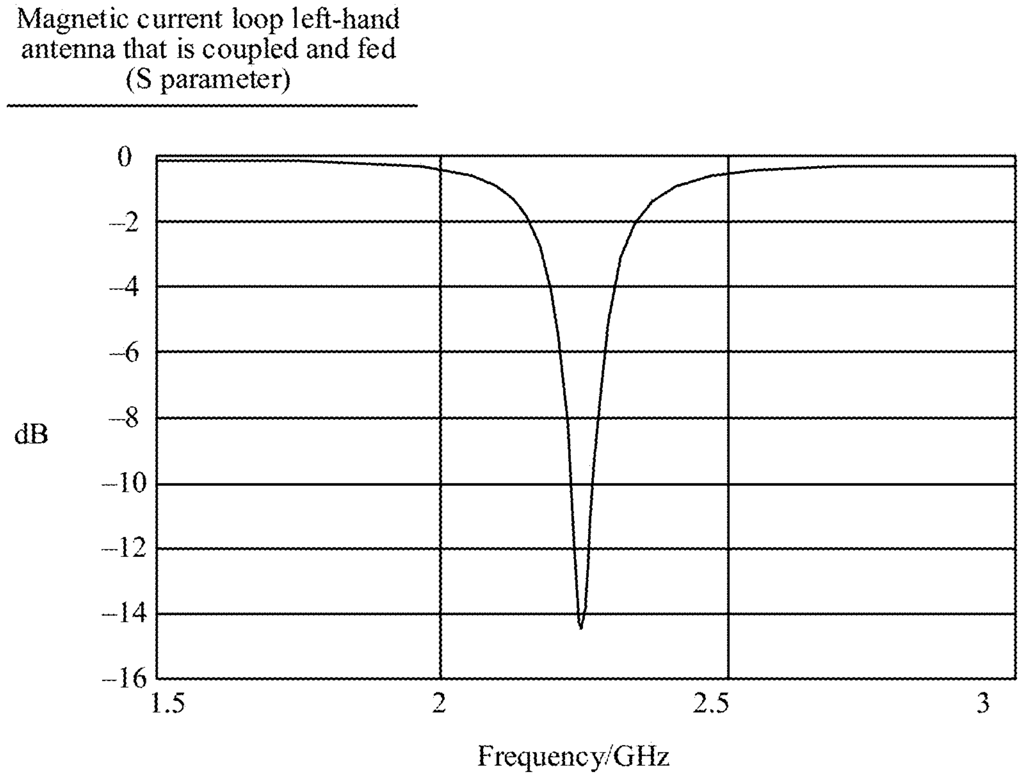
FIG. 64 is a schematic simulation diagram of an S parameter of a magnetic current loop left-hand antenna that is coupled and fed according to an embodiment of this application.
Figure 64:
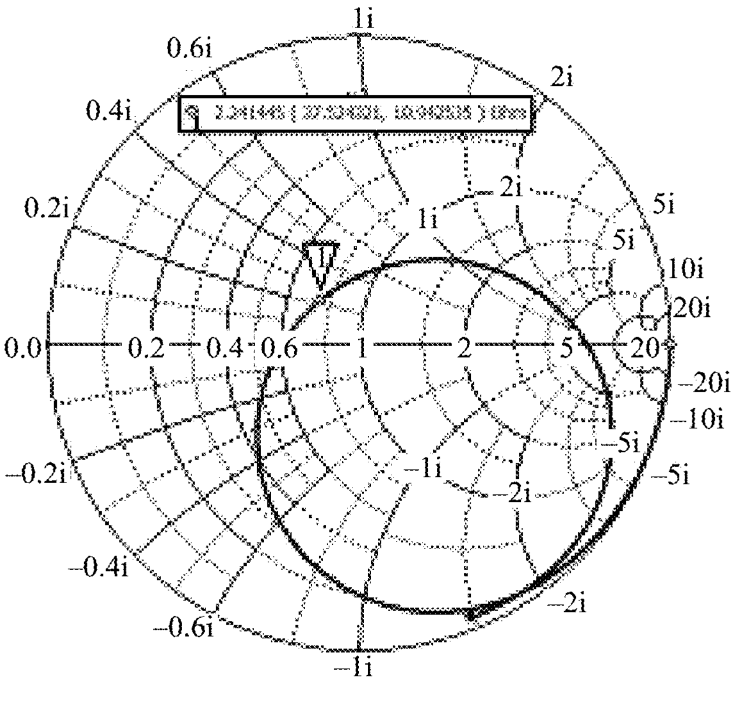

FIG. 64 is a schematic simulation diagram of an S parameter of a magnetic current loop left-hand antenna that is coupled and fed according to an embodiment of this application. As shown in (a) in FIG. 64, the magnetic current loop left-hand antenna in this example may generate one resonance around 2.3 GHZ. A bandwidth of −2 dB of the resonance on S11 is close to 200 MHz, and the deepest point exceeds −14 dB. As shown in (b) in FIG. 64, in a case that without any matching circuit, the magnetic current loop left-hand antenna that is coupled and fed provided in embodiments of this application has better port matching characteristics on a Smith (Smith) chart. Therefore, the magnetic current loop left-hand antenna that is coupled and fed provided in embodiments of this application may save space occupied by a matching circuit in a configuration process.

Figure 65:
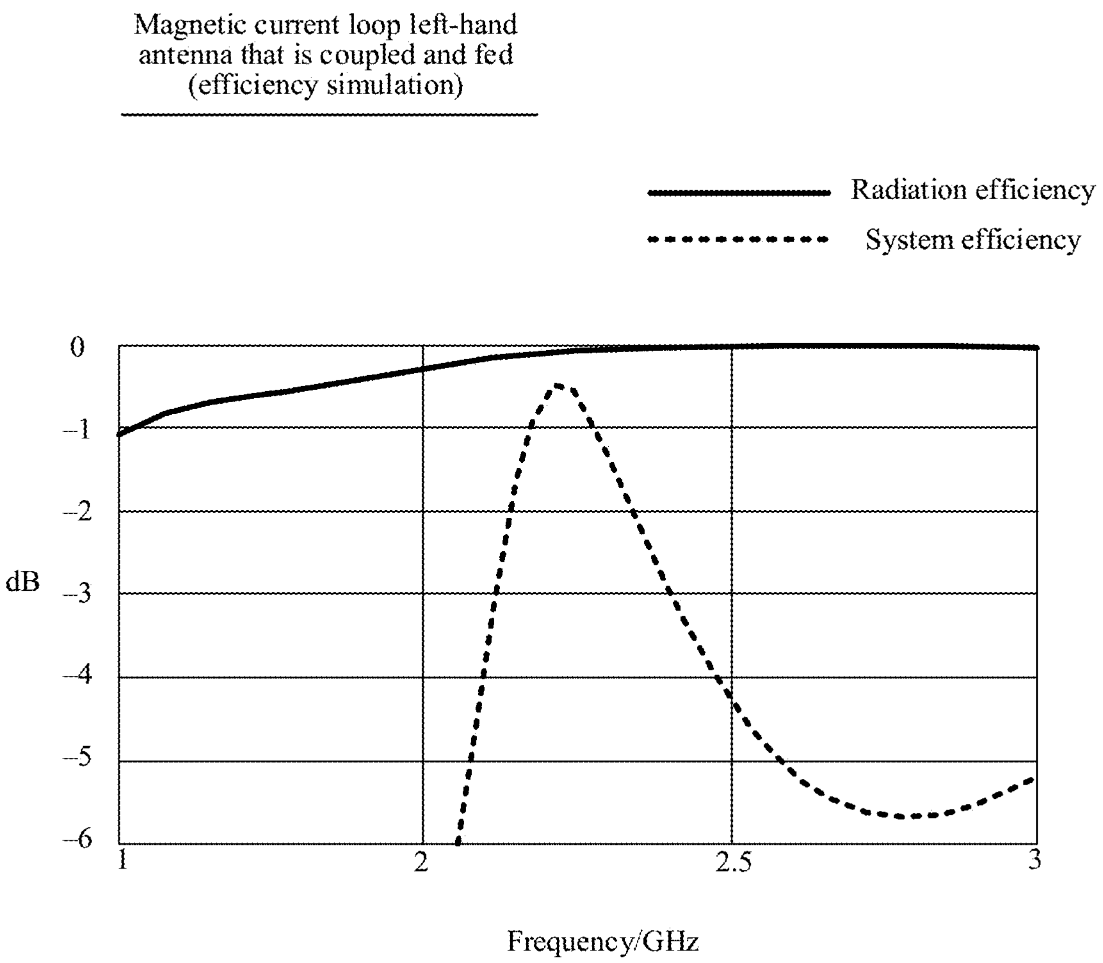
FIG. 65 is a schematic simulation diagram of efficiency of a magnetic current loop left-hand antenna that is coupled and fed according to an embodiment of this application.

FIG. 65 is a schematic diagram of efficiency of a magnetic current loop left-hand antenna that is coupled and fed according to an embodiment of this application. It may be learnt that radiation efficiency between 1.4 GHz and 2.5 GHz is above −1 dB and is close to 0 dB, a corresponding system efficiency peak value also exceeds −1 dB, and the bandwidth of −2 dB exceeds 200 MHz. Therefore, the magnetic current loop left-hand antenna that is coupled and fed provided in embodiments of this application may cover at least one operating frequency band, to achieve an effect of effectively supporting a wireless communication function of the electronic device.

Figure 66:
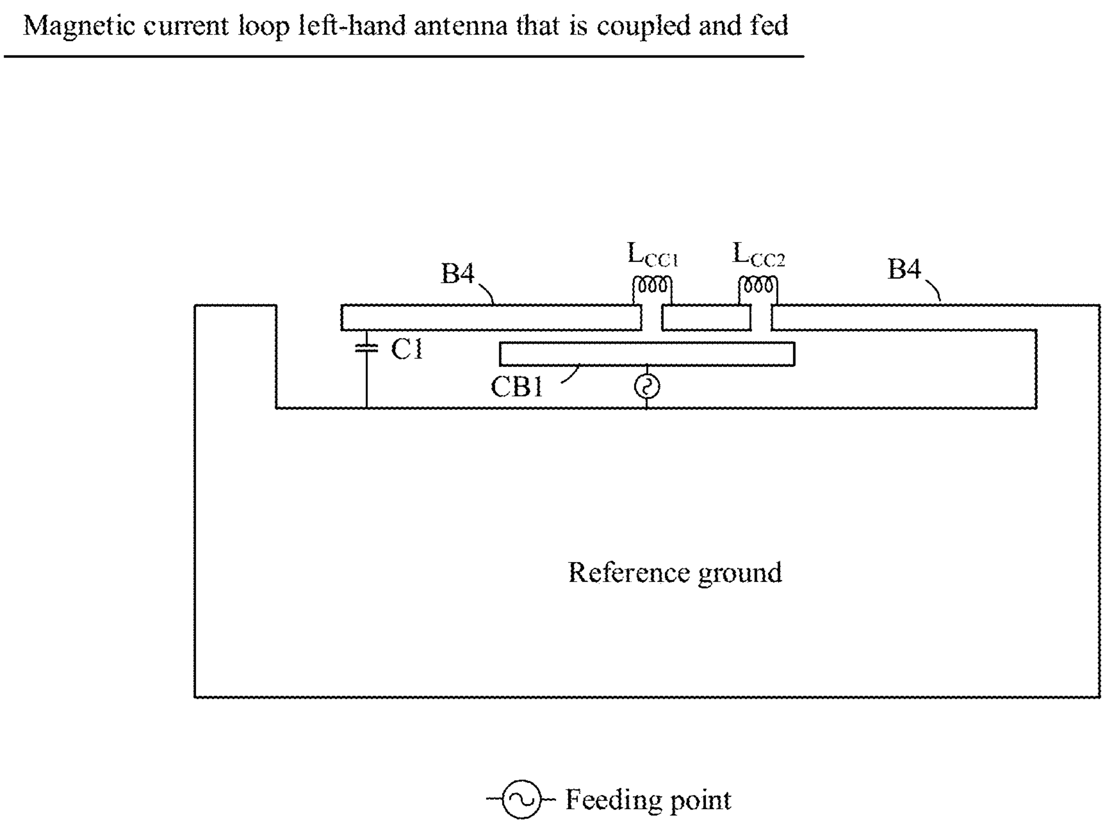
FIG. 66 is a schematic diagram of a magnetic current loop left-hand antenna that is coupled and fed according to an embodiment of this application.

It is to be noted that in some other embodiments of this application, based on the composition of the magnetic current loop left-hand that is coupled and fed as shown in FIG. 62, an enhanced design of the radiation efficiency may be further implemented by connecting more inductors in series on the radiator B4. For example, in the example shown in FIG. 66, an inductor $L_{CC2}$ may be connected in series on the B4, to cause the electric field distribution to be more even, thereby improving the radiation efficiency. In different implementations of this application, setting of a position of the inductor connected in series on the radiator and setting of a quantity of inductors may be flexibly selected based on actual needs. This is not limited in embodiments of this application. For example, a value range of the inductor $L_{CC2}$ may refer to a range of $L_b$, which is also an inductor connected in series in the foregoing description, and will not be repeated herein.

In addition, in this example, the description is made by using the composition of the feeding branch as shown in (a) in FIG. 45 to perform coupled feeding. It may be understood that when feeding branches of other compositions as shown in FIG. 45 are used for coupled feeding, an effect in the foregoing example may also be obtained, and details will not be repeated herein.

In different specific implementation processes, a specific implementation of the magnetic current loop left-hand antenna having any composition as shown in FIG. 62 to FIG. 66 may be different. For example, in some embodiments, radiation branches of the magnetic current loop left-hand antenna may be fully or partially multiplexed by a metal frame of the electronic device. In some other embodiments, the radiation branch of the magnetic current loop left-hand antenna may be implemented in a form such as a flexible printed circuit (Flexible Printed Circuit, FPC), and a metalframe diecasting for anodicoxidation (Metalframe Diecasting for Anodicoxidation, MDA). A specific implementation form of the magnetic current loop left-hand antenna is not limited in embodiments of this application.

Figure 67:
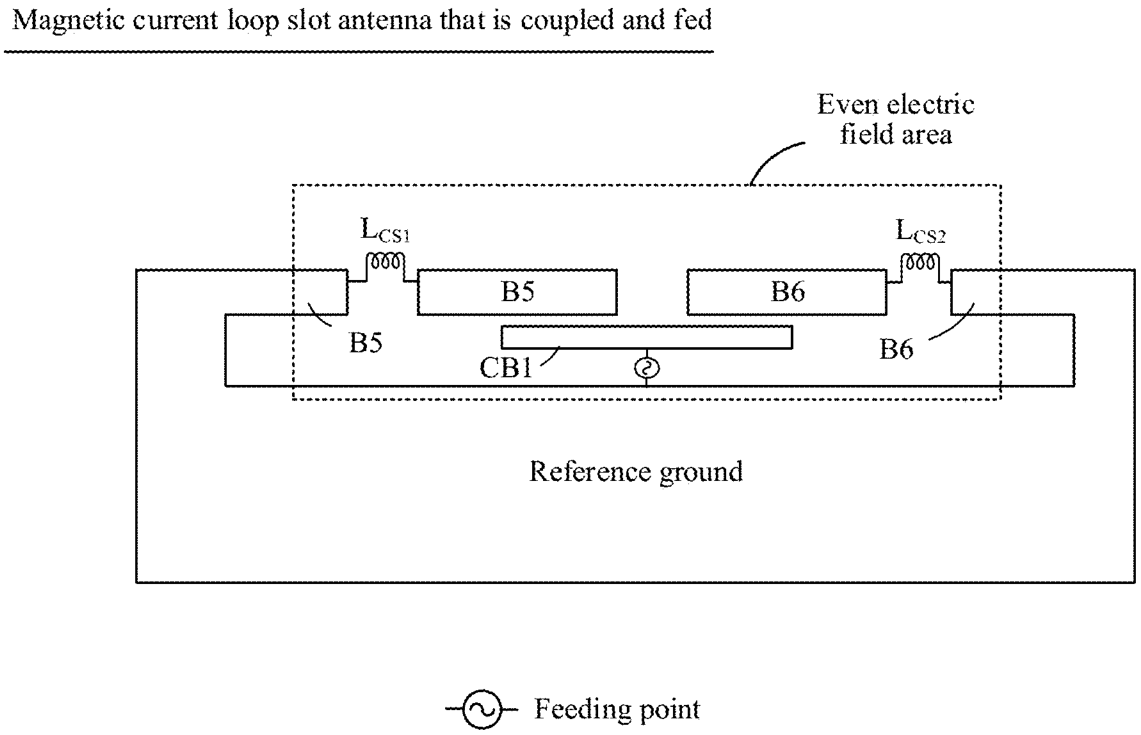
FIG. 67 is a schematic diagram of a magnetic current loop slot antenna that is coupled and fed according to an embodiment of this application.

FIG. 67 is a schematic diagram of composition of a magnetic current loop slot antenna that is coupled and fed according to an embodiment of this application.

It may be understood that based on a mirror image principle, with reference to the magnetic current loop left-hand antenna shown in FIG. 62, in a case of setting a PMC on a left side of the magnetic current loop left-hand antenna for mirror image setting, structural composition of the magnetic current loop slot antenna provided in this example may be obtained. A feeding point of the magnetic current loop slot antenna may be arranged at a middle position of the PMC. Composition and operating conditions of a magnetic current loop slot antenna will be described below with reference to the example shown in FIG. 67.

As shown in FIG. 67, the radiation branch of the magnetic current loop slot antenna shown in this example may include at least two radiators, such as the B5 and the B6. One end of the B5 and one end of the B6 that are arranged opposite to each other may be separated by a slot.

One end of the B5 and one end of the B6 that are away from each other may be coupled to the ground. In this example, inductors may be connected in series on both the B5 and the B6. For example, the inductor Les may be connected in series on the B5, and the inductor $L_{CS2}$ may be connected in series on the B6.

In this example, by respectively arranging inductors on the B5 and the B6, an even electric field may be formed between the two inductors, the radiator of the B5 and the radiator of the B6, and the CB1 and the reference ground, and the radiation characteristics of the magnetic current loop groove antenna may be obtained. For example, a value range of the inductor Les a value range of the inductor $L_{CS2}$ may refer to a range of $L_b$, which is also an inductor connected in series in the foregoing description.

It is to be noted that with reference to the description of a distance between the inductor and the feeding point in the direct feed solution, in some implementations of this example, a distance between the inductor Les and the slot (namely, one end of the inductor $L_{CD1}$ to the B5 close to the B6) may also be controlled to be between a ⅛ wavelength and a 1-fold wavelength of an operating wavelength, thereby obtaining magnetic current loop radiation having even electric field characteristics. In some other implementations of this example, a distance between the inductor $L_{CS2}$ and the slot (namely, one end of the inductor $L_{CD1}$ to the B6 close to the B5) may also be controlled to be between the ⅛ wavelength and the 1-fold wavelength of the operating wavelength, thereby obtaining magnetic current loop radiation having even electric field characteristics.

In some embodiments, when the magnetic current loop slot antenna that is coupled and fed is arranged in an electronic device, a configuration position of the magnetic current loop left-hand antenna and a method example are similar to the direct feed solution shown in FIG. 38. This is not repeated herein.

Figure 68:
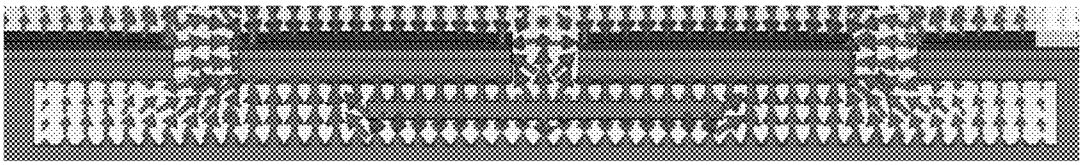
FIG. 68 is a schematic simulation diagram of an electric field of a magnetic current loop slot antenna that is coupled and fed according to an embodiment of this application.
Figure 68:
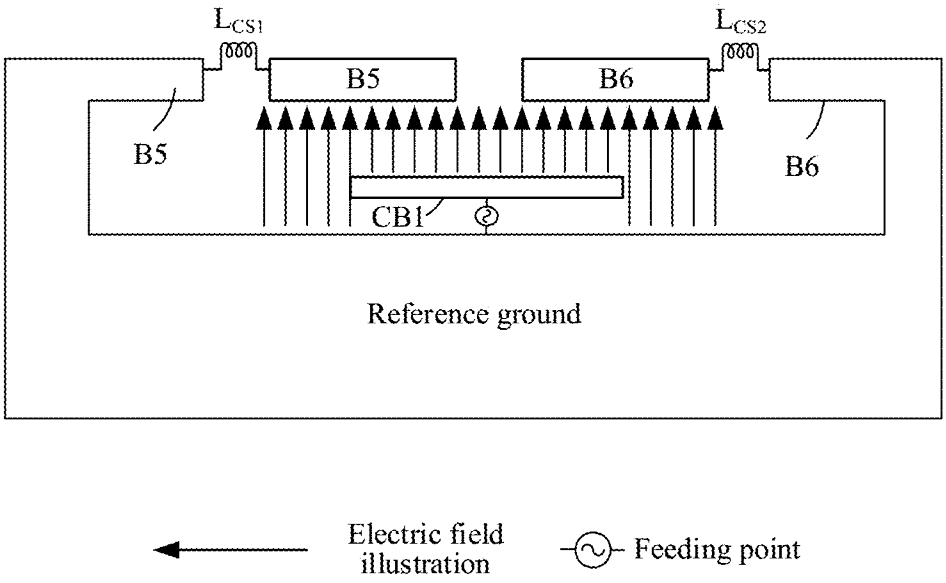

As a possible implementation of a magnetic current loop antenna, this example provides a magnetic current loop slot antenna with the composition shown in FIG. 67, which may generate an even electric field close to a radiator of an antenna during operation. For example, FIG. 68 is a schematic simulation diagram of an electric field in an operating scenario of a magnetic current loop slot antenna according to this example. (a) in FIG. 68 shows illustration of an actual simulation result. For a clearer description, (b) in FIG. 68 shows logical illustration of electric field distribution. It may be learnt that when the magnetic current loop slot antenna is operating, an evenly distributed electric field may be generated in an area enclosed by the B5, the B6, the reference ground, and the CB1. Therefore, the magnetic current loop slot antenna conforms to radiation characteristics of the magnetic current loop antenna.

The magnetic current loop slot antenna that is coupled and fed provided in embodiments of this application may generate an evenly distributed electric field around a radiator of an antenna, and simultaneously also has better radiation performance for covering at least one operating frequency band.

For example, a radiation condition of the magnetic current loop slot antenna that is coupled and fed will be described below with reference to the simulation result in FIG. 69 and FIG. 70.

Figure 69:
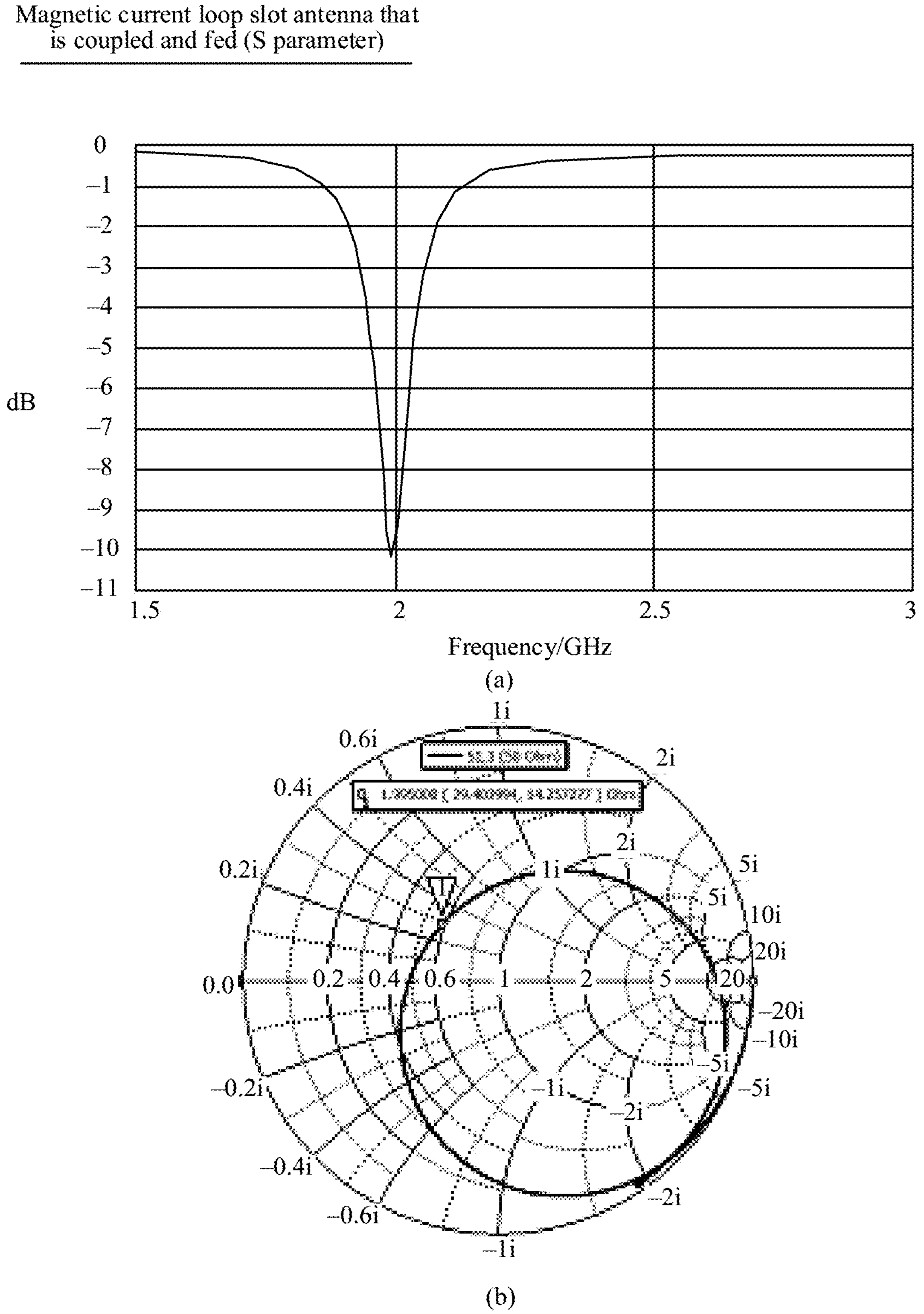
FIG. 69 is a schematic simulation diagram of an S parameter of a magnetic current loop slot antenna that is coupled and fed according to an embodiment of this application.

FIG. 69 is a schematic simulation diagram of an S parameter of a magnetic current loop slot antenna that is coupled and fed according to an embodiment of this application. As shown in (a) in FIG. 69, the magnetic current loop slot antenna in this example may generate one resonance around 2 GHz. A bandwidth of −2 dB of the resonance on S11 is close to 200 MHz, and the deepest point exceeds −10 dB. As shown in (b) in FIG. 69, in a case that without any matching circuit, the magnetic current loop slot antenna that is coupled and fed provided in embodiments of this application has better port matching characteristics on a Smith (Smith) chart. Therefore, the magnetic current loop slot antenna that is coupled and fed provided in embodiments of this application may save space occupied by a matching circuit in a configuration process.

Figure 70:
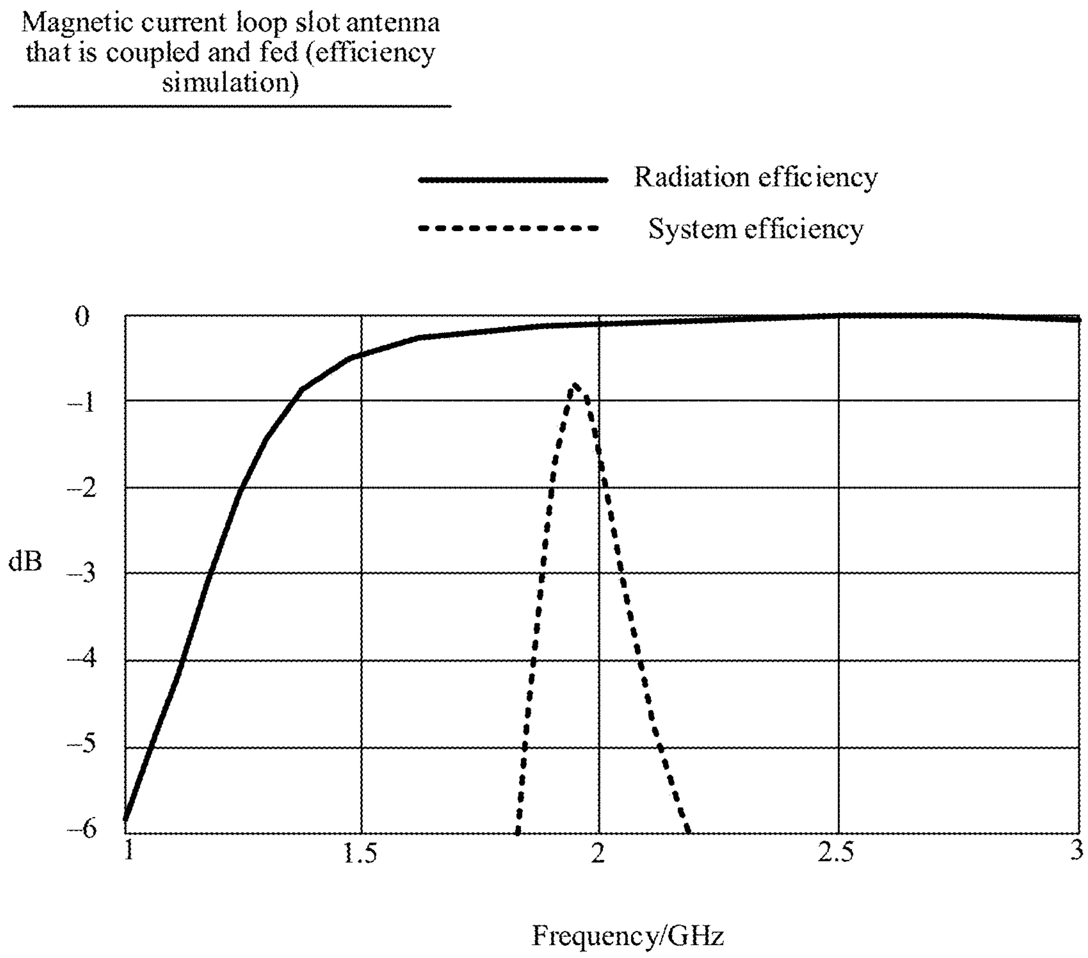
FIG. 70 is a schematic simulation diagram of efficiency of a magnetic current loop slot antenna that is coupled and fed according to an embodiment of this application.

FIG. 70 is a schematic diagram of efficiency of a magnetic current loop slot antenna that is coupled and fed according to an embodiment of this application. It may be learnt that radiation efficiency between 1.4 GHz and 2.5 GHz is above −1 dB and is close to 0 dB, a corresponding system efficiency peak value also exceeds −1 dB, and the bandwidth of −2 dB exceeds 200 MHz. Therefore, the magnetic current loop slot antenna that is coupled and fed provided in embodiments of this application may cover at least one operating frequency band, to achieve an effect of effectively supporting a wireless communication function of the electronic device.

Figure 71:
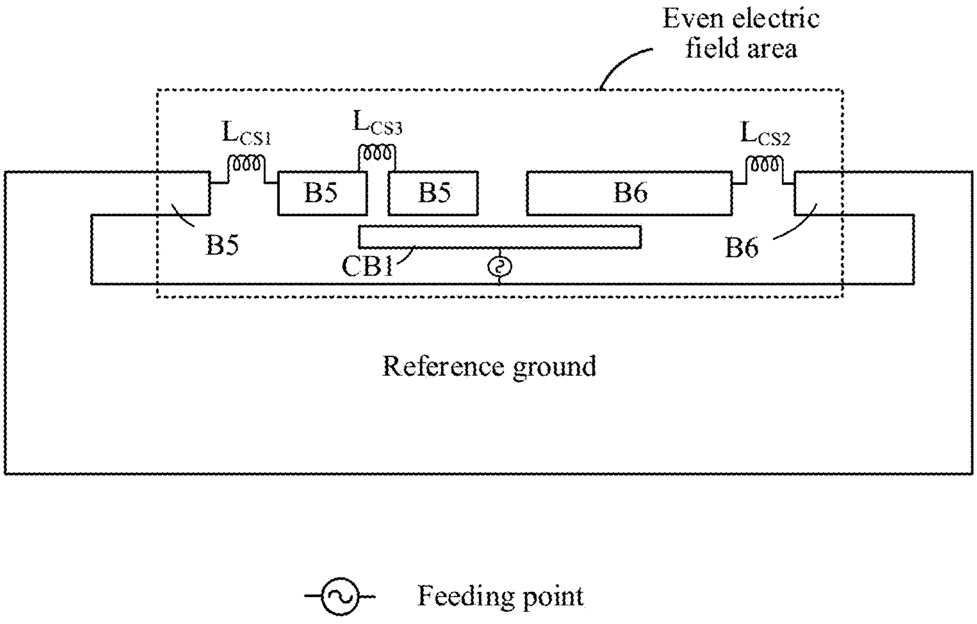
FIG. 71 is a schematic diagram of a magnetic current loop slot antenna that is coupled and fed according to an embodiment of this application.

It is to be noted that in some other embodiments of this application, based on the composition of the magnetic current loop slot that is coupled and fed as shown in FIG. 67, an enhanced design of the radiation efficiency may be further implemented by connecting more inductors in series on the radiator B5 and/or B6. For example, in the example shown in FIG. 71, an inductor $L_{CS3}$ may be connected in series on the B5, to cause the electric field distribution to be more even, thereby improving the radiation efficiency. In different implementations of this application, setting of a position of the inductor connected in series on the radiator and setting of a quantity of inductors may be flexibly selected based on actual needs. This is not limited in embodiments of this application. For example, a value range of the inductor $L_{CS3}$ may refer to a range of $L_b$, which is also an inductor connected in series in the foregoing description, and will not be repeated herein.

In addition, in this example, the description is made by using the composition of the feeding branch as shown in (a) in FIG. 45 to perform coupled feeding. It may be understood that when feeding branches of other compositions as shown in FIG. 45 are used for coupled feeding, an effect in the foregoing example may also be obtained, and details will not be repeated herein.

In different specific implementation processes, a specific implementation of the magnetic current loop slot antenna having any composition as shown in FIG. 67 to FIG. 71 may be different. For example, in some embodiments, radiation branches of the magnetic current loop slot antenna may be fully or partially multiplexed by a metal frame of the electronic device. In some other embodiments, the radiation branch of the magnetic current loop slot antenna may be implemented in a form such as a flexible printed circuit (Flexible Printed Circuit, FPC), and a metalframe diecasting for anodicoxidation (Metalframe Diecasting for Anodicoxidation, MDA). A specific implementation form of the magnetic current loop slot antenna is not limited in embodiments of this application.

Although this application is described with reference to specific features and all embodiments thereof, it is clear that various modifications and combinations may be made to them without departing from the spirit and scope of this application. Correspondingly, the specification and the accompanying drawings are merely example descriptions of this application defined in the appended claims, and are considered as any of or all modifications, variations, combinations or equivalents that cover the scope of this application. Certainly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A terminal monopole antenna, wherein the antenna comprises a radiation branch, the radiation branch comprises at least one radiator, a first end of the at least one radiator is electrically connected to a reference ground through a first inductor, and the first end is one of ends on two sides of the at least one radiator;

a second end of the at least one radiator is electrically connected to the reference ground through a second inductor, the second end is an end different from the first end among the ends on the two sides of the at least one radiator, the terminal monopole antenna further comprises a feeding branch, the feeding branch is not physically connected to the radiation branch, the feeding branch is arranged between the radiation branch and the reference ground, a feeding point comprising a feed is arranged on the feeding branch, and the feeding branch is configured to perform coupled feeding to the radiation branch; and a length of the radiation branch is less than a quarter of an operating wavelength of the terminal monopole antenna.

2. The terminal monopole antenna according to claim 1, wherein when an operating frequency band of the terminal monopole antenna ranges from 450 MHz to 1 GHz, an inductance value of the first inductor and an inductance value of the second inductor are set within [5 nH, 47 nH];

when the operating frequency band of the terminal monopole antenna ranges from 1 GHz to 3 GHz, the inductance value of the first inductor and the inductance value of the second inductor are set within [1 nH, 33 nH]; and when the operating frequency band of the terminal monopole antenna ranges from 3 GHz to 10 GHz, the inductance value of the first inductor and the inductance value of the second inductor are set within [0.5 nH, 10 nH].

3. The terminal monopole antenna according to claim 1, wherein the feeding branch comprises a first feeding part, the feeding point is connected to a center of the first feeding part, and ends on two sides of the first feeding part are suspended.

4. The terminal monopole antenna according to claim 1, wherein the feeding branch comprises a second feeding part, two sides of the second feeding part are respectively grounded through a third inductor and a fourth inductor, and the feeding point is connected in series on the second feeding part.

5. The terminal monopole antenna according to claim 1, wherein the feeding branch comprises a third feeding part, and the feeding point is connected to an end on one side of the third feeding part.

6. The terminal monopole antenna according to claim 5, wherein an end on the other side of the third feeding part is suspended.

7. The terminal monopole antenna according to claim 5, wherein an end on the other side of the third feeding part is grounded through a third inductor.

8. The terminal monopole antenna according to claim 5, wherein an end of the third feeding part that is farthest from the feeding point is grounded; and a through slot is provided on the third feeding part, and the slot divides the third feeding part into two parts that are not connected to each other.

9. The terminal monopole antenna according to claim 5, wherein an end of the third feeding part that is farthest from the feeding point is grounded; and a fourth inductor connected in series is arranged on the third feeding part.

10. The terminal monopole antenna according to claim 1, wherein feeding branches of different sizes correspond to different port impedances of the terminal monopole antenna.

11. The terminal monopole antenna according to claim 1, wherein when the terminal monopole antenna is operating, an even electric field is distributed between the radiation branch and the reference ground.

12. The terminal monopole antenna according to claim 1, wherein when the terminal monopole antenna is operating, a reverse current is distributed on the at least one radiator.

13. The terminal monopole antenna according to claim 1, wherein one or more inductors are connected in series with radiators in the at least one radiator; and when a plurality of inductors are connected in series with the radiators in the at least one radiator, the plurality of inductors comprise at least two inductors spaced apart from each other by a radiator of the at least one radiator.

14. An electronic device, comprising at least one processor, a radio frequency module, and a terminal monopole antenna; and wherein when transmitting or receiving a signal, the electronic device transmits or receives the signal through the radio frequency module and the terminal monopole antenna;

wherein the terminal monopole antenna comprises a radiation branch, the radiation branch comprises at least one radiator, a first end of the at least one radiator is electrically connected to a reference ground through a first inductor, and the first end is one of ends on two sides of the at least one radiator;

wherein a second end of the at least one radiator is electrically connected to the reference ground through a second inductor, the second end is an end different from the first end among the ends on the two sides of the at least one radiator, the terminal monopole antenna further comprises a feeding branch, the feeding branch is not connected to the radiation branch comprising that electrical current of the feeding branch does not flow through the radiation branch, the feeding branch is arranged between the radiation branch and the reference ground, a feeding point comprising a feed is arranged on the feeding branch, and the feeding branch is configured to perform coupled feeding to the radiation branch; and wherein a length of the radiation branch is less than a quarter of an operating wavelength of the terminal monopole antenna.

15. The electronic device according to claim 14, wherein an operating frequency band of the terminal monopole antenna ranges from 450 MHz to 1 GHz, and an inductance value of the first inductor and an inductance value of the second inductor are set within [5 nH, 47 nH].

16. The electronic device according to claim 14, wherein an operating frequency band of the terminal monopole antenna ranges from 1 GHz to 3 GHZ, and an inductance value of the first inductor and an inductance value of the second inductor are set within [1 nH, 33 nH].

17. The electronic device according to claim 14, wherein an operating frequency band of the terminal monopole antenna ranges from 3 GHz to 10 GHz, and an inductance value of the first inductor and an inductance value of the second inductor are set within [0.5 nH, 10 nH].

18. The electronic device according to claim 14, wherein the feeding branch comprises a first feeding part, the feeding point is connected to a center of the first feeding part, and ends on two sides of the first feeding part are suspended.

19. The electronic device according to claim 14, wherein the feeding branch comprises a second feeding part, two sides of the second feeding part are respectively grounded through a third inductor and a fourth inductor, and the feeding point is connected in series on the second feeding part.

20. The electronic device according to claim 14, wherein the feeding branch comprises a third feeding part, and the feeding point is connected to an end on one side of the third feeding part.

* * * * *